United States Patent [19]
Epstein et al.

[11] Patent Number: 5,932,940
[45] Date of Patent: Aug. 3, 1999

[54] MICROTURBOMACHINERY

[75] Inventors: Alan H. Epstein, Lexington; Stephen D. Senturia, Brookline; Ian A. Waitz, Newton; Jeffrey H. Lang, Sudbury; Stuart A. Jacobson, Somerville; Fredric F. Ehrich, Marblehead; Martin A. Schmidt, Reading, all of Mass.; G. K. Ananthasuresh, Philadelphia, Pa.; Mark S. Spearing; Kenneth S. Breuer, both of Newton, Mass.; Steven F. Nagle, Cambridge, Mass.

[73] Assignee: Massachusetts Institute of Technology, Cambridge, Mass.

[21] Appl. No.: 08/749,454

[22] Filed: Nov. 15, 1996

Related U.S. Application Data

[60] Provisional application No. 60/022,098, Jul. 16, 1996.
[51] Int. Cl.[6] .......................... H01L 29/84; H02K 29/00; F02C 3/04
[52] U.S. Cl. ................................. 310/40 MM; 257/414; 257/415; 290/52; 60/39.35; 60/39.36
[58] Field of Search ..................... 257/414, 415; 60/39.34, 39.35, 39.36, 39.37, 330, 364; 290/52; 310/40 MM

[56] References Cited

U.S. PATENT DOCUMENTS

| | | | |
|---|---|---|---|
| 3,531,934 | 10/1970 | Hope-Gill | 60/39.37 |
| 3,657,875 | 4/1972 | Radnik et al. | 58/23 D |
| 3,717,419 | 2/1973 | Olcott | 416/230 |
| 3,877,574 | 4/1975 | Killick | 206/368 |
| 4,000,609 | 1/1977 | Chute | 60/39.36 |
| 4,027,997 | 6/1977 | Bryans | 415/207 |
| 4,041,699 | 8/1977 | Schelp | 60/39.55 |
| 4,123,571 | 10/1978 | Balog et al. | 427/249 |

(List continued on next page.)

FOREIGN PATENT DOCUMENTS

| | | | |
|---|---|---|---|
| 1426297 | 1/1969 | Germany. | |
| 2017222 | 10/1979 | United Kingdom | F02C 3/16 |

OTHER PUBLICATIONS

Doty et al., "High–Efficiency Microturbine Technology," *Aerospace Power Systems, Conversion Technologies*, Boston, MA, Aug. 4–9, 1991, *American Nuclear Soc.*, vol. 2, pp. 436–442, 1991.

Wiegele, "The Impact of Design and Fabrication on the Dynamic Behavior of a Micro–Turbine," DSC–V.59, *Microelectromechanical Systems (MEMS)*, ASME, pp. 287–293, Nov. 22, 1996.

(List continued on next page.)

*Primary Examiner*—Jerome Jackson, Jr.
*Attorney, Agent, or Firm*—Theresa A. Lober

[57] ABSTRACT

The invention provides a micro-gas turbine engine and associated microcomponentry. The engine components, including, e.g., a compressor, a diffuser having diffuser vanes, a combustion chamber, turbine guide vanes, and a turbine are each manufactured by, e.g., microfabrication techniques, of a structural material common to all of the elements, e.g., a microelectronic material such as silicon or silicon carbide. Vapor deposition techniques, as well as bulk wafer etching techniques, can be employed to produce the engine. The engine includes a rotor having a shaft with a substantially untapered compressor disk on a first end, defining a centrifugal compressor, and a substantially untapered turbine disk on the opposite end, defining a radial inflow turbine. The rotor is preferably formed of a material characterized by a strength-to-density ratio that enables a rotor speed of at least about 500,000 rotations per minute. An annular, axial-flow combustion chamber is provided that is located axially between the compressor and turbine disks and that has a ratio of annular height to axial length of at least about 0.5. The micro-gas turbine engine can be configured with an integral microgenerator as a source of electrical power, and can be employed for a wide range of power, propulsion, and thermodynamic cycle applications.

70 Claims, 55 Drawing Sheets

U.S. PATENT DOCUMENTS

| | | | |
|---|---|---|---|
| 4,237,394 | 12/1980 | Aoki | 310/113 |
| 4,509,896 | 4/1985 | Linsker | 415/9 |
| 4,513,216 | 4/1985 | Müller | 310/156 |
| 4,639,194 | 1/1987 | Bell, III et al. | 416/241 B |
| 4,644,246 | 2/1987 | Knapen | 320/21 |
| 4,738,902 | 4/1988 | Prewo et al. | 428/697 |
| 4,777,394 | 10/1988 | Hayashi | 310/83 |
| 4,784,574 | 11/1988 | Tsuno et al. | 416/241 B |
| 4,850,187 | 7/1989 | Siga | 60/39.37 |
| 4,850,803 | 7/1989 | Kawasaki et al. | 416/241 B |
| 5,021,230 | 6/1991 | Krstic | 423/345 |
| 5,038,460 | 8/1991 | Ide et al. | 29/596 |
| 5,051,062 | 9/1991 | Ando et al. | 416/241 B |
| 5,079,468 | 1/1992 | Sata | 310/168 |
| 5,083,040 | 1/1992 | Whitford | 290/52 |
| 5,118,961 | 6/1992 | Gamell | 290/52 |
| 5,202,633 | 4/1993 | Doty et al. | 324/321 |
| 5,207,054 | 5/1993 | Rodgers et al. | 60/39.36 |
| 5,289,130 | 2/1994 | Doty | 324/321 |
| 5,325,059 | 6/1994 | Doty | 324/321 |
| 5,333,994 | 8/1994 | Doty et al. | 415/202 |
| 5,498,312 | 3/1996 | Laermer et al. | 156/643.1 |
| 5,501,893 | 3/1996 | Laermer et al. | 428/161 |
| 5,600,190 | 2/1997 | Zettler | 310/40 MM |
| 5,685,062 | 11/1997 | McCarthy | 310/40 MM |

OTHER PUBLICATIONS

Tsai et al., "Surface Micromachined Turbines," *Transducers '97, Int. Conf. on Solid–State Sensors and Actuators*, Chicago, IL, V. 2, pp. 829–832, Jun. 16–19, 1997.

Wiegele, "Micro–Turbo–Generator Design and Fabrication: A Preliminary Study," *IECEC '96, Proc. of the 31st Intersociety Energy Conv. Eng. Conf.*, V. 4, pp. 2308–2313, Aug. 1996.

Burnett, "Development of a Hydrogen–Burning Annular Combustor For Use In A Miniature Gas Turbine Engine," NASA Report CR–66362, NASA Contract NAS1–7261, Sep. 1969.

Burnett et al., "Design of a Miniature Hydrogen Fueled Gas Turbine Engine," NASA Report CR–112173, N73–25825, NASA Contract NAS1–9752, Feb. 2, 1973.

He et al., "Design and Test of a Novel Miniature Cryogenic Expansion Turbine," Proceedings, *Advances in Cryogenic Engineering*, Cambridge, MA, vol. 31, pp. 829–833, Aug. 12–16, 1985.

Izumi et al., "Development of Small Size Claude Cycle Helium Refrigerator With Micro Turbo–Expander," Proc., *Advances in Cryogenic Engineering*, vol. 31, pp. 811–818, Aug. 12–16, 1985.

Doty et al., "High–Efficiency Microturbine Technology," Proceedings, *IECEC '91*, vol. 2, pp. 436–442, Boston, MA, Aug. 4–9, 1991.

Wegeng et al., "Developing new miniature energy systems," *Mechanical Engineering*, vol. 116, No. 9, pp. 82–85, Sep. 1994.

"Advanced Gas Turbine (AGT) Technology Development Project Final Report," DOE/NASA 0167–12, NASA CR–180891, Garrett No. 31–3725(12), Contract DEN3–167, Mar. 1988.

"Advanced Gas Turbine Technology Project Final Report," DOE/NASA 0168–11, NASA CR–182127, EDR 13295, Aug. 1988.

Nakajima et al., "The Development of the Micro Gas Turbine Generator," *1995 Yokohama Gas Turbine Congress*, pp. III(301–307) Yokohama, Japan, Oct. 22–27, 1995.

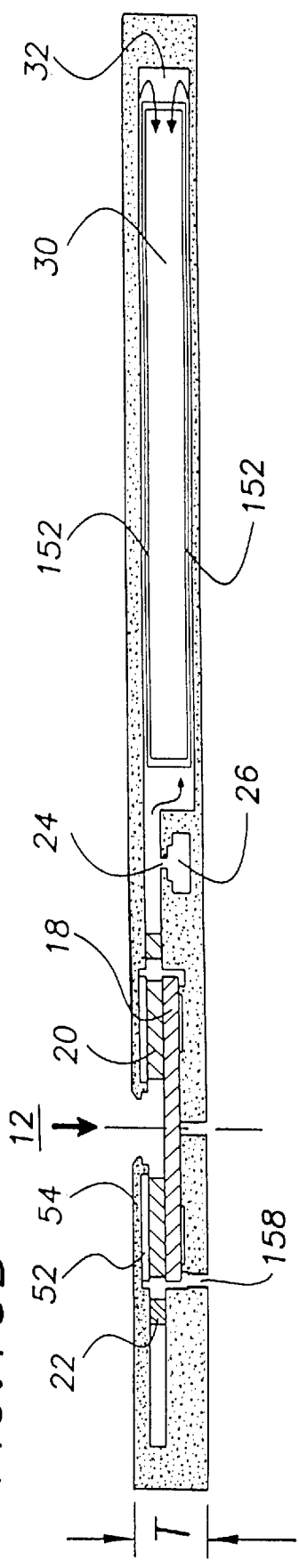
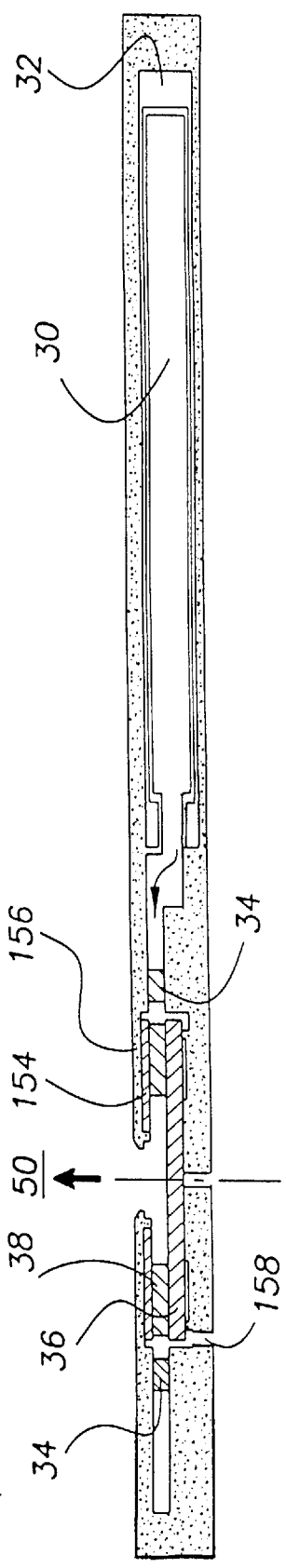
FIG. 10B
FIG. 10C

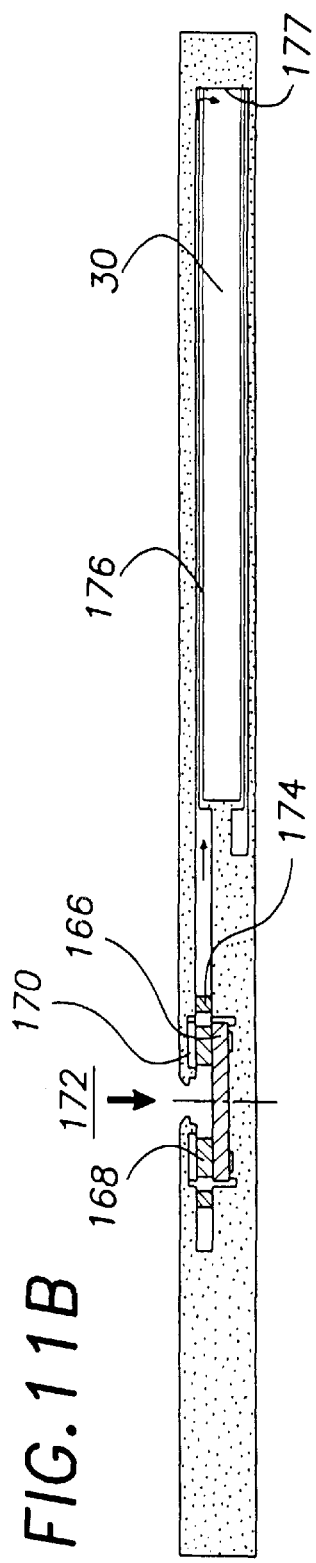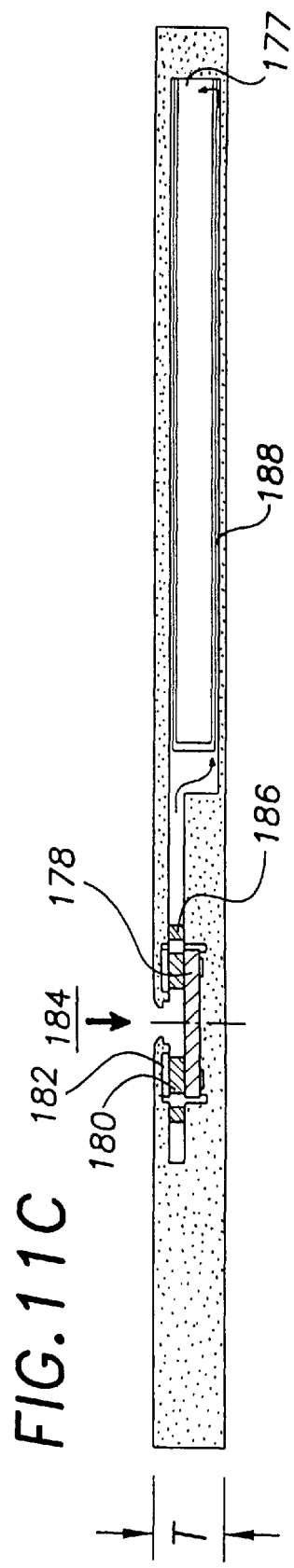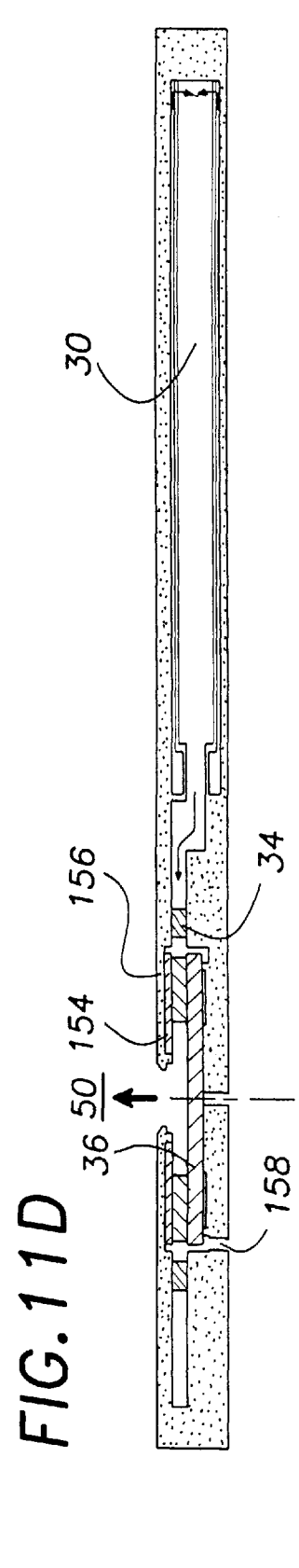

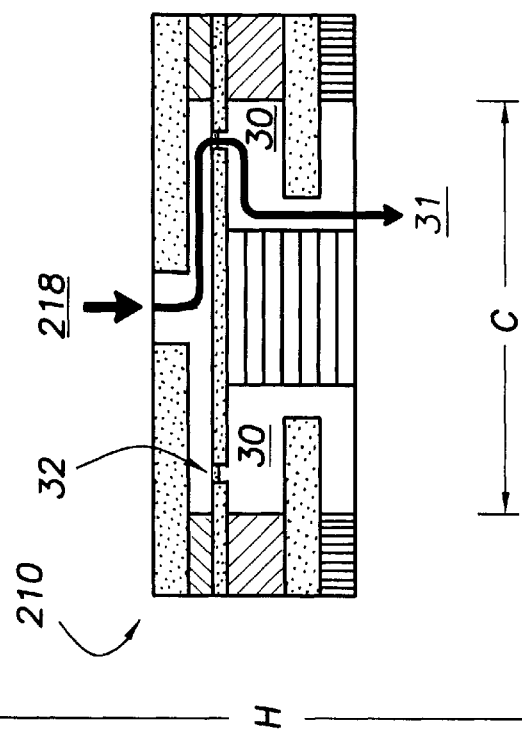
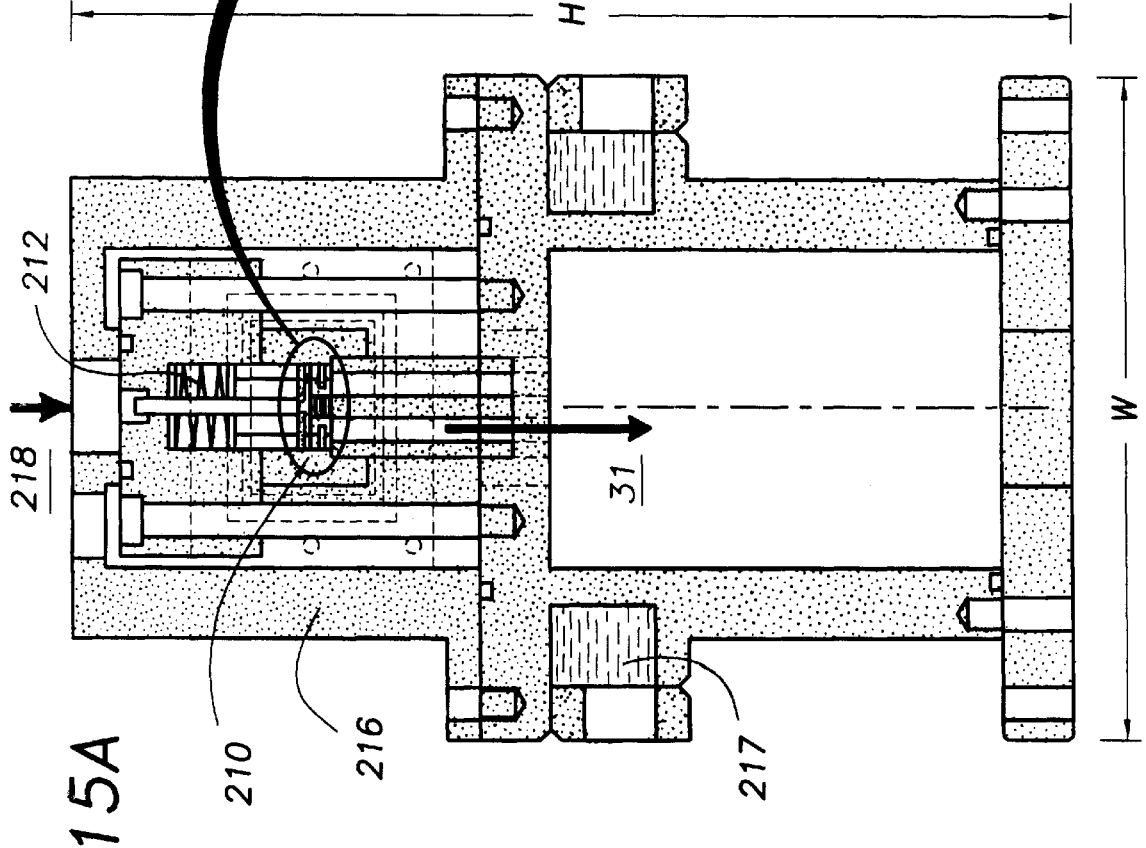

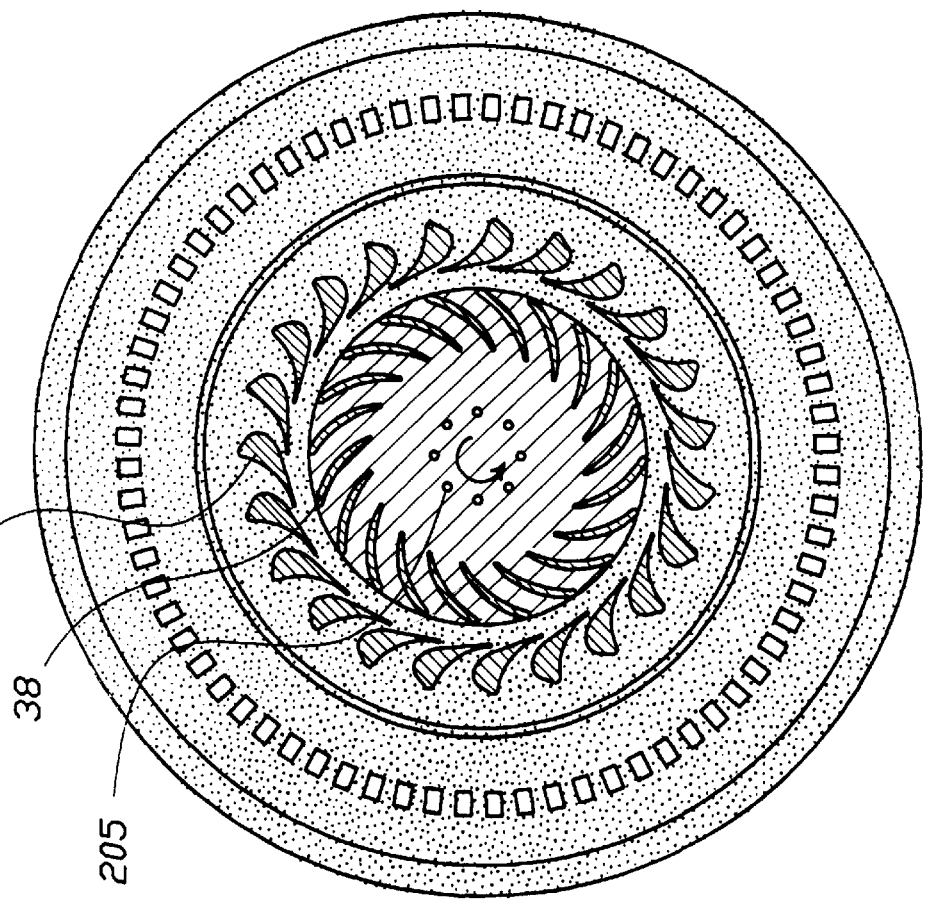
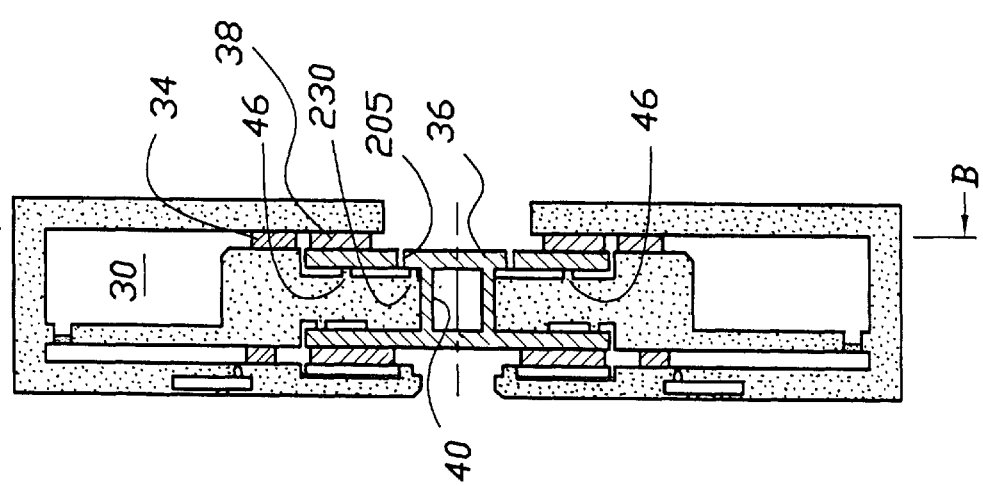

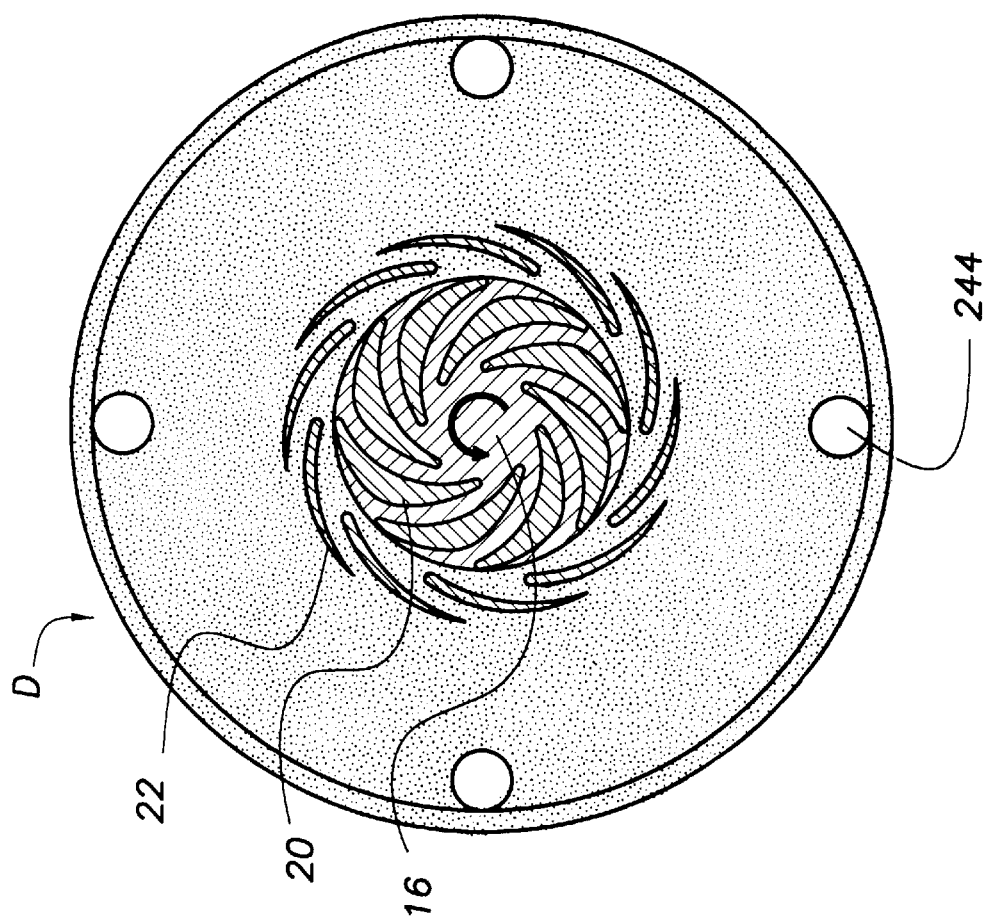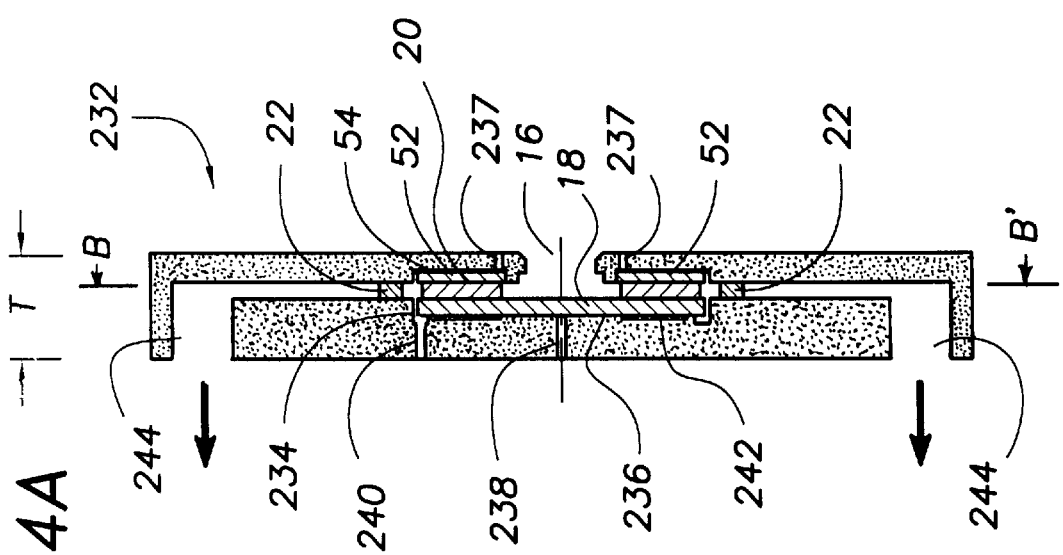

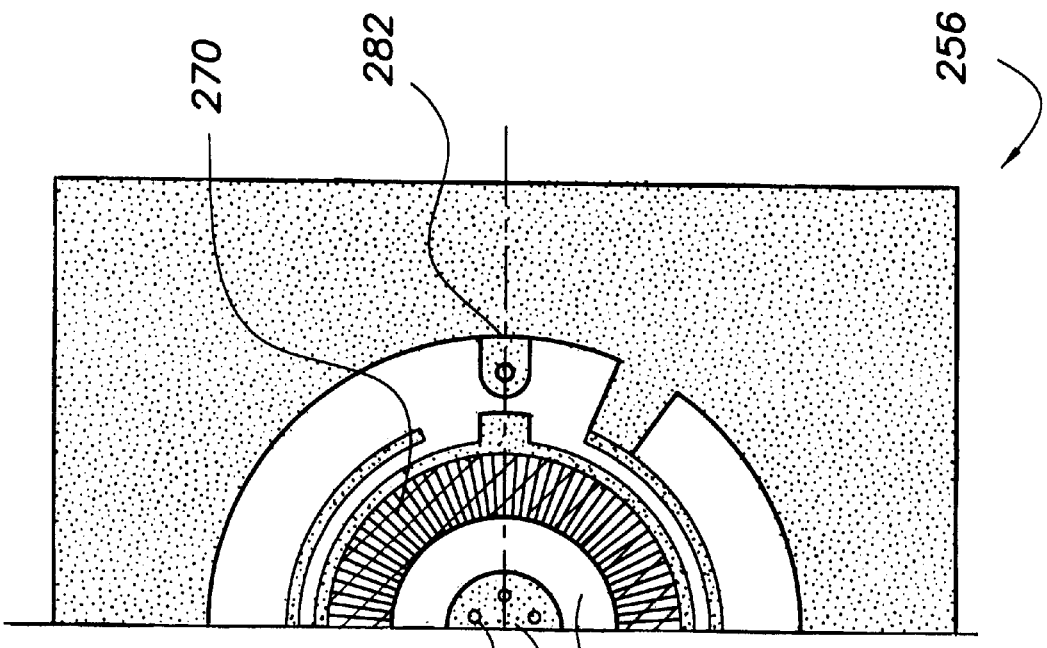
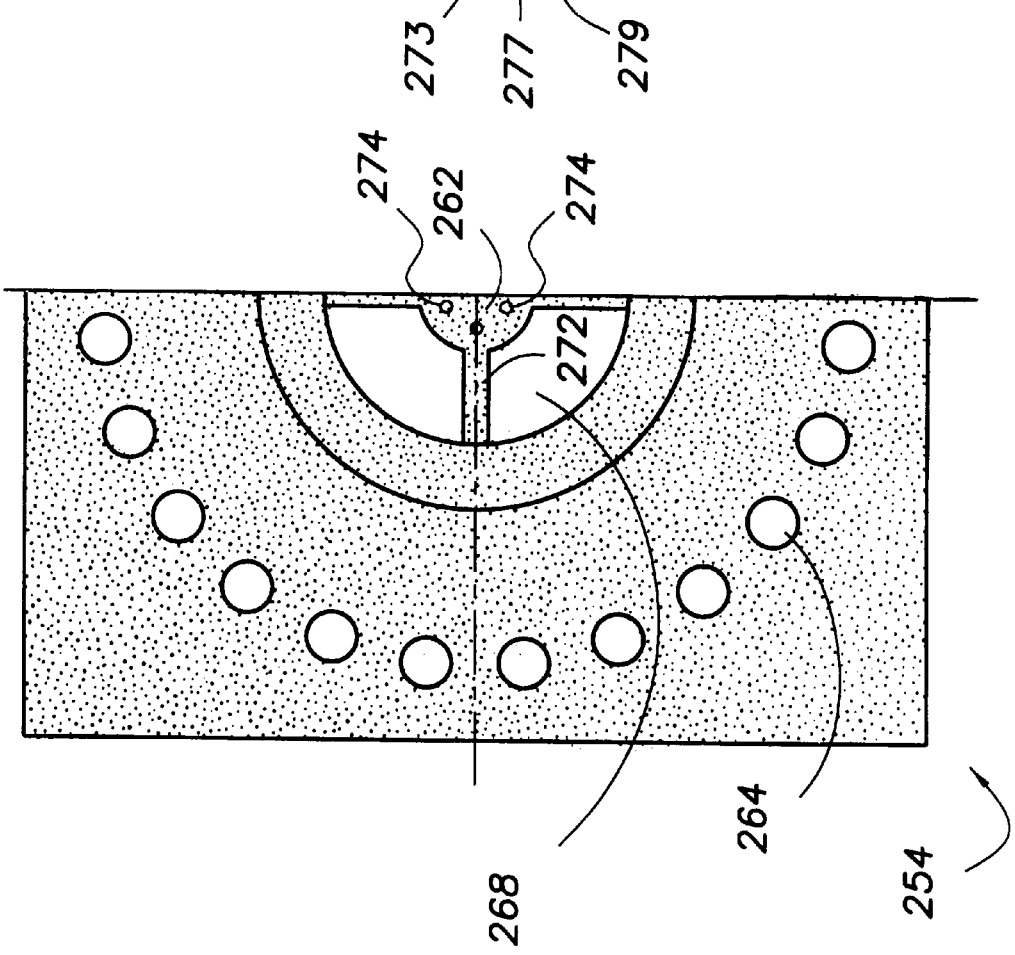

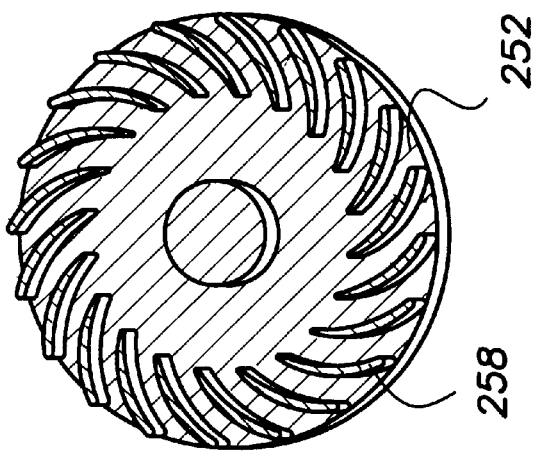
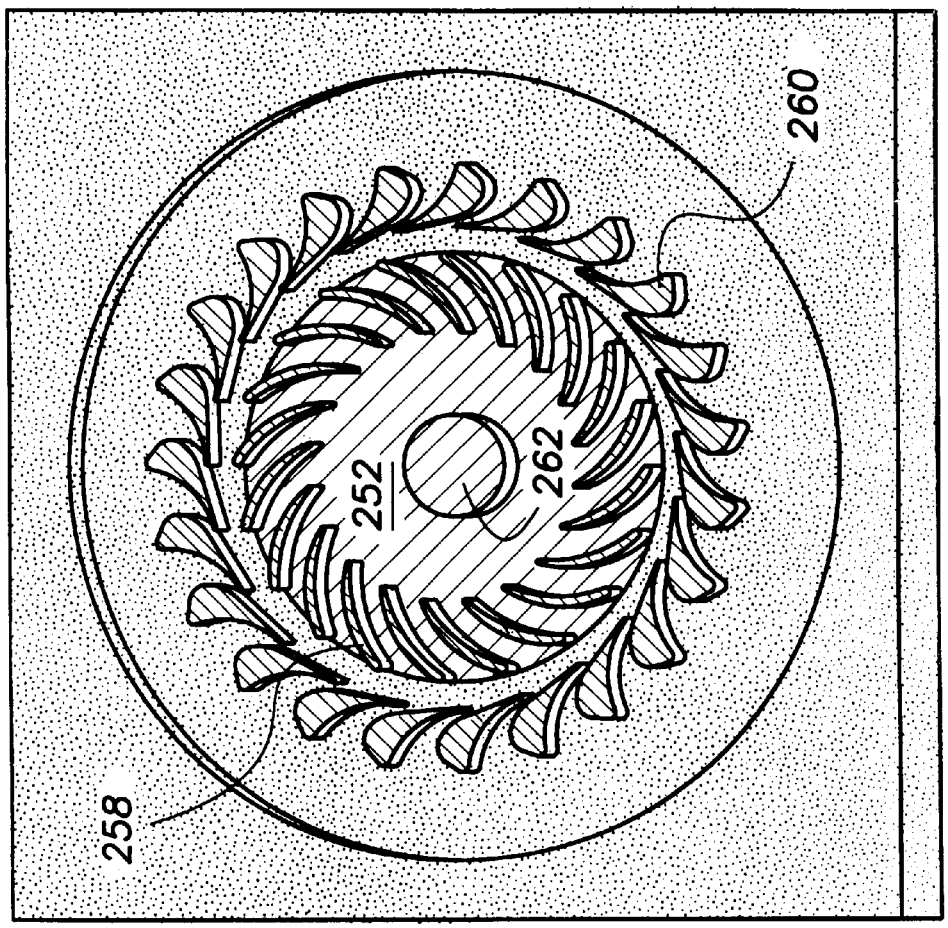

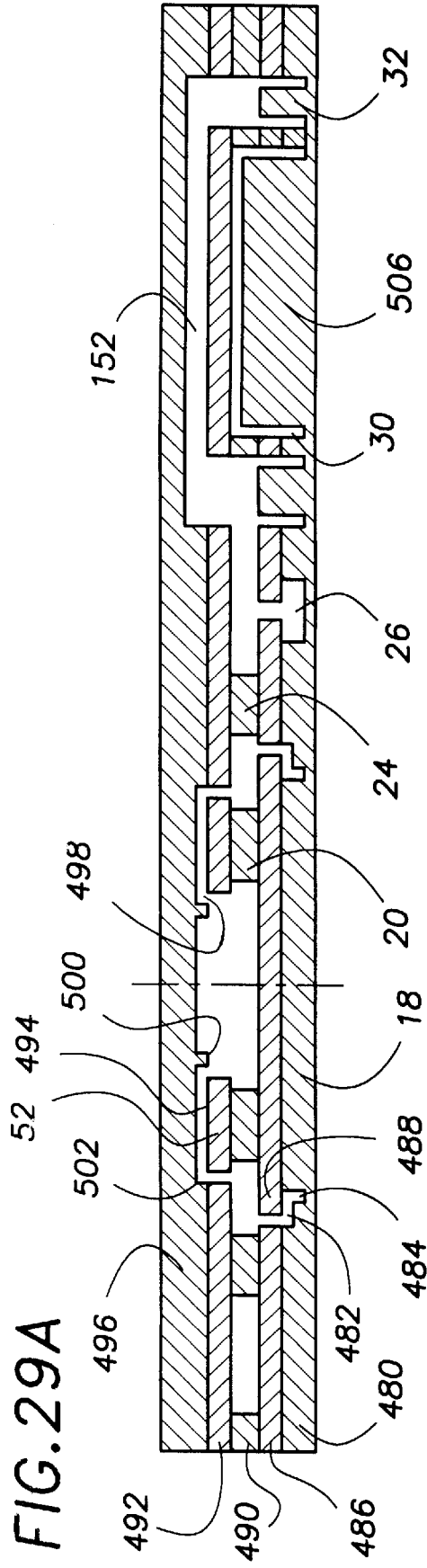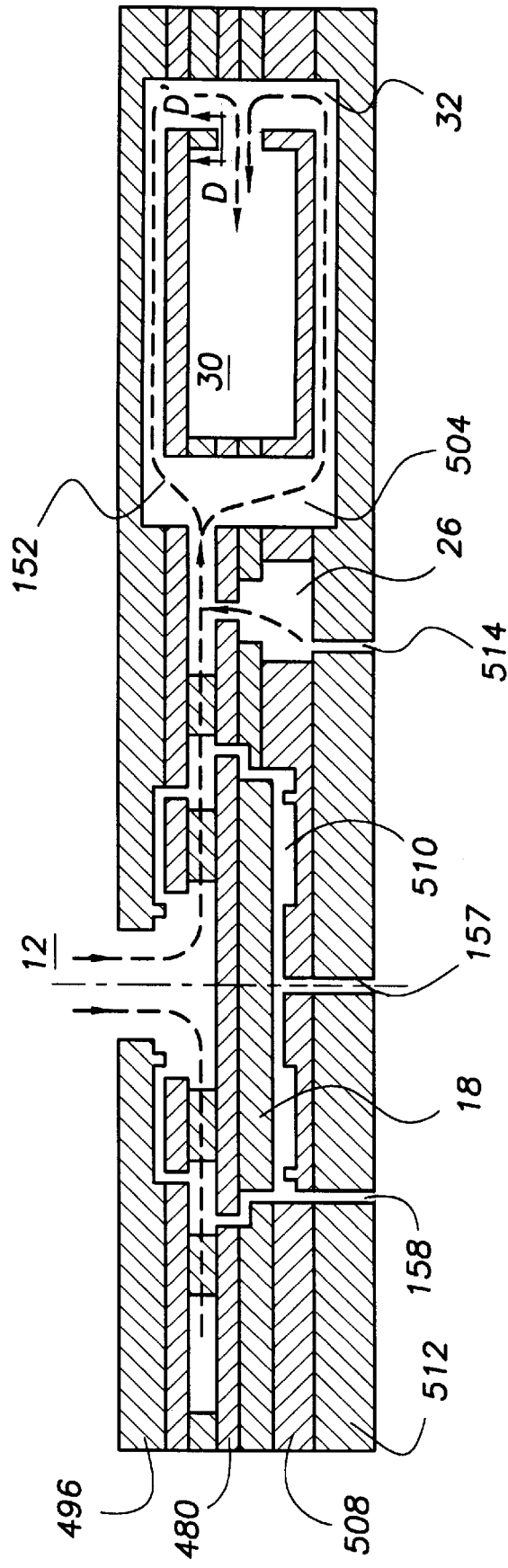

MICROTURBOMACHINERY

This application claims the benefit of U.S. Provisional Application No. 60/022,098, in the name of Epstein et al., filed Jul. 16, 1996, the entirety of which is hereby incorporated by reference.

GOVERNMENT RIGHTS IN THE INVENTION

This invention was made with U.S. Government support under U.S. Air Force Contract Number F19628-95-C-0002, and under U.S. Army Grant Numbers DAAH04-95-1-0093 and DAAH04-96-1-0256. The U.S. Government has certain rights in this invention.

BACKGROUND OF THE INVENTION

This invention relates to energy and thermodynamic systems, and more particularly relates to componentry for enabling power sources, such as electric power sources, propulsion drives for, e.g., jet propulsion, and thermodynamic systems, such as cooling and ventilation systems, all that operate in high-efficiency and small-size regimes.

Compact, highly mobile, and efficient thermodynamic and energy systems are becoming increasingly important for a wide range of applications, such as powering and cooling of portable electronics, communications, and medical devices, control and modular propulsion of distributed and self-powered actuation and sensor systems, and thermodynamic cycling of distributed and/or auxiliary heating and ventilation systems, as well as many other applications. Typically, such applications optimally require power sources that are characterized by high power and energy density but minimal size and weight, and that are cost effective.

Historically, batteries, such as primary and rechargeable batteries, have been relied on for supplying portable, compact sources of power. Portable batteries are generally limited, however, to power production in the range of milliwatt to watts, and thus cannot conventionally address the need for significant as well as mobile and lightweight power production. The environmental incompatibility of typical batteries also poses a limitation for many applications.

Conversely, heat engines, such as gas turbine powered generators, can produce kilowatts of power at high power densities and efficiencies, but are typically of relatively large sizes that are not compatible with the high mobility requirement of many self-powered applications. Indeed, although the inherent high energy density of liquid fuels makes heat engines the most compact of all power sources, thermodynamic scaling and cost considerations have traditionally favored large size engines. Specifically, large engines, such as gas turbine engines, rely on high combustor exit temperatures and precise dimensional control to achieve high combustion and component efficiency; the cost and difficulty in achieving high component machine tolerances and accommodating high combustor temperatures in relatively smaller sized conventional engines have made the gas turbine a less attractive power source for power levels less than hundreds of kilowatts.

Beyond the dichotomy of power sources characterized by high power and energy density and those characterized by high mobility and low weight, systems for propulsion, circulation, heating, cooling, and other thermodynamic cycles are found to similarly be typically lacking in one or more requirements for efficiency, modularity, mobility, size, weight, or cost effectiveness that are characteristic of aggressive modern applications. Yet many aggressive portable and modular applications rely on the availability of both power and thermodynamic cycle sources that comply with such requirements. As a result, advances in mobile, self-powered, and small-scale systems have heretofore been limited.

SUMMARY OF THE INVENTION

The present invention overcomes limitations of conventional power and thermodynamic sources by providing micromachinery components that enable production of significant power and efficient operation of thermodynamic systems in the millimeter and micron regime to meet the efficiency, mobility, modularity, weight, and cost requirements of many modern applications.

Accordingly, in a first aspect, the invention provides a gas turbine engine having a compressor with an engine inlet port and a rotatable compressor disk for compressing inlet air, with a plurality of diffuser vanes located to receive compressed air from the compressor and produce a corresponding static rise in air pressure. A combustor having a combustion chamber is located to receive the compressed air from the diffuser vanes through a combustor inlet to combust the compressed air with a fuel, and a plurality of turbine guide vanes are located to receive combusted air exhausted from the combustor. Finally, a turbine is provided having a rotatable turbine disk located to receive combusted air from the turbine guide vanes, and having an engine exhaust port.

In one embodiment, the compressor, diffuser vanes, combustion chamber, turbine guide vanes, and turbine elements each are of a structural material, e.g., a microelectronic material such as silicon carbide, vapor deposited silicon carbide, silicon, or silicon nitride, that is common to all of the elements. In a further embodiment, the compressor, diffuser vanes, combustion chamber, turbine guide vanes, and turbine elements each are a microfabricated element having dimensions that are photolithographically defined. Here the compressor and turbine disks can be single crystal silicon or silicon carbide disks that are microfabricated by bulk etching of single crystal silicon or silicon carbide wafers.

In another aspect, the invention provides a gas turbine engine with a rotor including a shaft having a substantially untapered compressor disk on a first end of the shaft, with compressor blades defining a centrifugal compressor, and a substantially untapered turbine disk on an opposite end of the shaft, with turbine blades defining a radial inflow turbine. The rotor is of a material characterized by a strength-to-density ratio that enables a rotor speed of at least about 500,000 rotations per minute. An annular, radial out-flow diffuser is located radially outward of the compressor disk for receiving compressed air from the compressor. An annular, axial-flow combustor is located radially outward of the rotor shaft and axially between the compressor and turbine disks with a combustor inlet radially outward of the diffuser and an exhaust outlet radially outward of the turbine disk. A plurality of radial inflow turbine guide vanes are located radially outward of the turbine disk, with an inlet for accepting combustion exhaust and directing the exhaust to the turbine.

Preferably, the compressor and turbine disks each are of a disk diameter of between about 1 mm and 10 mm, and preferably, the combustor has a combustion chamber with an annular height of between about 2 mm–10 mm and an axial length of between about 0.5 mm–5.5 mm; the combustion chamber generally has dimensions characterized by a ratio of chamber annular height to chamber axial length that is at least about 0.5.

In embodiments provided by the invention, the rotor shaft is journalled for rotation by a radial gas journal bearing having a clearance of between about 2 $\mu$m–25 $\mu$m between the rotor shaft and an engine housing wall; this gas journal bearing can include a tangential, circumferentially asymmetric pressurization seal. Alternatively, the compressor disk and the turbine disk can each be journalled for rotation by a radial gas journal bearing having a clearance between a radially peripheral edge of the disk and a corresponding engine housing wall. The compressor and turbine disks can be located back-to-back on the rotor.

In other embodiments, the compressor blades are radial-flow blades together of a common axial height and each of a constant axial height along blade radial extent; similarly, the turbine blades are radial-flow blades of a common axial height and each of a constant axial height along blade radial extent. In the same manner, the diffuser provides radial-flow diffuser vanes together of a common axial height with the compressor blades and each of a constant axial height along vane radial extent, and the turbine guide vanes are radial-flow vanes together of a common axial height with the plurality of turbine blades and each of a constant axial height along vane radial extent.

A motor and/or generator is provided having a rotor defined by the compressor and having stator electrodes defined by conducting regions located on an engine endwall opposite the compressor disk and interconnected to define a stator excitation configuration of at least one excitation phase. The rotor can be defined specifically by the compressor blades or, if the compressor blades are radial-flow blades together of a common axial height and each of a constant axial height along blade radial extent, a blade shroud can be connected on the axial height of the blades to accommodate an upper conducting layer defining an electric induction rotor. Similarly, the rotor can be defined by the turbine and have stator electrodes defined by conducting regions located on an engine endwall opposite the turbine disk and interconnected to define a stator excitation configuration of at least one excitation phase. The rotor can here be defined specifically by the turbine blades or, if the turbine blades are radial-flow blades together of a common axial height and each of a constant axial height along blade radial extent, a blade shroud can be connected on the axial height of the blades to accommodate an upper conducting layer defining an electric induction rotor.

In further embodiments, an annular fuel plenum is provided in the engine and located radially outward of the compressor disk; and an array of fuel injectors is connected between the fuel plenum and a location on an engine endwall along internal engine air flow upstream of the combustor inlet. Also provided is an engine fuel tank, a motor connected to the rotor, an auxiliary power source for starting the motor, and control electronics. With this configuration, the engine is provided to be housed in an engine package having a air inlet port connected to the compressor, an air exhaust port connected to the turbine, a fuel port connected to the fuel tank, a fuel line connecting the fuel tank to the fuel plenum, an electrical port connected to the control electronics and auxiliary power source, and an isolation wall isolating the fuel tank from other engine components. Preferably, the engine package is of a volume less than about 1 liter, is formed of plastic, and supports a fuel tank that has a storage volume sufficient for storing between about 5 ml and 5000 ml of liquid engine fuel.

In other embodiments, an annular recuperator is connected to receive compressed air from the diffuser and to receive air exhausted from the turbine to heat the compressed air and discharge the heated compressed air to the combuster. Here planar hot air channels are connected to receive the air exhausted from the turbine and are located in alternating fashion with cold air channels that are connected to receive the compressed air from the diffuser. In a further embodiment, a bypass fan is located axially forward of the compressor disk and has bypass fan blades, and an axial bypass channel is located radially outward of the combustor and provides an exhaust port axially aft of the turbine. Here, if the compressor blades are radial-flow blades together of a common axial height and each of a constant axial height along blade radial extent, a blade shroud can be connected on the axial height of the blades to support the bypass fan blades, here also together of a common axial height and each of a constant axial height along blade radial extent.

In another aspect, the invention provides a gas turbine engine having a compressor disk, including radial-flow compressor blades defining a centrifugal compressor, that is coplanar with a turbine disk that has radial-flow turbine blades defining a radial inflow turbine. A radial diffuser, a combustor, and radial turbine inflow turbine vanes are configured with the coplanar disks. Here the engine has a thickness of less than about 1 centimeter. The invention further provides a similar configuration for a combustion power generator having one or two rotary fuel pumps that are coplanar and a radial diffuser, a combustor, and radial inflow turbine vanes that are configured with the coplanar rotary pump disks. A generator is provided, here having a generator rotor defined by the turbine and having stator electrodes defined by conducting regions located on a generator endwall opposite the turbine disk and interconnected to define a stator excitation configuration of at least one excitation phase. Pump motors are provided for the rotary fuel pumps, with motor rotors defined by the fuel pumps and having stator electrodes defined by conducting regions located on a generator endwall opposite the fuel pump disks.

There are many applications for the gas turbine engines of the invention, in some cases providing a superior replacement for existing, more conventional devices, and in others, embodying new capabilities enabled by the engines' designs and operational characteristics. For example, compared to the best conventional batteries, the gas turbine engine can produce twenty times the power and energy for the same weight and volume. The engine provides a power source that can be employed in a wide range of portable electric power applications such as portable electronic and communication devices, heaters, coolers, and other such applications. Arrays of gas turbine engines provided by the invention can be employed together as well. The gas turbine engines of the invention can also be employed as a source of thrust for propulsion and control of air vehicles, and arrays of engines can be used for propulsion and thrust.

Other features, advantages, and applications of the invention will be apparent from the following description and accompanying figures, and from the claims.

BRIEF DESCRIPTION OF THE DRAWINGS

FIGS. 10A–C are a plan view and two cross-sectional views, one taken at B–B' and the other at C–C' in FIG. 10A, respectively, of a planar micro-electric gas turbine engine in accordance with the invention;

FIGS. 11A–D are a plan view and three cross-sectional views, one taken at B–B', one taken at C–C', and one taken at D–D' in FIG. 11A, respectively, of a micro-space power engine in accordance with the invention;

FIGS. 15A–B are side views of an experimental microcombustor and pressure vessel employed for testing a microcombustor provided by the invention;

FIGS. 18A–B are a cross sectional and a forward plan view, taken at B–B' in FIG. 18A, respectively, of a microturbine provided by the invention;

FIGS. 24A–B are a cross-sectional view and a plan view, taken at B–B' in FIG. 24A, respectively, of a micromotor-compressor in accordance with the invention;

FIGS. 25B–C are two plan views, taken at B–B' and C–C' in FIG. 25A, respectively, of support plates in the microturbine-generator of FIG. 25A;

FIGS. 26A–B are perspective views of a turbine rotor, rotor blades, and guide vanes in the microturbine-generator of FIG. 25A;

FIGS. 29A–C are cross-sectional views of a fabrication process in accordance with the invention for manufacturing a planar, micro-electric gas turbine engine in accordance with the invention;

DETAILED DESCRIPTION OF THE INVENTION

Figure 1:
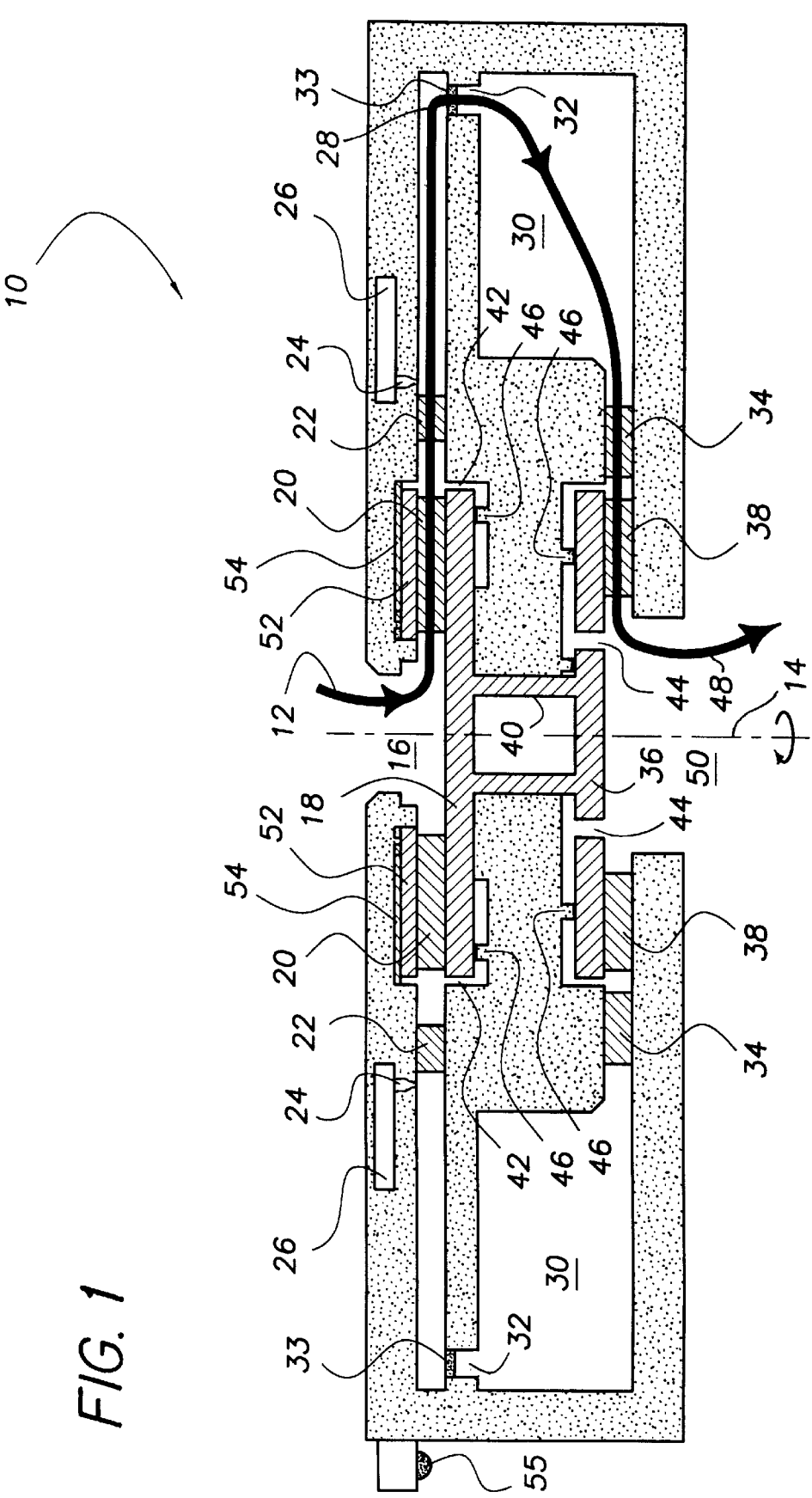
FIG. 1 is a cross-sectional view of a micro-gas turbine engine in accordance with the invention.

The present invention enables realization of a wide range of microturbomachine componentry for producing sources of power, propulsion, and thermodynamic cycling that achieve high component efficiencies at sizes on the order of microns to millimeters. Microcompressors, microcombustors, microturbines, micro-heat exchangers, micropumps, and other microcomponentry described below are provided by the invention as thermodynamic micromodules that can be interconnected in various combinations to construct microthermodynamic cycles such as micro-gas turbine engines, micro-gas turbine generators, and a wide range of other thermodynamic cycles for, e.g., heating, cooling, propulsion, circulation, and other applications in the regime of microns to millimeters.

The microturbomachinery of the invention is dependent on fabrication of precise microstructures capable of operation at high temperatures and at high material stress levels. While the names and general functions of the microturbomachinery of the invention are similar to that of conventional large scale turbomachinery, the specific design, operation, and manufacturing details of the microturbomachinery and microthermodynamic systems provided by the invention are quite different from those of conventional components and systems. This results from both the inherent changes in physical processes at small sizes and the material requirements for producing corresponding componentry. In the invention, micromachining techniques are employed to produce very high precision microturbomachine componentry using techniques adopted from semiconductor processing. Beyond the precision enabled by this microfabrication processing, the economy of scale of microfabrication batch-processing results in the ability to very cost effectively produce large quantities of microturbomachinery and microturbomachinery assemblies.

The following discussion will first present the design of a micro-gas turbine engine as an example system that can be produced with the microturbomachinery provided by the invention. Alternative system designs and configurations will then be presented, along with a discussion of the wide range of system applications. Specific designs for the enabling microturbomachinery will then be described. Fabrication, assembly, and packaging techniques for the microturbomachinery and assemblies will then be presented.

Micro-gas Turbine Engine

The micro-gas turbine engine of the invention includes an assembly of a microcompressor, microcombustor, microturbine, and micronozzle flow system that together form a micro-embodiment of the classic Brayton cycle engine. The micro-gas turbine engine includes microbearings to support the rotating machinery, a fuel system to supply and meter fuel and ignite the microcombustor, and an integral electric motor to start the engine and which can be adapted to function as a generator for producing electric power.

In one example micro-gas turbine engine in accordance with the invention, the overall engine assembly is about 12 mm in diameter and about 3 mm in thickness, and employs an air inlet with an area of about 1 mm$^2$. The assembly, which can be packaged in a volume of less than about one cubic centimeter, can be operated in accordance with the invention to produce about 10–30 watts of power. As will be discussed in detail below, this high level of performance, in combination with small size, addresses many portable, modular, and distributed power applications.

Referring to FIG. 1, in operation, air 12 enters the micro-gas turbine engine 10, hereafter also called the microengine, axially along the centerline 14 of the microengine inlet 16, turns radially outward, and is compressed in a centrifugal, planar microcompressor. Only one discrete air path 12 is illustrated for clarity, but it is to be understood that a continuous air path exists around the circumference of the microengine through the various components.

The microcompressor includes a compressor rotor disk 18 that is, e.g., about 4 mm in diameter and that has radial-flow rotor blades 20 of a height of, e.g., about 250 $\mu$m. The compressor rotor disk 18 is connected to a shaft that is radially journalled, as described below, for spinning, whereby the compressor rotor disk and blades supported by the shaft are spun. Specific compressor rotor geometries will be presented later in the discussion. Stationary diffuser vanes 22 are located just beyond the radial periphery of the compressor rotor. Air passing through the compressor rotor blades exits the rotor with a large angular momentum that is removed by the vanes in the diffuser and converted to a static pressure rise.

Fuel is injected at the discharge of the compressor rotor 18 by way of a fuel injector 24 formed of a circular array of, e.g., about 100–200 fuel metering orifices on the microengine housing. The injected fuel mixes with the air while flowing radially outward. The fuel injectors are supplied by, e.g., an annular supply plenum 26 that is connected to an external fuel tank, described and illustrated below. A valve between the fuel tank and supply plenum is preferably employed to modulate fuel flow as requested by the operator; this fuel metering control will also be illustrated and described in more detail below.

The air-fuel mixture traverses a diffuser region and then turns 28 through about 90° to axially traverse a periphery of small holes, the combuster inlet ports 32 that define flameholders, provided in the region between the ports. Combustion igniters 33, e.g., resistive heaters controlled to the auto-ignition temperature of the air-fuel mixture, are located at a number of the combustion inlet ports to initiate combustion of the air-fuel mixture. The ignited mixture axially enters an annular microcombustion chamber 30 where the mixture is fully combusted. The microcombustion chamber is, e.g., between about 2 mm–10 mm in annular height, i.e., difference between outer and inner diameters, and between about 0.5 mm–5.5 mm-long axially.

Expanding exhaust gases from the microcombustion chamber are discharged radially inward through stationary turbine guide vanes 34 to a planar radial inflow microturbine rotor formed of a rotor disk 36. The turbine rotor disk diameter can be substantially similar to that of the compressor rotor disk and like the microcompressor, includes axial blades 38 of a height similar to those of the compressor rotor. The turbine disk 36 is connected by way of the journalled shaft 40 to the compressor disk 18 and thus rotationally drives the microcompressor in response to combustion gases exhausted through the microturbine blades that cause the turbine disk to spin.

The microturbine is exhausted radially inward, where the exhaust gas then turns 48 axially, leaving the microengine through an exhaust nozzle 50. The turbine rotor disk can be configured to operate as a microgenerator rotor, as described in more detail below, for driving power electronics that in turn drive some electrical load.

The shaft 40 between the microcompressor and microturbine is preferably hollow, and is supported on radial gas bearings. The bearings are supplied by an air bleed 42 from the microcompressor exit. Correspondingly, the shaft bearing air discharges through holes 44 in the microturbine. Seals 46 on the back sides of the compressor and turbine rotor disks are provided to reduce leakage, meter the bearing air, and form balance air pistons that balance some of the axial force on the wheels to reduce the axial force that must be accommodated by the gas bearings.

The microengine can be started by, e.g., a micromotor that is in accordance with the invention provided as an integral component of the microengine, and that cooperates with the microcompressor. In one example configuration, such a micromotor is configured with a rotor formed of a tip shroud 52 mounted on the compressor rotor blades 20 and a stator consisting of radial electrodes 54, connected into, e.g., two or more phases, and located on the microengine housing. The gap between the compressor tip shroud/rotor 52 and the stator electrodes 54 is preferably about a few microns and also serves as a front thrust bearing of the compressor rotor. An electrical lead connection 55 is provided for electrical connection of the micromotor to external circuitry for control of microengine start-up. Specific details of the micromotor and a corresponding microgenerator provided in accordance with the invention will be described below.

Figure 2:
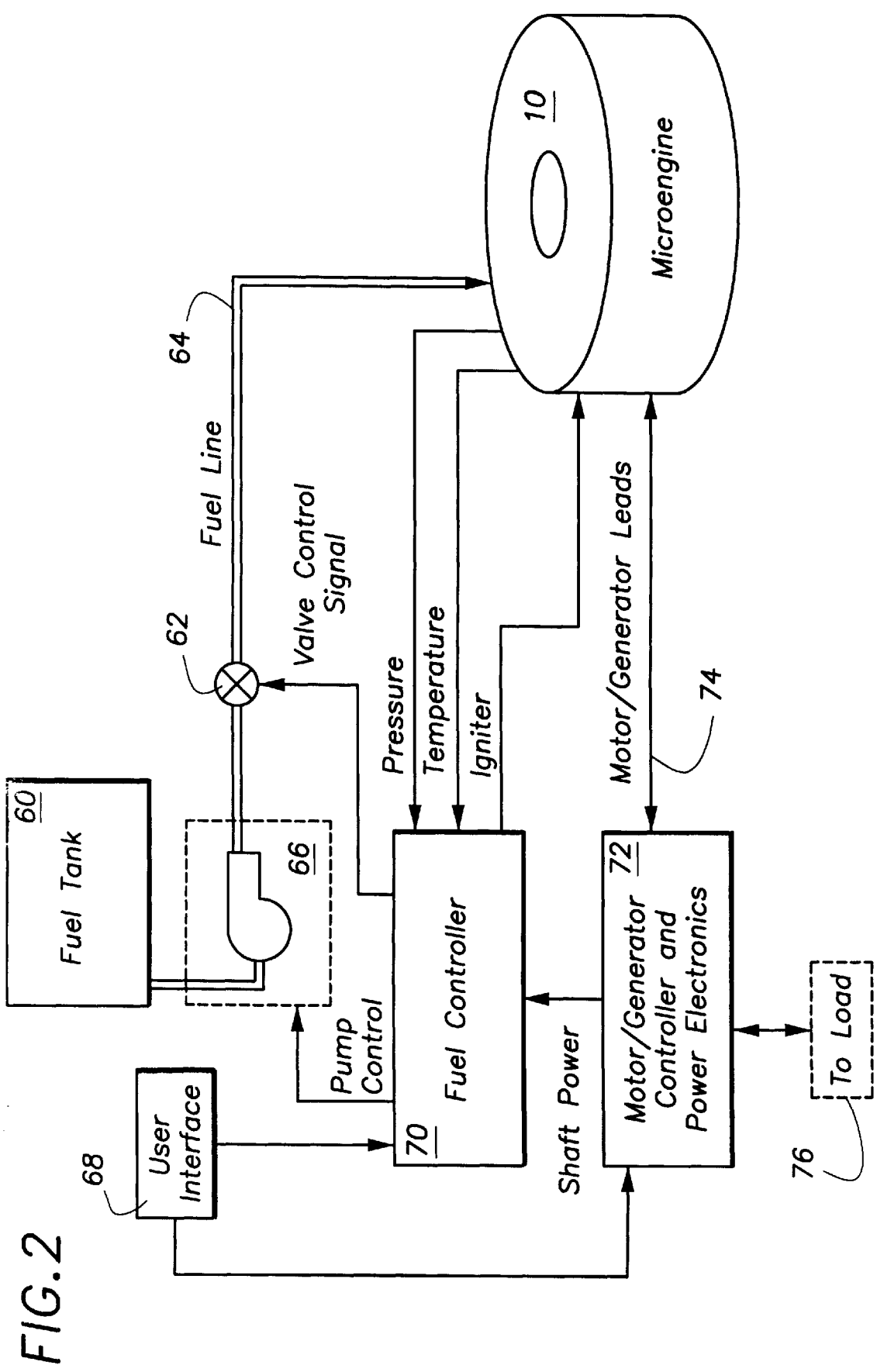
FIG. 2 is a schematic diagram of auxiliary and control subsystems for operation of the micro-gas turbine engine of FIG. 1.

Referring now to FIG. 2, there is schematically shown the interconnection of external circuitry with the microengine, and there is further shown the auxiliary systems provided to form a complete microengine system. A fuel system is provided, including a fuel tank 60, fuel valve 62, and interconnecting fuel line plumbing 64 between the valve and the fuel supply plenum (26 in FIG. 1). The fuel tank size is set by the operating time requirements of a given application of the microengine, and preferably, can contain, e.g., between about 5 ml–5000 ml of liquid engine fuel. Preferably, the fuel tank is pressurized to more than at least about twice the microcompressor discharge pressure in order to isolate the fuel supply system from perturbations in microengine pressure, thereby reducing microengine unsteadiness. The fuel control valve 62 can be microfabricated as part of the engine, as described below, or produced as a separate component. For liquid fuel engines, the fuel tank must be pressurized or alternatively, a fuel pump 66 is preferably employed. A suitable fuel pump consists of an electric micromotor-driven turbomachine; specifically, a suitably scaled-down version of the micromotor and centrifugal compressor, with the blade shapes optimized for this application. Many alternative pump designs can also be employed.

As explained earlier, the compressor rotor can be spun up to starting speed by the starter micromotor. Start-up of the microengine requires three coordinated actions, namely, spinning of the compressor rotor up to ignition speed, provision of the energy needed to ignite the fuel, and start-up of the fuel flow. A small auxiliary battery (not shown) can be employed, in conjunction with a starter motor, described later, to enable this start-up. Because the turbine and compressor rotors are integrally connected, the microturbine can be employed to spin the compressor rotor by feeding high pressure gas, from, e.g., a storage bottle or chemical gas generator, into the microturbine inlet.

Whatever compressor rotor start-up technique is employed, energy must be controllably provided to the microengine ignitor to start the fuel-air chemical reaction of the combustor. In an example configuration, resistive heaters, described in detail in the fabrication discussion below, function as the ignitors 33 of FIG. 1 and are positioned at the combustor inlet ports (32 in FIG. 1). A fuel controller 70, shown in FIG. 2, is connected to these ignitors for initiating fuel burning. The ignitor temperature is preferably maintained above the autoignition temperature of the particular fuel being used, e.g., above about 1000° K for a hydrogen-air fuel mixture, during the engine start-up. Alternative to resistive heaters, a spark ignitor can be employed in the combustion inlet ports. The ignitor can be turned off once the microengine is operating.

The external circuitry system enables timing and feedback control of fuel delivery to the microengine. Beyond control of microengine start-up, the control system enables controllable, reliable engine operation over a wide range of operating conditions and loads, and guards against rotor over-speed and over-temperature conditions. A user interface 68, e.g., a computer, can be permanently or temporarily interfaced with the system for inputting desired operational parameters and monitoring system performance. The user interface is connected to the fuel controller 70, which also accepts input from a motor-generator controller and corresponding power electronics 72. If the microengine is configured with a microgenerator, the motor/generator controller and power electronics are also connected to the electrical load 76 being driven by the power electronics.

The fuel controller can be electronic, pneumatic, hydraulic, or other suitable configuration for scheduling appropriate fuel flow and correspondingly administering control of the fuel valve 62 and fuel pump 66, if included, based on input of power into/out of the power electronics, engine inlet pressure, and compressor discharge temperature or pressure, using conventional fuel control algorithms. The microcompressor exit temperature is monitored by way of, e.g., resistance ignitors or similar sensors, and the microengine inlet and microcompressor pressures are monitored by way of pressure sensors. Conventional semiconductor diaphragm-based pressure sensors can be fabricated integrally with the microengine, e.g., on the engine housing adjacent to the diffuser, or fabricated separately and later mounted. The parametric monitoring electronics for the controllers can be embodied as a computer or customized hardware, and accordingly, the fuel controller 70 and starter/generator controller 72 can be integrated.

When combined with auxiliary and control systems, the micro-gas turbine engine is a complete power production system. Depending upon the application, additional componentry, e.g., intake air and fuel filters, external insulation, and an exhaust gas-ambient air mixer, among other components, can be added to reduce the exhaust gas temperature and achieve other operational performance goals.

An example microengine having the dimensions described in connection with FIG. 1 can produce between about 10–30 watts of power while consuming about 7–8 grams per hour of gaseous hydrogen fuel. At this operational level, the shaft supporting the compressor and turbine disks rotates at about 2.7 million RPM to produce a microcompressor pressure ratio of between about 4–5:1 while pumping about 0.2 grams per second of air. The microcombustor exit temperature for this operation is about 1600° K. The specific power and fuel consumption levels that can be achieved by this microengine design are about 150 watts per gram per second of air flow and about 0.27 grams per hour of fuel per watt. An alternate microengine configuration employing a recuperator, as described later in the discussion, enables exchange of heat between the microturbine exhaust and microcompressor discharge and can reduce the fuel consumption per watt of the above design by about 50%.

Figure 3:
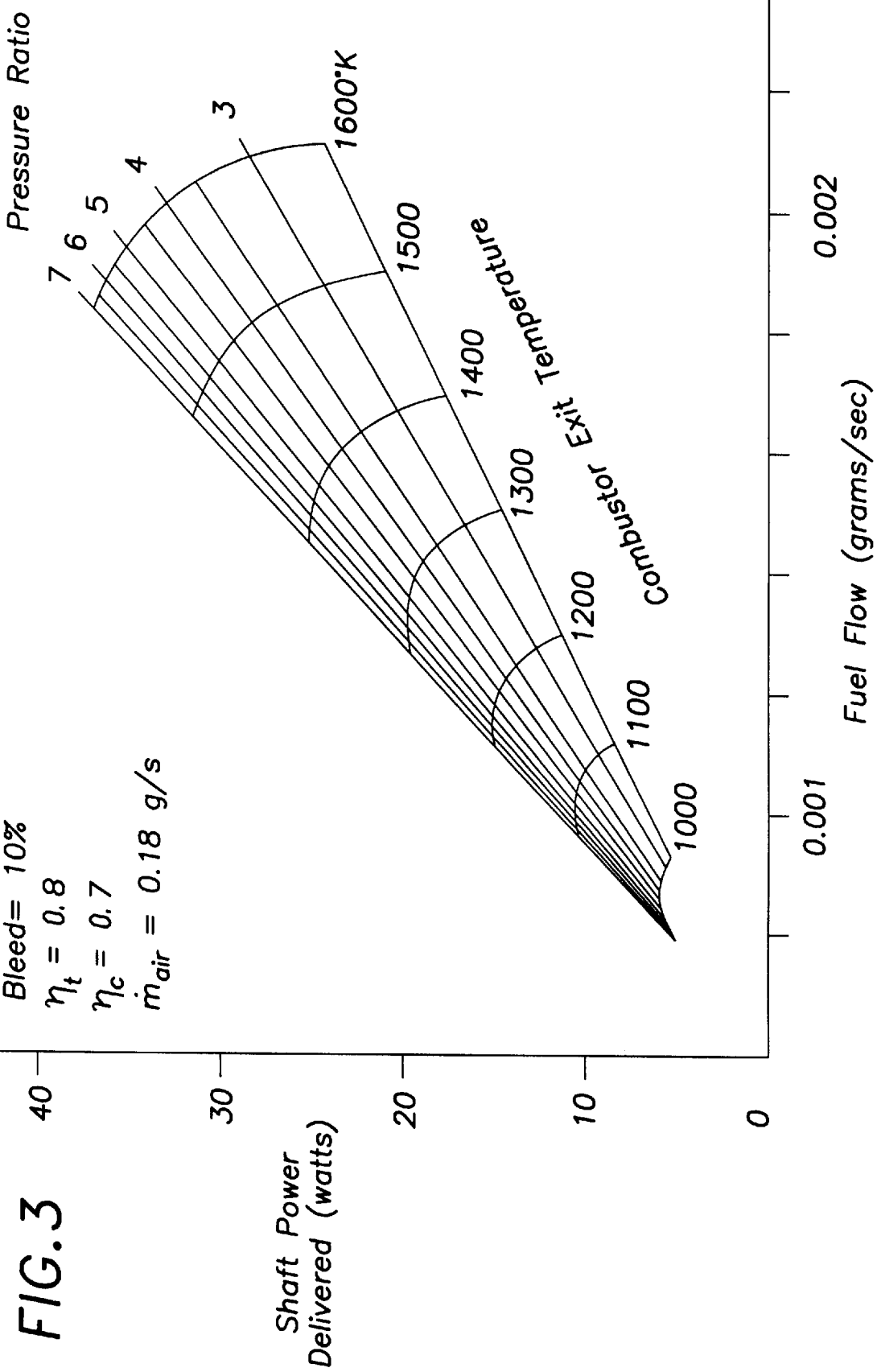
FIG. 3 is a plot of micro-gas turbine engine shaft power delivered as a function of fuel flow, for various microcombustor exit temperatures and pressure ratios, in accordance with the invention.

The specific design parameters of the individual microengine components determine the corresponding power output and fuel consumption of a given microengine design. FIG. 3 shows the correspondence between microengine power output and fuel consumption for various microcompressor pressure ratios and microcombustor exhaust temperatures. The design of a particular microengine can be set based on these correspondences to optimize the microengine for a specific application. For example, combustor temperature, and correspondingly, power output, can be traded for extended microengine life. In general, increasing the microcompressor pressure ratio improves fuel economy and power, while increasing microcombustor exit temperature increases power output.

Straightforward scaling of the microengine by changing the compressor rotor blade height to vary the air mass flow, or by geometric scaling of the overall design, can be accomplished to yield power outputs in the range of about 1–100 watts, as will be recognized. As the microengine size is scaled down, the fuel consumed per watt of power produced will increase due to viscous flow scaling effects. Increase of the pressure ratio to improve this performance can achieved, however, by turning the microcompressor and microturbine faster, or by adding one or more additional microcompressor stages. Note that these specific performance levels are comparable with those of conventional, small gas turbines characterized by production of 100's of kilowatts of output power.

Compared to conventionally-sized gas turbine engines, the thrust-to-weight ratio of the microengine of the invention is many times higher due to cube-square scaling and the high strength-to-density ratio of the preferred microengine materials; refractory and microelectronic materials are preferably employed, as explained in detail later in the discussion. Indeed, the microengine design illustrated in FIG. 1 is characterized by a thrust-to-weight ratio of about 30:1, compared to about 12:1 for the best large-scale military engines, and about 5:1 for large civil transport engines. Furthermore, a microengine that is adapted to accommodate increased air flow and pressure ratio can achieve thrust-to-weight ratios of about 100:1. The superior thrust-to-weight ratio of the microengine arises because the engine power scales with the air mass flow, which is proportional to engine in-take area, i.e., the square of the linear dimension; engine weight scales with volume, the cube of the linear dimension. Thus, the power-to-weight ratio increases linearly as engine size is reduced.

The microengine of the invention provides other advantages over conventional gas turbine engines. For example, the microengine is characterized by an extremely rapid start-stop time, on the order of about hundreds of microseconds, due to the low moment of inertia of the microturbomachinery. This low moment of inertia enables control of the microengine with an unconventional scheme, namely, pulse width modulation. In this scheme, the microengine is controlled to deliver only part power to the load by rapidly varying the on-off duty cycle of the engine at a speed that is too fast for the load to respond. This corresponds to cycling the microengine between a full-on and full-off state many times per second. Throttling of a conventional large-scale engine with this thermodynamic cycle results in excess fuel consumption because the fuel consumed per watt increases at part power for such engines. In contrast, the low moment of inertia of the microengine enables the microengine to be operated either at peak efficiency or be off; and thus results in lower fuel consumption.

In addition, the microengine is characterized by a level of emitted pollutants, e.g., the pollutant $NO_x$, that is about $\frac{1}{100}$ that of large engines per unit power. Pollutant emission from the microengine as a function of unit weight of fuel burned is reduced by this large factor due to the reduced time that fuel spends at high temperature in the combustor, about $\frac{1}{10}$ that of a conventional engine, and the reduced peak temperature required in the microengine.

Turning now to materials considerations for the microengine, in general, structural materials must be selected based on the same criteria as that for conventionally-sized engines, with additional considerations for changes in physical properties in the micron regime and microfabrication processing limitations. Basic selection criteria for jet engine materials include strength, strength-to-density ratio, modulus, chemical resistance, e.g., oxidation tendency, creep, creep rupture, high cycle fatigue, thermal conductivity, thermal expansion, fabricatability, and cost. The relative importance of these parameters depends on the nature of the specific engine component for which their use is intended, e.g., rotating or stationary component functions, and location within the engine, i.e., location within the compressor, combustor, turbine, bearings, or other subsystem. Conventionally-sized engines typically employ a variety of materials to maximize performance and minimize weight and cost. The relative importance of these various considerations is different for the microengine of the invention because fabrication considerations dictate many of the parameters that can be realized in the microengine as a practical matter.

Considering specific engine materials, refractory ceramics such as silicon carbide (SiC) and silicon nitride ($Si_3N_4$), as well as silicon, all characterized as microelectronic materials, are ideal materials for gas turbines because of their high strength-to-density ratio, high thermal conductivity, and good oxidation resistance. In particular, a high strength-to-density ratio is preferred to enable rotor speeds of at least about 500,000 RPM. The use of these materials in conventional engines has been limited, however, by their characteristic brittleness, which introduces a requirement for critical flaw-free fabrication, the difficulty of which scales with the mass of a given engine part.

The inventors herein have recognized microfabrication techniques that can enable the precise manufacture of nearly flaw-free microengine parts to overcome the practical limitations of these refractory ceramics that are characteristic at macrosizes. The low mass of the micro-scale microcomponentry designs of the microengine further reduces these limitations. As a result, the structural components of the microengine can be fabricated as a practical matter entirely from SiC or $Si_3N_4$ with coatings layers of electrical semiconductors and conductors as needed for proper electrical operation and chemical reactivity. SiC is preferred as a structural material. Advantageously, both SiC and $Si_3N_4$ have characteristic properties that accommodate requirements of both the hot and cold sections of the microengine and further, a unitary microengine structural material system eliminates interface problems common to multiple material systems.

Other materials and combinations of materials can be employed for the microengine, however. At relatively low burner temperatures, e.g., below about 1200° K, a microengine produced either partially or entirely of silicon componentry is feasible, as is combination silicon-silicon carbide or silicon nitride systems. For example, structural silicon microcomponentry can be coated with a relatively inert material, e.g., a $Si_3N_4$ coating, for improved oxidation resistance. Given the much more extensive microfabrication and micromachining technology base that now exists for silicon compared with other materials, silicon is the microengine component material of choice when temperature limitations and chemical compatibility are not issues.

Considering other microengine materials, alumina is an attractive microengine component material that can accommodate burner temperatures higher than that accommodated by SiC or $Si_3N_4$ Alumina is less resistant to thermal shock than these materials, but thermal shock is not a serious concern for the microengine, given the small size of its components. Keeping this limitation in mind, however, there are many applications for which alumina will be preferred. Refractory metals and metal alloys such as those based on nickel, iridium, rhenium, tantalum, and niobium, are also suitable materials and are attractive because of their strength and oxidation resistance. Microfabrication processes, such as chemical vapor deposition processes (CVD), are generally established for these materials, making them particularly attractive from a manufacturing perspective. Intermetallic compounds, such as molydmium silicide, can also be employed.

As can be readily understood, the wide range of materials considerations for a given microengine application will dictate a preferred material or material combination. The fabrication process description presented later in the discussion will further highlight specific materials considerations and suitable alternatives.

Micro-gas Turbine Electric Micromotor and Microgenerator

As explained above in connection with start-up of the microengine, a starter micromotor can be integrally configured with the microengine by employing the compressor rotor as the micromotor rotor. Similarly, the microengine can be configured as a microgenerator by employing the compressor or turbine rotor as the microgenerator rotor. These two configurations are operational embodiments of a common micromotor/microgenerator configuration, herein after referred to as a micromachine, that is provided in accordance with the invention as a micro-electric power system.

Figure 4A:
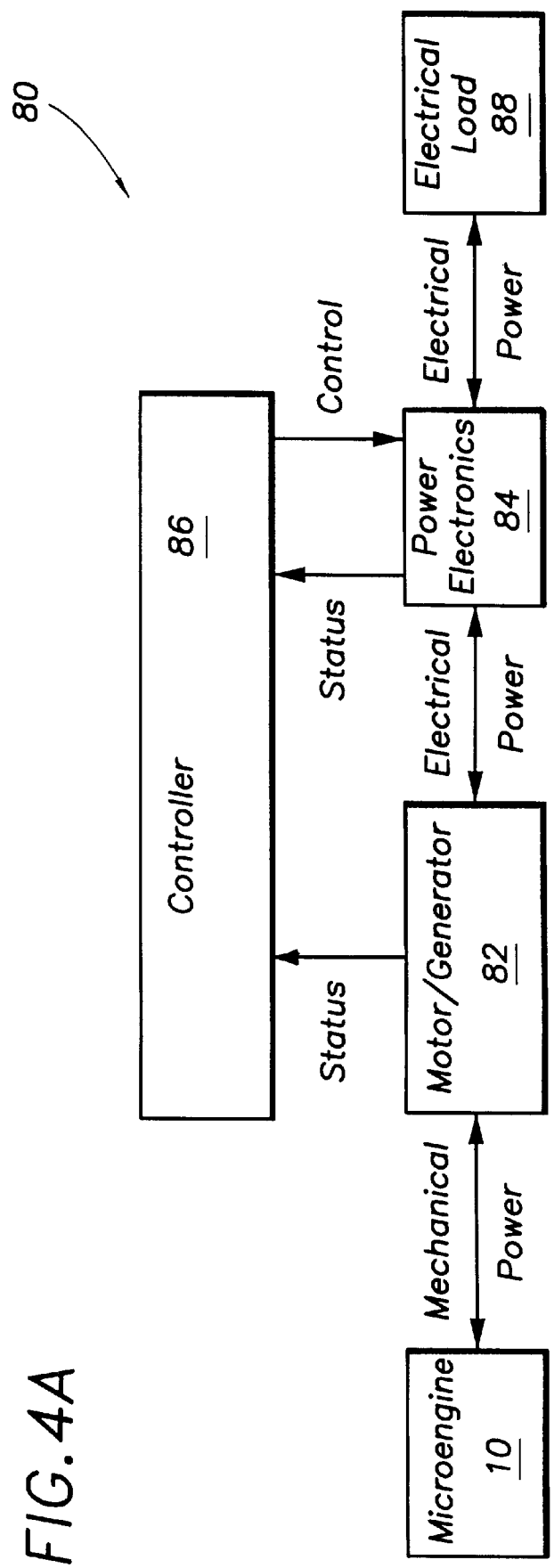
FIGS. 4A–C are schematic diagrams of control and discharge circuitry for operation of an electric micromachine system, an electric micromachine system configured for a microgenerator, and an electric micromachine system configured for a micromotor, or combination micromotor/microgenerator, respectively, in accordance with the invention.

Referring to FIG. 4A, this micro-electric power system 80 includes the microengine 10, the electric micromachine 82, configured with the microcompressor and/or the microturbine, power electronics 84 for exciting the micromachine, a controller 86, and the electrical load 88. This micro-electric power system 80 can be controlled to convert mechanical energy to electrical energy, in which case the micromachine is operated as a microgenerator and energy flows from left to right in the diagram, with the load here characterized as a positive load, i.e., energy sink, or the system can be controlled to convert electrical energy to mechanical energy, in which case the micromachine is operated as a micromotor and energy flows from right to left in the diagram, with the load here characterized as a negative load, i.e., energy source. Throughout the following discussion, the corresponding load polarity for a given micromachine operational configuration is to be assumed.

In principle, the micromachine can be configured either as electric or magnetic in character. Conventional, macro-scale generators in operation today are typically magnetic because the power density of macro-scale magnetic generators greatly exceeds that of macro-scale electric generators. At the micro-scale, however, magnetic and electric power densities are comparable. Based on this consideration, an electric microgenerator/micromotor configuration is preferred for the micromachine, particularly because the microelectronic materials from which a micro-electric machine can be constructed are much more compatible with microfabrication and high-temperature, high-frequency operation than are the materials from which a micro-magnetic machine could be constructed. In this spirit, there are two types of micro-electric machines that are considered preferable, namely, electric induction and variable-capacitance micromachines. Based on an analysis of both micromachine types, a micro-electric induction micromachine is preferred because an electric induction machine is simpler to fabricate, and can generally out-perform a comparable variable-capacitance micro-electric machine, from an electromechanical viewpoint. In addition, control of an induction microgenerator does not require rotor motion feedback to ensure good generator performance, whereas the control of a variable-capacitance microgenerator does require rotor position feedback, which is a significant complication. It is to be here recognized, however, that the invention is not limited to this specific micromachine and that other electric, as well as magnetic, micromachines are contemplated by the invention.

Figure 5:
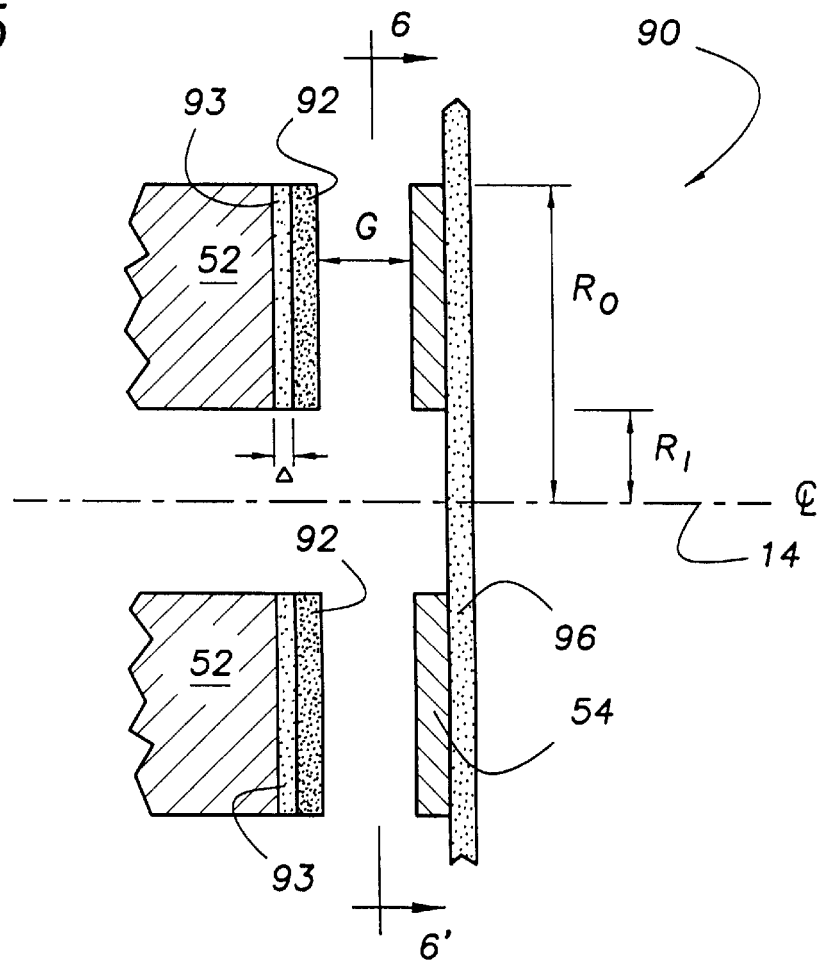
FIG. 5 is a cross-sectional view of micromachine rotor and stator electrodes adapted on the micro-gas turbine engine of FIG. 1.

Considering now an embodiment of the micromachine, one example configuration s in accordance with the invention is schematically illustrated in FIG. 5. The electric induction micromachine 90 takes the shape of a planar annulus, shown in side view in the figure. The micromachine rotor is in one example fabricated on the tip shroud 52 of the microengine compressor or turbine, and its stator is fabricated on the opposing stationary endwall 96, e.g., as described and illustrated in connection with FIG. 1 above. Shown in more detail here, the active part of the micromachine rotor is formed of, e.g., a thin homogeneous conducting layer 92 deposited on the surface of the compressor. or turbine rotor blade shroud 52 to form a conducting rotor. The shroud structure is preferably otherwise insulating; if due to manufacturing constraints the shroud is conducting, then an insulating layer 93 of a thickness, $\Delta$, of, e.g., at least about 10 $\mu$m, is preferably deposited on the shroud prior to the conducting layer 92. An air gap, G, separates the conducting rotor 92 from segmented stator electrodes 54, which are formed from a thin deposited layer of a conducting material, preferably a good conducting material, in an annular region on the inside of the microengine housing 96 in correspondence with the rotor. It is to be recognized that other micromachine rotor configurations, e.g., use of unshrouded rotor blades, or the rotor disk aft face, can be employed based on a selected micromachine embodiment.

Figure 6:
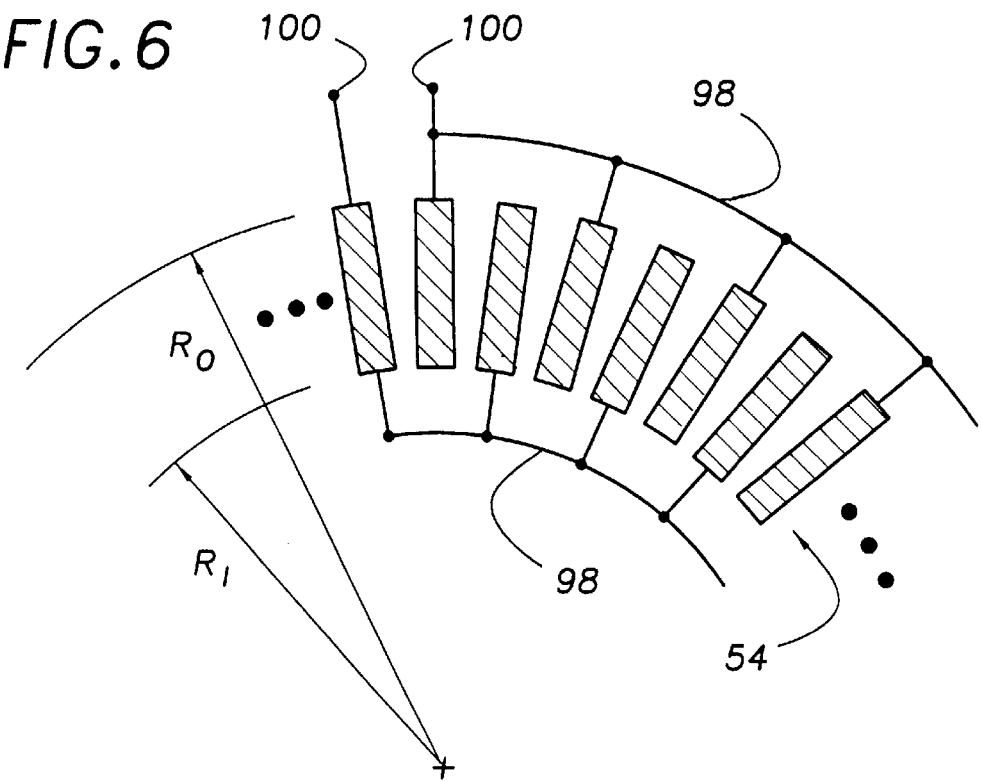
FIG. 6 is a plan view of the microgenerator stator electrodes of FIG. 5.

Referring also to FIG. 6, an end view of the stator electrodes 54 is shown along section 6–6' in FIG. 5. The total number of stator electrodes can vary between, e.g., one and two hundred electrodes, which is more than is shown in the figure. The stator electrodes are connected by way of electrical interconnectors 98 to configure a number of stator phases, e.g., one, two, or three phases, which are individually electrically excited by the power electronics of the micro-electric power system with balanced voltages which vary, e.g., sinusoidally or as square waves, in time, as is conventional. In one example configuration, as shown in the figure, a one-phase configuration is produced with the stator electrode interconnections 98, as might be preferred for a micromachine embodiment configured to operate only as a microgenerator; two or more phases are required for operation as a self-starting micromotor. The electrode interconnections also provide generator terminals 100 that are connected to the power electronics and controller.

In operation of the electric induction micromachine, application of a sinusoidal or square wave voltage waveform to the stator electrodes by the power electronics in the direction of the rotor rotation creates a traveling potential wave around the stator electrodes. If the velocity of this wave exceeds that of the rotor, then the micromachine acts as a micromotor. If the velocity of the rotor exceeds that of the traveling wave, then the micromachine acts as a microgenerator. If the velocities are equal, then the excitation is said to by synchronous with the rotor velocity and no power passes through the micromachine; it is here neither a micromotor nor a microgenerator.

For both generating and motoring behavior there is an excitation frequency at which the power output, electrical in the case of the microgenerator and mechanical in the case of the micromotor, is maximized. These frequencies are generally within a few percent of the synchronous frequency, and depend both on the rotor speed of the micromachine, and hence the speed of the microengine, as well as the rotor conductivity. Beyond these frequencies the power output falls to zero. Thus, the excitation frequency is preferably limited to between the characteristic synchronous frequency of a given micromachine configuration and the frequency of maximum electrical power output during generating operation, and between the characteristic synchronous frequency and the frequency of maximum mechanical power output during motoring operation. Control of the output power can then be exercised by varying the excitation frequency between these limits.

Like magnetic induction generators, electric induction generators are known to be capable of electrical self excitation. Further, an electric generator need only have one excitation phase, whereas an electric motor generally requires two or more excitation phases to self start. Because of these differences, a micromachine and its power electronics are preferably constructed differently depending on their intended function with the microengine. If the micromachine is to act only as a microgenerator, then the preferred implementation involves a single-phase micromachine, as shown in FIG. 6, and resonant power electronics which make use of the self-excitation capabilities of the machine. Otherwise, a three-phase machine and different power electronics are preferred.

Figure 4B:
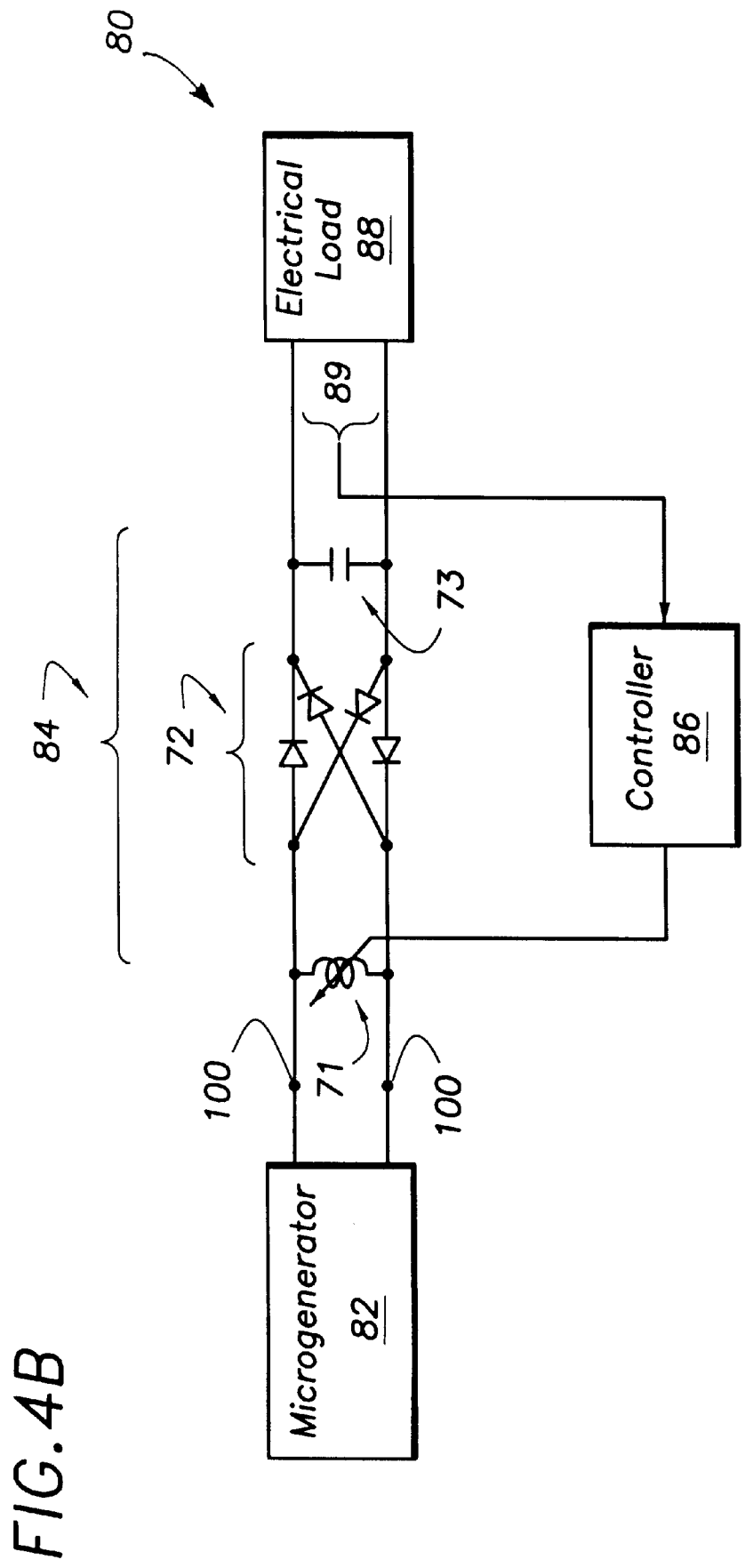

FIG. 4B is a diagram of the electrical components of the micro-electric power system 80 for the case in which the micromachine acts solely as a microgenerator. In this system, an inductor 71 in parallel with microgenerator 82 resonates with the microgenerator and its inherent negative conductance to form a self-excited resonant circuit. It is assumed here that thermal noise is sufficient to initiate the process. Alternatively, a low-voltage battery could be used for initiation, after which it could be switched out with a transistor once the excitation process has begun. The nominal value of the inductor 71 is chosen so that the resonant frequency is the frequency needed to excite the microgenerator so as to produce maximum electrical power output.

Following the resonant circuit is diode bridge 72, capacitor 73, and the electrical load 88. The a diode bridge 72 rectifies the alternating voltage at the terminals 100, and the capacitor 73 filters its ripple so as to present a constant voltage to the load 88. As the power requirements of the load 88 vary, the generator power output must vary correspondingly so that the voltage supported by the capacitor 73 remains constant. This is accomplished by the controller 86 by sensing the voltage 89 across the load and correspondingly varying the value of the inductor 71; a simple proportional-integral controller is sufficient for this purpose. Since the value of the inductor 71 controls the resonant frequency of the microgenerator and inductor, and hence the excitation frequency of the microgenerator, it can be used to shift the excitation frequency away from or toward the frequency of maximum power output, and hence to regulate the power output and load voltage.

There are several ways in which the value of the inductor can be varied. One way is to employ several different parallel inductors that are switched in and out with transistors. A second way is to employ a saturable inductor whose apparent inductance is controlled through a bias current by the controller 86. In fact, two parallel inductors with biases having equal amplitudes but opposing signs can be employed to preserve the symmetry of operation. A third way is to employ a single inductor with taps which are selected with transistor switches.

In one example microgenerator configuration in accordance with the invention, the resonant frequency is about 10 MHz, the inductor 71 has an inductance of about 16 $\mu$H, the voltages at the generator terminals are about a 400-V sinusoids with opposing signs so that the voltage across the terminals is an 800 V sinusoid, the voltage 89 at the load is about 800 V, and the capacitance of the capacitor 73 is about 1 nF. The size of the inductor is about 1 cm by 1 cm by 0.5 cm, with the capacitor size being about the same. The diode bridge is much smaller, as is the controller. The controller can be implemented as a simple an op-amp, which is quite small.

In some applications, it may be preferable to combine a transformer (not shown) with the inductor to lower the terminal voltage and raise the circuit current for accommodating diodes and transistors that may not optimally perform under selected frequency and voltage conditions.

Figure 4C:
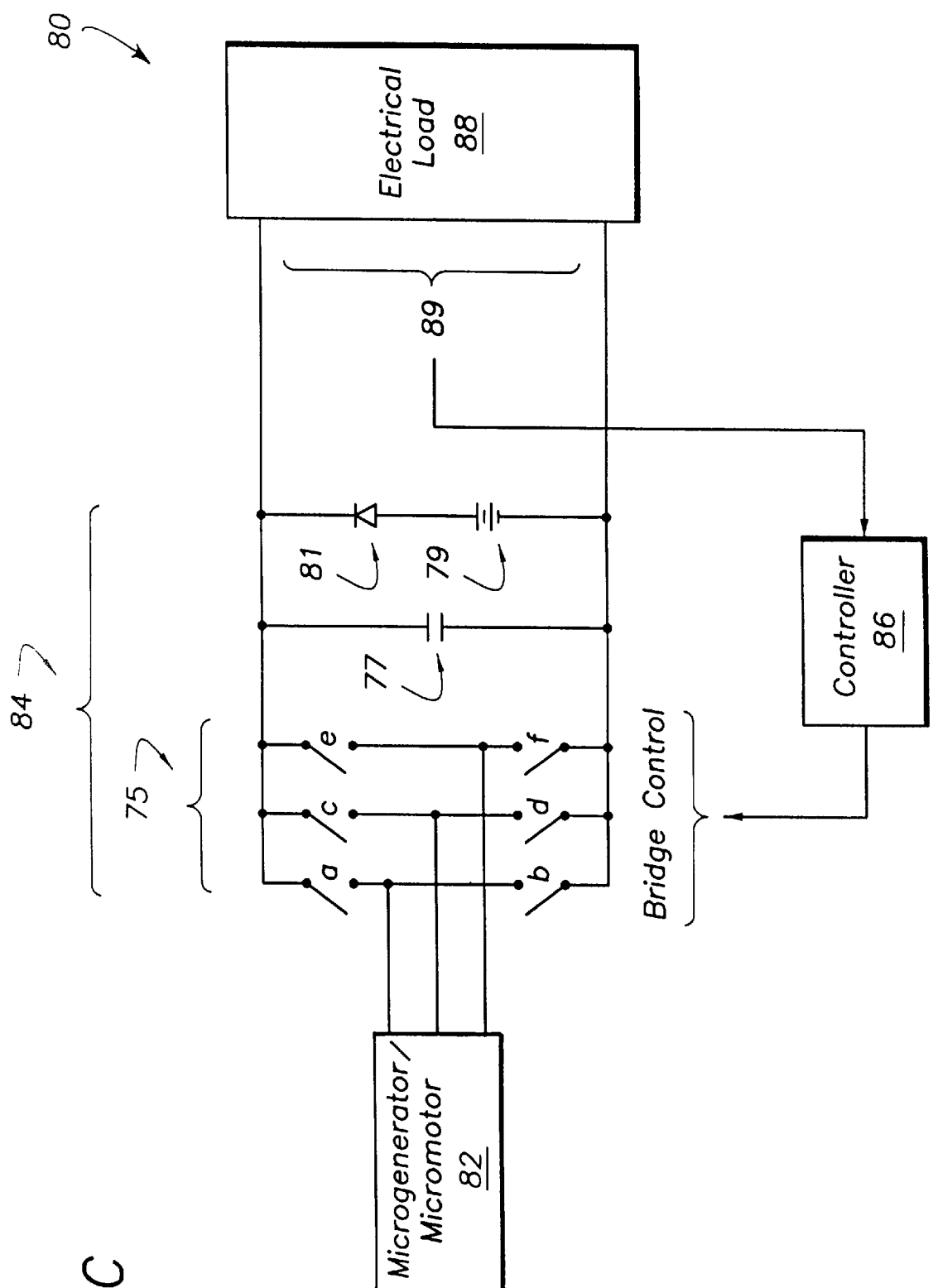

If the micromachine is configured with the microengine to operate as a micromotor or as a combination a micromotor/microgenerator, then the micro-electric power system 80 of FIG. 4C is preferred. As shown in the diagram, micromotor/microgenerator 82 is here connected to a bridge 75 of bidirectional switches a–f, which is in turn connected to a capacitor 77 and the electrical load 88. The switches can be constructed in the conventional manner from transistor-diode combinations. Note that the micromotor/microgenerator is here configured as a three-phase machine. The switches 75 are turned on by the controller 86 in a corresponding three-phase pattern ade/adf/acf/bcf/bce/bde over one excitation cycle. The frequency of the excitation cycle determines whether the micromachine acts as a motor or generator, and is chosen by the controller so as to regulate energy flow as described above. Note that the bridge operates so as to excite the three-phase microgenerator with properly-phased alternating square wave voltages, as well as to present the capacitor 77 and the electrical load 88 with a nominally direct voltage.

In a manner similar to that described above in connection with FIG. 4B, the measured voltage 89 is fed back to the controller 86 for operation of the power electronics to be properly adjusted so as to meet the particular power demands of the electrical load 88 when the micromachine 82 is operated as a generator. These demands can be met by adjusting the excitation frequency of the microgenerator by the bridge 75.

The capacitor 77 performs the same ripple filtering function as that described in FIG. 4B. A low-voltage battery 79 and a diode 81 are used to initiate microgenerator operation if the system is idle for a sufficient time that the charge on the capacitor is drained to zero. Once operation has begun, the diode 81 becomes reversed biased, and the battery becomes disconnected from the remainder of the power system. Finally, the battery can also be used to power the controller 86, and preferably is sized for that purpose.

In one example micromotor or combination micromotor/microgenerator configuration in accordance with the invention, the capacitance of the capacitor 77 is about 1 nF, the voltage at the load 88 is about 800 volts, the voltage at the three generator terminals are 3-phase 400-volt square waves with respect to neutral (the average voltage of the three), and the battery voltage is about 5 volts. Both the bridge and the controller can be small. Preferably, optically isolated transistors are used in the transistor bridge for simplicity of high-side drive.

In a manner similar to that of the microgenerator configuration, in some applications, it may be here preferable to include a three-phase transformer (not shown) between the micromotor/microgenerator and the bridge to lower the terminal voltage and raise the circuit current for accommodating diodes and transistors that may not optimally perform under selected frequency and voltage conditions.

Whether operating as a micromotor or a microgenerator, the controller 86 of the micro-electric power system tracks and controls the stator electrode excitation frequency to attain a desired power level. As explained above, the controller sets the excitation frequency so that the corresponding potential wave travels around the electrodes at a rate slower than that of the rotor for generating operation, and at a rate faster than that of the rotor for motoring operation. This frequency is a function of both rotor speed and conductivity and the rotor conductivity is in turn a function of rotor temperature.

Because the speed and temperature of the rotor cannot be easily measured, it is preferred that these parameters be tracked indirectly by the controller. In one example tracking scheme in accordance with the invention, the controller varies the micromachine excitation frequency on a periodic basis. If the variation is found to yield an increase in power, and if increased power is desired, then the variation is maintained, and the next variation is in the same direction; otherwise, the variation is rejected, and the next variation is in the reverse direction. As can be recognized, this control scheme is but one example of many and the invention is not limited to any particular control.

Considering this control scheme further, if the conductivity of the rotor is too small, then too little charge will be induced on the rotor during the period of excitation to produce the desired power. Conversely, if the conductivity of the rotor is too large, then the rotor motion will be unable to effectively sweep the excitation charge away. In either case, the micromachine power output is suboptimal. Consequently, it is preferred that relatively precise control of the rotor conductivity as a function of shroud temperature be achieved. However, small variations in rotor conductivity can be accommodated by the controller by periodically varying the frequency at which the micromachine is excited, as just explained.

Given a realistic set of assumptions, the maximum power, P, that the micro-electric induction generator can deliver is given approximately by:

$$P = \frac{\pi^2 \varepsilon_o V E (R_o^2 - R_i^2) F}{2(1 + \varepsilon_R * G/\Delta)}, \quad (1)$$

where $\varepsilon_o$ is the permittivity of free space, V is the maximum voltage with respect to the neutral in the sinusoidal or square wave voltage pattern applied to the stator electrodes, E is the maximum electric field strength in the air gap, G, between the rotor and stator, F is the maximum frequency at which the power electronics can excite the generator, $R_o$ and $R_i$ are the outer and inner radii, respectively, of the rotor and stator electrodes, as defined in FIGS. 5 and 6, and $\varepsilon_R$ and $\Delta$ are the relative permittivity and thickness, respectively, of the insulating layer under the rotor conductor. Note that the rotor-stator gap electric field, E=V/G.

Given the microengine geometry and specific compressor rotor disk diameter described above in connection with FIG. 1, the generator rotor and stator outer and inner radii, $R_o$ and $R_i$, are about 2 mm and about 1 mm, respectively. Further, from a practical viewpoint, it is necessary to limit the magnitude of the excitation voltage, V, to about 400 V, the rotor-stator gap field, E, to about $10^8$ V/m, and the excitation frequency, F, to about 10 MHz. Substitution of these parameters into relation (1) above, assuming an insulating layer thickness and relative permittivity of about 10 $\mu$m and about 4, respectively, yields an ideal output electrical power value of approximately 21 W, which can be regarded as an upper limit to the power of the example micro-electric induction generator.

In accordance with the invention, it is possible to increase the area of the microgenerator and thus its output power, by various means, in addition to employing better materials. For example, one or more additional generators can be configured to operate in parallel with the first generator, concomitantly increasing the maximum output power of the resulting generator system. Such additional generators can be supported on various microengine rotors, e.g., the back of the compressor and/or turbine rotors, or supported by separate rotating disks located along the shaft or outboard of the compressor. Alternatively, the outer radius of the generator can be increased beyond that of the microcompressor or microturbine tip shroud. Given a constant generator rotor tip speed, the maximum output power scales linearly with radius.

In principle, the efficiency of both the micro-electric induction generator and its power electronics can be made to approach 100%, and 95% efficiency for each component is realistic. However, the total microgenerator system efficiency can in some cases be limited by losses in the interconnections between the generator and the power electronics. Further, the parasitic capacitance of those interconnections can store energy that must generally cycle through the power electronics, thereby increasing the electronics losses. Carefully chosen interconnect geometries and resonant power electronics that minimize such losses are thus preferably employed, as is conventional, to limit their impact.

Recuperated Micro-gas Turbine Engine

The micro-gas turbine engine and microgenerator described above can be adapted with a recuperation configuration. In general, an engine recuperator, also known as a regenerator, is a heat exchanger that transfers thermal energy from the engine's turbine exhaust fluid back to the engine's compressor discharge air. This thermal energy feedback loop reduces the overall fuel flow required to heat air by combustion to the desired turbine inlet temperature, and thus improves the engine fuel consumption. The use of a recuperator with the micro-gas turbine engine can reduce its fuel consumption by about a factor of two and by more than about a factor of two when operated at part power. A recuperator-heat exchanger introduces an air flow pressure drop in both the cold and hot heat exchanger side flows, which slightly reduces the output power of the engine below its un-recuperated output power; for example, the micro-gas turbine engine output power is reduced by about 15% with the use of a recuperator. This small power drop is in most cases well-traded, however, for the large improvement in fuel economy enabled by the recuperator.

In conventionally-sized gas turbine engines, typical recuperators are large, heavy, complex, and expensive; they are therefore usually justified only when engine efficiency concerns are paramount, e.g., as in ground-based power plants, or when part power fuel economy is a major concern, e.g., as in ground vehicle gas turbines. For a microengine application, however, there is relatively little penalty for recuperation because the heat exchanger design scales favorably as its size is reduced, and equally importantly, the heat exchanger geometry is well-suited to microfabrication and integration with the microengine design and manufacture.

Figure 7A:
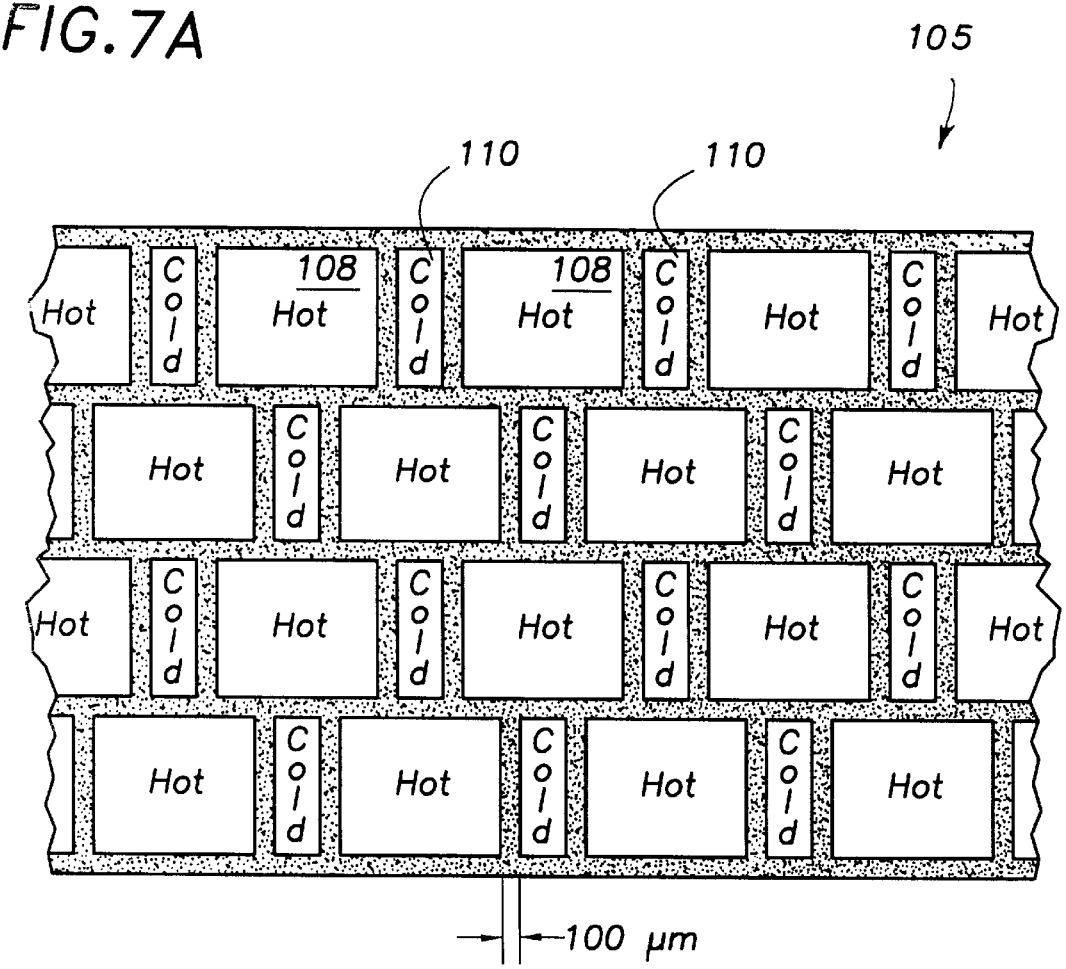
FIG. 7A is a cross-sectional view of a micro-heat exchanger provided by the invention.

Referring to FIG. 7A, an example recuperator-heat exchanger 105 for the micro-gas turbine engine is illustrated in cross section. The micro-heat exchanger is of an annular, radial geometry, counter-flow design having hot flow passages 108 and cold flow passages 110 both of rectangular cross section. Cold fluid introduced to the cold flow passages 110 flows inward, while fluid introduced to the hot flow passages 108 flows outward. The outer diameter of the heat exchanger preferably corresponds to the microengine diameter, e.g., being about 10 mm in diameter; and the inner diameter preferably corresponds to the microengine exhaust diameter, e.g., being about 2 mm. The hot and cold side flow can be arranged in alternating layers, or in alternate passages in the same layer, as shown in the figure. Given the dimensions of the microengine and heat exchanger, the passage wall thickness is preferably between about 50–100 $\mu$m. With this configuration, the hydraulic diameters of the hot and cold passages are about 290 $\mu$m and about 60 $\mu$m, respectively.

Figure 7B:
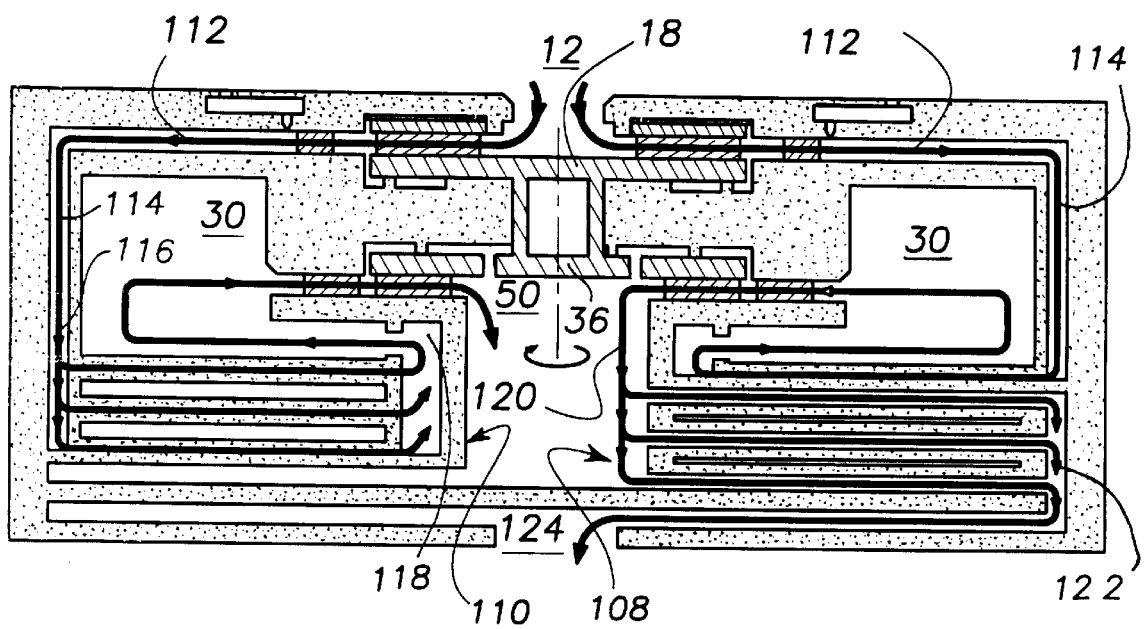
FIG. 7B is a cross-sectional view of a recuperated micro-gas turbine engine in accordance with the invention.

Referring also to FIG. 7B, a micro-heat exchanger is incorporated into the microengine by way of passages between the microcombustor 30, the microturbine exhaust 50, and hot and cold flow passages. Specifically, hot flow passages 108 are configured in communication with the relatively hot microturbine exhaust 50 and cold flow passages 110 are configured in communication with the relatively cold microcompressor exhaust 112. The hot and cold flow passages are shown on separate sides of the figure cross section for clarity, but it is to be understood that they are alternately layered as channels in a continuous fashion around the microengine circumference.

In operation, input air flow 12 passes through the microcompressor via the blades of the compressor rotor 18, and at the microcompressor exit 112 the air is mixed with injected fuel, in the manner previously described. The air-fuel mixture then traverses the diffuser region and turns 90° from radial to axial to flow axially through an outer annular passage 114 located at the radial periphery of the microcombustor. This relatively cold air-fuel mixture 116 then flows radially inward through the cold flow recuperator channels 110 to an inner annular collection header 118, then flowing axially forward to enter the microcombustor 30.

At the same time, relatively hot microturbine exit gas 120 flows radially outward through the hot flow recuperator channels 108, during which time heat is transferred from the exit gas to the air-fuel mixture 116 that is flowing radially inward through the cold flow recuperator channels 110. The cold air-fuel mixture is thereby heated to just below the air-fuel autoignition temperature before entering the microcombustor 30. After traversing the hot flow channels 108, the microturbine exhaust gas is collected in an outer annular collection header 122. The collected exhaust gas can then either exit the microengine radially out of the header, if no engine thrust is desired, or alternatively, turn 90° to flow axially toward the aft end of the microengine and exit through either an annular nozzle or through a centerline nozzle 124, as shown.

As will be recognized, many other recuperation configurations can be employed with the microengine of the invention. In one such alternative configuration, the micro-heat exchanger is located adjacent to the core microengine with channels connecting the two. This configuration trades area for thickness and complexity of fabrication process steps. In this case, the thickness of the micro-heat exchanger walls is preferably adjusted to coincide with the structural dimensions of the core microengine to further simplify design and manufacture. In another alternative recuperator configuration, the micro-heat exchanger is located about the outer periphery of the microengine, with hot and cold recuperator channels being oriented parallel with the microengine centerline and correspondingly connected between the microturbine and microcombustor. This configuration increases the microengine's overall diameter, but reduces the overall microengine thickness and manufacturing complexity.

Micro-gas Turbine Bypass Engine

The micro-gas turbine engine of the invention can be adapted to optimize its operation for propulsion applications and specifically for flight propulsion. As can be readily understood, it is preferable that requirements of interest of a particular propulsion application be considered in such an adaptation to maximize the conversion of microengine power to propulsive thrust, the so-called propulsive efficiency, and thus to optimize the microengine fuel consumption for the desired propulsive thrust.

In general, using a jet engine for flight propulsion, as the ratio of engine exhaust velocity to flight velocity drops, the engine's propulsive efficiency increases but the engine's produced thrust decreases. In order to eliminate this thrust decrease, the air mass flow rate of the engine must be correspondingly increased. This is accomplished conventionally with a so-called bypass or turbofan engine configuration employing the use of a so-called fan that is actually a low pressure ratio compressor, which pumps excess air around the engine, bypassing the engine core, to increase the total engine air flow. The fan is typically driven by either the same engine turbine that powers the engine compressor, in a so-called single-spool configuration, or by a second turbine in series with the first, in a so-called multi-spool configuration.

Turbofan engine designs are characterized by their bypass ratio, that is, the air mass flow which bypasses the compressor divided by the air mass flow which traverses the compressor. The optimum bypass ratio for a given engine is a function of flight conditions and engine component performance characteristics. A turbojet engine, like the microengine of the invention, may be considered a turbofan with a bypass ratio of zero. This is the optimal cycle for supersonic flight. Most modern engines optimized for subsonic flight have bypass ratios in the range of 1 to 9.

Figure 8:
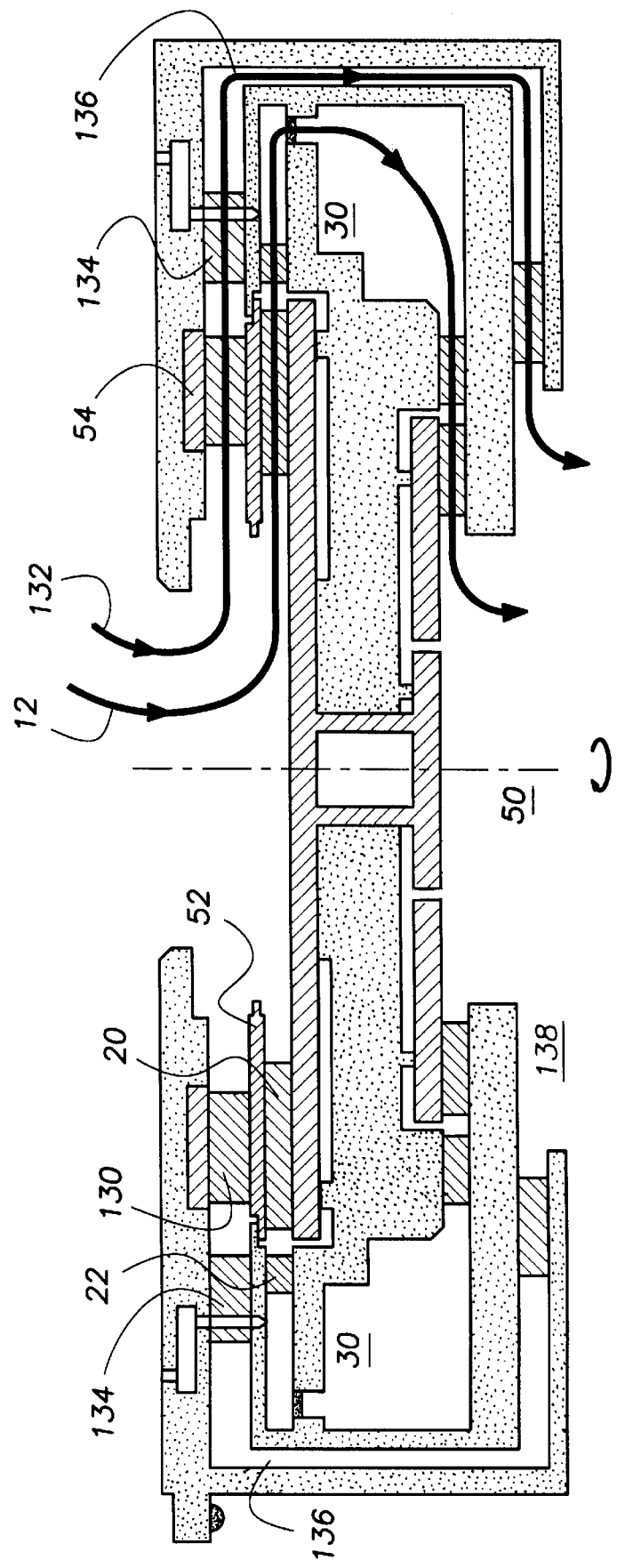
FIG. 8 is a cross-sectional view of a bypass micro-gas turbine engine in accordance with the invention.

Referring to FIG. 8, there is shown an example configuration of a single-spool micro-gas turbine bypass engine in accordance with the invention. In this configuration, fan blades 130 are mounted to the tip shroud 52 of the engine compressor rotor blades 20. The added fan blades 130 act as a low pressure ratio centrifugal microcompressor. A starter motor/generator is in this case accommodated by employing the added fan blades for the generator rotor in conjunction with stator electrodes 54 as described above.

The microfan requires an increased inlet area compared to the core microcompressor to accommodate its increased air flow. This is accomplished with an increased microcompressor diameter, i.e., increase of the compressor rotor diameter, while maintaining the peripheral microcompressor exit velocity the same as that of the un-bypassed microengine. Increased fan air flow can also be accommodated by increasing the height of the microfan blades 130 to about 60% larger than that of the compressor rotor blades 20. Although the microfan turns at the same speed as the compressor rotor, its pressure ratio is much less, e.g., about 1.4:1 versus 5:1, because of less flow deflection in the fan rotor.

In operation, air entering the bypass microengine takes one of two paths, namely, a core microengine path 12 or a bypass path 132. Air in the bypass path passes through the microfan and radially exits the fan blades 130 and diffuser blades 134 to make a 90° turn, after which it is axially ducted through an outer annular passage 136 around the microengine core. At the end of the annular passage air in the bypass path turns 90° radially inward to exit the microengine through a bypass exhaust nozzle 138. The microfan exhaust can exit through an individual nozzle or alternatively, can be mixed with the microengine exhaust flow to exit through a common nozzle. This second configuration in some cases is preferable because it slightly improves the microengine's propulsive efficiency and reduces the engine exhaust temperature. The inlet to the core microcompressor is through the center of the microfan. Alternatively, the microfan exit air can be ducted radially inward to supply the core microcompressor. This increases the overall pressure ratio and thus microengine performance at the cost of greater complexity.

Air in the core microengine path 12 traverses the microcompressor rotor blades 20, is mixed with fuel in the diffuser, and enters the microcombustor in the manner previously described. The expanded microcombustor exhaust exits the microturbine output 50 at the microengine centerline as described above. With this dual core/bypass air flow configuration, the single-spool micro-gas bypass engine exhibits, at relatively low flight speeds, about six times thrust and ½ the specific fuel consumption, i.e., fuel flow per unit thrust, as the basic micro-gas turbine engine, with the same air flow through the compressor.

A two-spool embodiment of the micro-gas bypass engine employs a freely spinning disk rotatably connected to the rear of the single-spool microengine. The disk is provided with its own bearings, consisting of a radial inflow microturbine on one face and the centrifugal microfan on the other. In this arrangement, the bypass fan air must turn through 180°. As will be recognized, other variations of bypass microengine configurations are possible. In addition, the bypass microengine can be further configured with the micro-heat exchange system described above to produce a recuperated micro-gas bypass engine that attains the advantages of both recuperation and increased air flow rate.

Compacted Micro-gas Turbine Engine

As can be understood from the above microengine description, a wide range of design variations can be accommodated and indeed are contemplated by the invention. In one example design variation, illustrated in FIG. 9, the compressor and turbine rotor disks 18, 36, respectively, are supported by journal bearings 140 on their rims, and by hydrostatic thrust bearings 142 on their faces. This arrangement eliminates the need for a connecting shaft (40 in FIG. 1) between the disks and thus the compressor and turbine rotors are here configured back-to-back, without an intervening shaft, resulting in a compacted microengine core that for some applications can be easier to manufacture. Thermal isolation of the compressor and turbine rotors is provided by, e.g., narrow intra-rotor channels 144 in the integral rotor disk structure.

In this microengine adaptation, a passage 146 is provided from the microcompressor discharge to pressurize the journal and thrust bearings in an alternate bearing configuration. In operation, air from the microcompressor discharge is directed by the passage 146 to the bearing locations. Correspondingly, pressure from the journal bearings is exhausted out of an exhaust passage 148. The microcompressor discharge passage 146 is provided with an additional channel 150 configured in communication with the radial periphery of the intra-rotor cooling channels 144, to enable the relatively cool microcompressor discharge to also be directed to the cooling channels. Aside from this microcompressor discharge technique, the path 12 of air through the microengine core is as described above.

Planar, Electric-Drive Micro-Turbine Engine

Figure 10A:
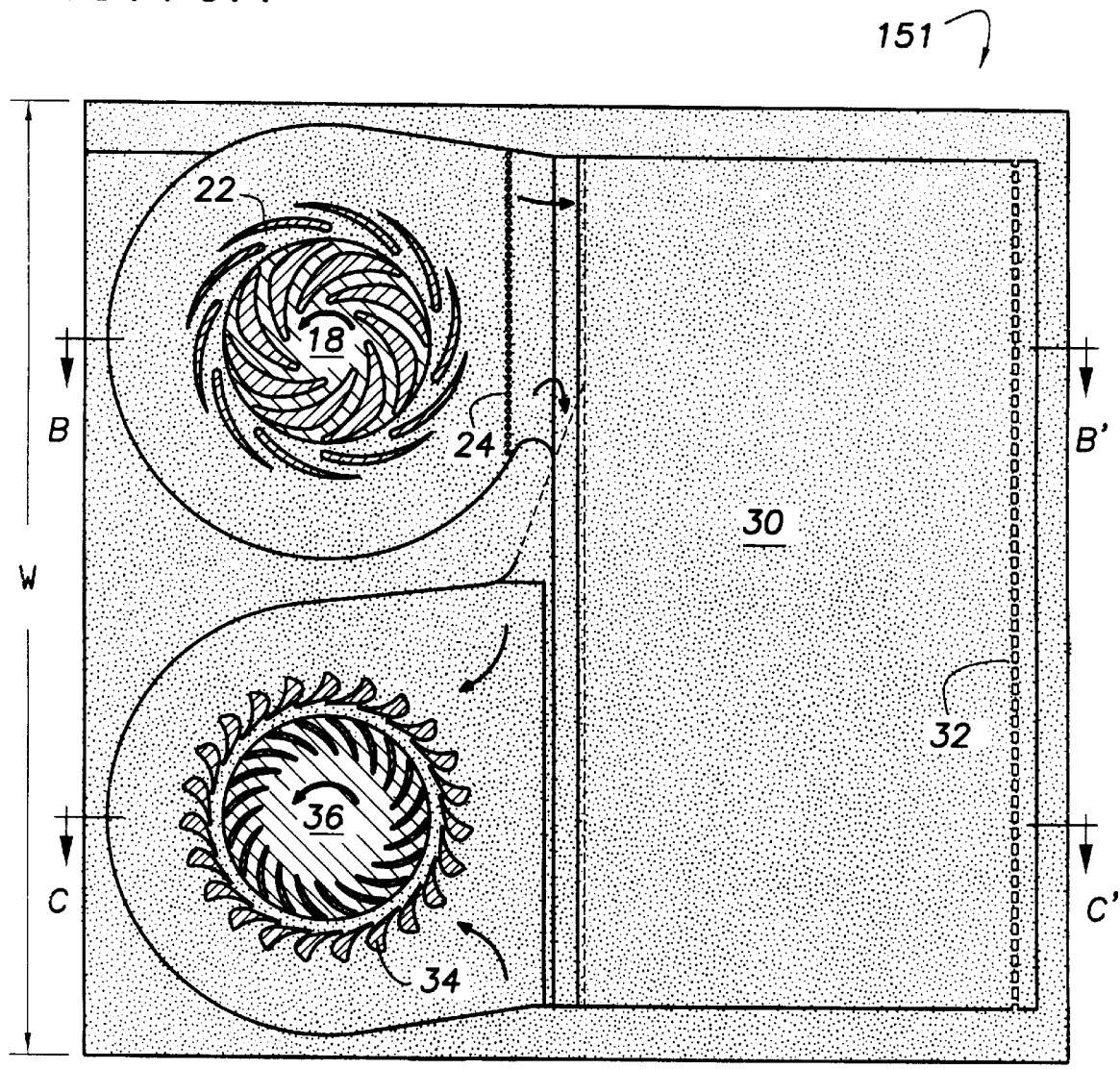

In a more dramatic design adaptation of the microengine, an electric drive mechanism can be employed to enable a planar microengine configuration 151, as illustrated in the top-down view of FIG. 10A. In this design, the compressor rotor disk 18 and turbine rotor disk 36 are disengaged, the shaft connecting the rotors is eliminated, and the rotors are positioned coplanar with each other and with the combustor 30. Referring also to FIGS. 10B and 10C, this arrangement enables a microengine core having a width, W, of, e.g., about 20 mm and a thickness, T, of, e.g., about 1 mm, and no more than about 1 cm, resulting in an extremely thin device.

As shown in the figures, an integral micro-electric motor 54 is provided by way of stator electrodes on the microengine housing, as described earlier, and a rotor defined by the tip shroud 52 on the compressor rotor blades 20. As can be recognized based on the earlier discussion, this motor can also be formed of a rotor defined on the side of the compressor rotor opposite the blades and a stator configuration on the lower housing wall. In either case, the electric motor is employed by the planar microengine to substitute for the microturbine in driving the compressor rotor 18. Air 12 inlet to the microcompressor is exhausted through diffuser vanes 22, after which it is mixed with fuel that is injected through a row of fuel injection orifii 24. The air-fuel mixture is then directed through planar channels 152 peripheral to the microcombustor 30 to a combustor inlet port 32 at the opposite end of the microcombustor. This ducting of the air-fuel mixture around both sides of the microcombustor prior to burning is preferably employed to reduce heat loss from the cycle, given the relatively larger surface area-to-volume ratio of the planar microcombustor configuration. Ignitors (not shown) are positioned in line with the combustor inlet.

The microcombustor 30 is exhausted through microtubine nozzle vanes 34 and through the turbine rotor 36. The microturbine here is configured as the driving source for a microgenerator 156 in the same manner as that of the compressor-generator previously described. Namely, microgenerator rotor, e.g., an electric induction-type generator rotor, is provided by a conducting tip shroud 154 for the turbine rotor blades 38. Generator stator electrodes are provided on the microengine housing in registration with the rotor. The turbine rotor side opposite that of the blades can alternatively or in addition be configured as a microgenerator. A microgenerator electrical system like that described in connection with FIG. 4 can be employed to control the microgenerator. Air is exhausted 50 upward from the microturbine out of the planar microengine. As can be readily understood, a planar microengine auxiliary subsystem like that of FIG. 2 is employed to operate a planar microengine system.

The compressor and turbine rotors of the planar microengine are preferably provided with a bearing system that, like the non-planar microengine, supports both rotors and can be exhausted, e.g., through lower channels 158 at the rotors' peripheries.

The coplanar arrangement of the microcompressor and microturbine used here has the advantage of significantly simplifying the fabrication process over that required to fabricate the non-planar microengine. Indeed, because there are few morphological differences between them, the planar electric motor-compressor and turbine-generator can be fabricated simultaneously, eliminating several process steps. The planar microcombustor can also be fabricated simultaneously with the microcompressor and microturbine.

In addition to simplified fabrication, the planar electric drive offers the advantage of permitting independent variation of the microturbine and microcompressor speeds, thereby enabling optimization of the aerodynamic performance of the components over a wide operating range. Such design flexibility can be exploited for a planar turbofan, bypass microengine arrangement, wherein an electrically-driven fan can be mounted at any convenient location, and can be separately controlled to operate at its optimum speed. As can be readily understood, a micro-heat exchanger configuration can also be added to the planar microengine to realize a recuperated microengine like that described above. In this case, the micro-heat exchanger recuperation channels are located at a suitable position adjacent to the microturbomachinery.

The primary disadvantage of the planar electric drive microengine is the penalty in power output and fuel consumption incurred by the electrical and viscous losses in the generator and motor, compared to microengine configurations with shafts in which this "transmission" loss is essentially zero. Also, a larger generator output is here needed if the microcompressor, in addition to a load, is to be powered by the microturbine-generator.

Figure 11A:
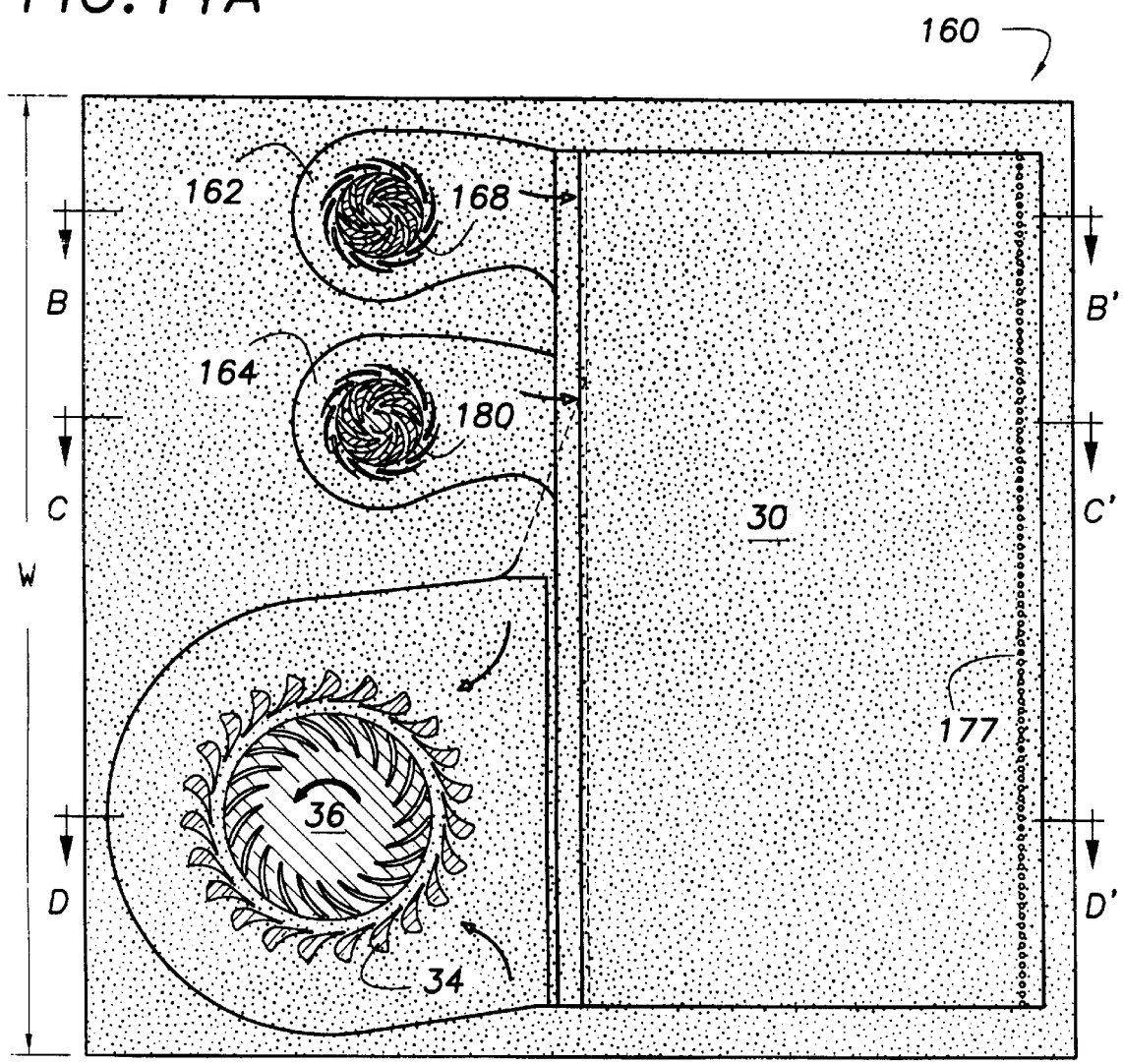

The planar microengine provides a superior design that in an alternate embodiment in accordance with the invention is adapted to produce power in environments in which air is not available, for example, in space and underwater applications. In this micro-space auxiliary power unit 160, illustrated in FIG. 11A, pumps for supplying propellant to the microcombustor are substituted for the microcompressor of the planar microengine. In one example scenario, an oxidizer pump 162 and fuel pump 164 are provided for injecting a liquid oxidizer and a liquid fuel into the combustion chamber 30. This bipropellant combination eliminates the need for compressed air during the combustion event. Advantageously, the microelectronic materials employed in the invention for fabricating the microengine can be employed here for fabricating the micro-space power unit and these materials are generally inherently impervious to a wide range of liquid bipropellants. The dimensions of the micro-space power unit are similar to those of the planar microengine, e.g., having a width, W, of, e.g., about 20 mm, and a thickness, T, of, e.g., about 1 mm.

As shown in FIGS. 11B–11C, in the micro-space power unit, the oxidizer pump 162 includes a pump rotor 166 having blades 168. As with the planar microengine, a motor is formed by rotor electrodes on a tip shroud 170 of the blades for driving the pump. The motor can be electrostatic or electromagnetic in nature, as mentioned earlier; but in this case, consideration of the propellant must also be made. Specifically, unless electrically nonconductive propellants are employed, it is preferable that the motor be electromagnetic in nature; an electrically conductive propellant would cause electrical shorts in an electrostatic motor configuration with the pump.

Oxidizer that is introduced 172 into the oxidizer pump 162 passes around diffuser vanes 174 and is directed to and through a microcombustor cooling channel 176 at the periphery of the microcombustor 30. The oxidizer passes around the microcombustor to be injected at the opposite end 177 of the microcombustor. This arrangement enables cooling of the microcombustor by the pre-combusted propellants.

In a similar configuration, the fuel pump 164 includes a fuel pump rotor 178 having blades 180. A fuel pump motor is formed by rotor electrodes on a tip shroud 182 of the rotor blades 180. As with the oxidizer pump motor, the fuel pump motor is preferably selected based on the electrical conductivity characteristics of the propellants. Fuel that is introduced 184 into the fuel pump 164 passes around diffuser vanes 186 and is directed to and through a microcombustor cooling channel 188 to cool the microcombustor before it is injected into the microcombustor at its opposite end 177.

As shown in FIG. 11D, the microcombustor is exhausted to a planar turbine rotor 36 around turbine guide vanes 34, in a manner similar to that for the planar microengine, for exhaust 50 vertically out of the microturbine. The microturbine can be adapted with a generator configuration 154 to drive an external load and optionally, the propellant pumps.

The invention contemplates adaptation of the micro-space auxiliary power unit with suitable materials to enable utilization of a wide range of propellant combinations, including monopropellants, in which only a fuel is pumped into the unit, and propellants designed for propulsion. Preferably, chemical compatibility is assessed to determine material and coating selection. Example bipropellant combinations include liquid oxygen and a hydrocarbon, such as kerosene or alcohol; liquid oxygen and hydrogen; and nitrogen tetraoxide and hydrazine. Monopropellants, such as hydrazine and hydrogen peroxide, are preferably employed with the addition of a catalyst. A bipropellant configuration is for many applications preferable to enable increased capability for specific impulse, which is the major driver in overall propulsion system mass. Bipropellants are also preferable in that they are relatively safer than monopropellants, such as hydrazine, with their attendant environmental and ground-handling problems.

Figure 11E:
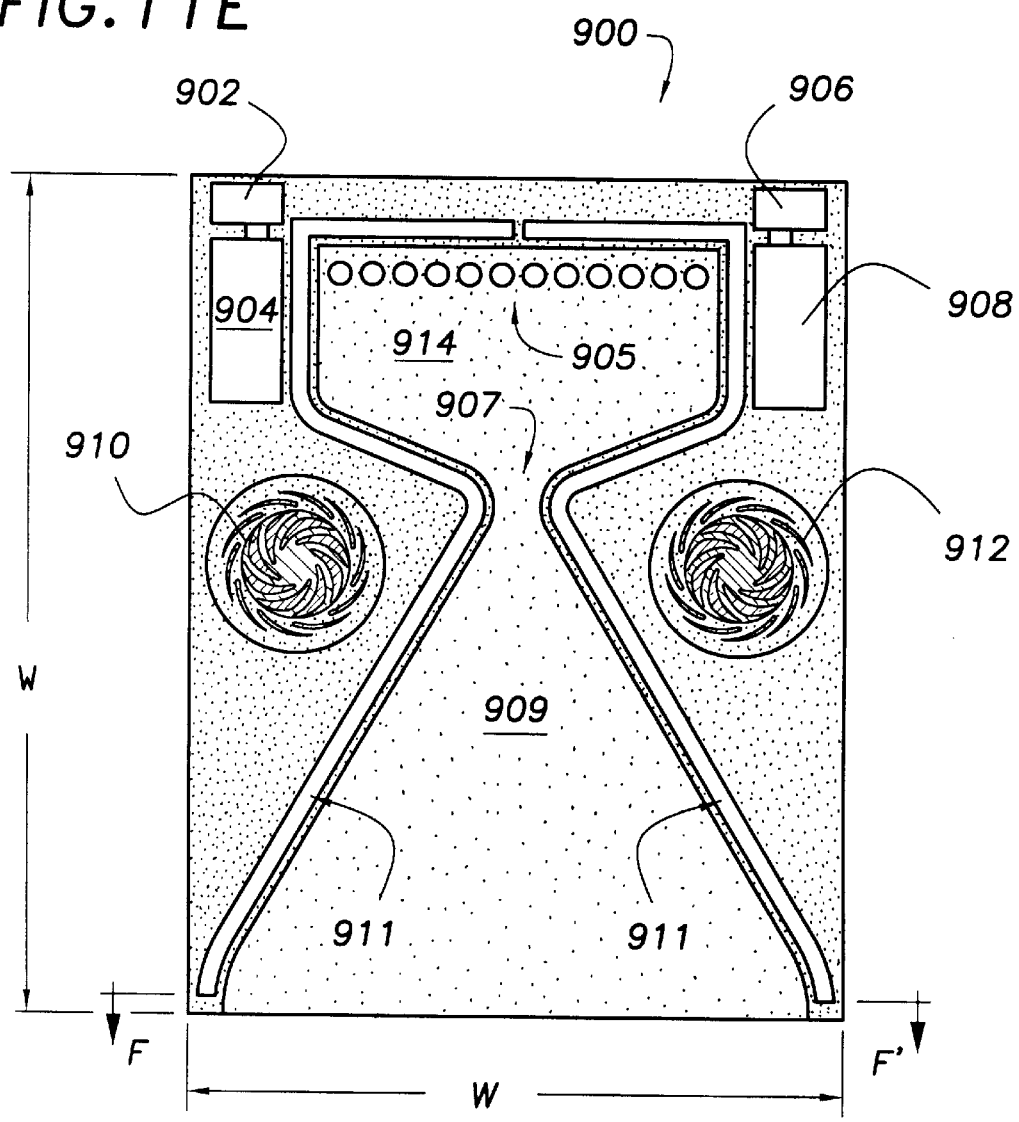
FIGS. 11E–F are a plan view and a cross-sectional view, taken at F–F in FIG. 11E, respectively, of a micro-rocket engine in accordance with the invention.
Figure 11F:
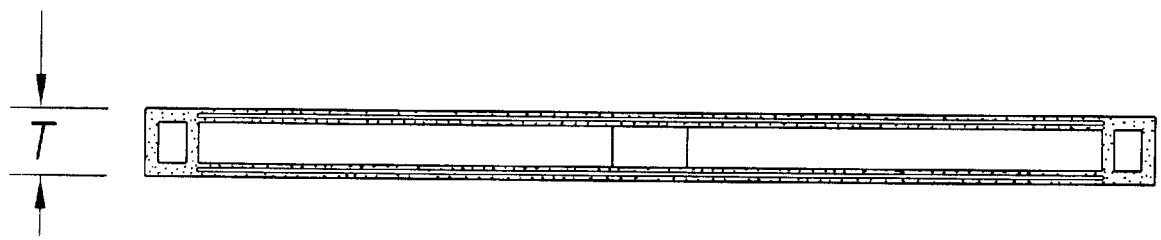

The planar, micro-space auxiliary power configuration of the microengine can be adapted as a microrocket motor. FIGS. 11E–F illustrate one example microrocket motor design 900 in accordance with the invention. This configuration provides a complete bipropellant microrocket motor, including provision for a fuel inlet 902, fuel metering microvalve 904, and fuel injectors 905, and an oxidizer inlet 906, oxidizer metering microvalve 908, and oxidizer injectors 905. Corresponding pumps, i.e., a fuel pump 910 and an oxidizer pump 912, are provided for delivery of the propellants to the combustion chamber 914. Hot gases from the combustion chamber exit through a nozzle throat 907 to the exhaust nozzle expansion bell 909. The chamber, throat, and exhaust nozzle bell are cooled by the propellants as they are circulated through cooling channels 911.

In operation, the liquid propellants enter the microrocket motor housing, e.g., a substrate, and then proceed through their respective metering microvalves 904, 908. These valves provide simple on-off control of the fluid unless variable thrust is required by a given application, in which case the valves can be controlled to provide throttling as well. Upon exiting the microvalves, the propellants are conducted through channels in the substrate to their respective pumps 910, 912, which increase the propellant pressure to about 1–4 times that of the thrust chamber. One or both of the high pressure propellants then is directed to enter the respective cooling channels 911, which surround the combustion chamber, nozzle throat, and expansion bell, in order to ensure the structural integrity of those parts at the very high temperatures typically involved in rocket combustion. This so-called "regenerative cooling" arrangement also captures the heat that would otherwise be lost to the environment without contributing to propulsion; this is of more concern in a micro-scale rocket than a corresponding macro-scale rocket due to the proportionally greater surface area of the micro-scale system.

From the cooling channels, the propellants enter the combustion chamber 914 through many small-diameter injector holes 905 where they mix and chemically react, e.g., burn. For some propellant combinations, an electrical or chemical ignitor can preferably be placed within the chamber to initiate combustion. The hot combustion gases then exit the combustion chamber through the nozzle throat 907 and nozzle expansion bell 909. The geometry of the chamber 914 and nozzle 907 are highly unusual, compared with conventional configurations, in that two-dimensional extruded shapes are employed for compatibility with microfabrication processes.

In the arrangement shown, the length, L, of the microrocket motor is about 16 mm, the width, W, is about 12.5 mm, and the thickness, T, of the microrocket motor is about 1 mm. With this geometry, and using propellants such as nitrogen tetroxide and hydrazine or LOX and a hydrocarbon, those propellants having an Isp of about 300 sec, the microrocket motor produces about 4.5N, or 1 lb, of thrust, while consuming about 1.5 grams per second of fuel; at this operational level, the thrust chamber pressure is about 125 atm and pumping power of between about 10–40 watts is required. This microrocket motor configuration is characterized by a thrust-to-weight ratio of about 1500:1, a figure much superior to the 15:1 ratio for a conventional motor in this thrust range and even the 70:1 ratio characteristic of large engines such as space shuttle main engines.

The microfabrication techniques, described below, and microelectronic materials that are employed to manufacture the microrocket motor restrict the practical upper limit of the microrocket motor size, while microfluid mechanic performance degradation at small sizes, e.g., in the range of hundredths of pounds of thrust, restrict the practical lower limit of the microrocket motor size. In addition, the general microrocket motor features are constrained in their geometry to pseudo two-dimensional features by the inherent planar nature of the microfabrication process. For example, the propellant nozzle expansion area is in-plane, rather than three-dimensional as is conventional. With this constraint, thrust is limited to about 10–20N. Larger thrusts can be obtained if a micro-power head stage, including, e.g., micropumps, microvalves, and microinjectors, is mated to a separate thrust chamber and nozzle, or alternatively, if linear aerospike nozzle geometries are employed. With this arrangement, mass flows of about 50–100 grams per second can be obtained to yield up to about 450N, or 100 lbs, of thrust. This level can be further increased using multiple micro-power head stages configured to feed a common nozzle. Intermediate sizes are also accommodated by the microrocket motor design. For example, a micro-power head, chamber, and throat can be microfabricated separately, thereby taking advantage of the relatively easy regenerative cooling arrangements afforded by the microfabrication techniques, and then mated to an uncooled expansion bell.

The propellant micropumps of the microrocket motor can be adapted to enable higher thrust levels. In one example configuration, the micropumps are turbine-driven in a geometry similar to that of the micro-gas turbine engine, with the turbine and pump rotor sharing a common shaft and bearings. The turbine can be driven by, e.g., a gaseous propellant evaporated in the cooling channels, as in an expansion cycle; by hot gas generated in a separate small combustion chamber, as in a gas generator cycle; or by a hot gas bleed from the main combustion chamber. Alternatively, several smaller electric propellant micropumps can be employed in parallel; this reduces the drive requirements on each micropump to a level that is achievable by the electric micromotor drive. These various components can be fabricated on a single substrate or in a module configuration and indeed, an entire liquid microrocket propulsion system can be fabricated on a single substrate with connections to external propellant tanks.

Considering the impact of material selection on the microrocket motor, preferably, the material selected is amenable to regenerative cooling. The regenerative cooling technique of the microrocket motor is intended to cool the walls to maintain mechanical integrity of the walls. It also provides thermal control and limits excessive heat loss. If silicon is selected as the microrocket motor wall material, then for some applications, a coating of a material such as SiC or $Si_3N_4$ that is relatively impervious to propellants as well as resistant to oxidation may be preferable. Because candidate materials are generally stronger in their microscale configuration than in a corresponding macroscale configuration, non-optimum planar geometry of the pressure vessel can be accommodated. Furthermore, because the wall thickness can be quite narrow, the micro-high pressure vessel enables very high thrust-to-weight ratios without undue weight penalty. The limit to chamber pressure is heat flux and the resultant wall temperature at critical locations such as the nozzle throat.

Micro-gas Turbine Engine Applications

There are many applications for the micro-gas turbine engines of the invention, in some cases providing a superior replacement for existing, more conventional devices, and in others, embodying new capabilities enabled by the microengine's design and operational characteristics. When configured as a microgenerator, as described above, the micro-gas turbine generator is a source of electrical power, for example, as a replacement for batteries. Compared to the best batteries, the micro-gas turbine generator can produce twenty times the power and energy for the same weight and volume. The microengine has the additional advantage of extremely fast "recharge" time, i.e., needs little time for refilling the fuel tank, compared to the typical recharge time of a conventional battery. Furthermore, unlike batteries, microengines are environmentally friendly, presenting no disposal problems. There is also no explosion risk with microengines, as is common with lithium-based batteries.

Microengine electric power sources are applicable to all portable electric power applications for which air is available. This includes, e.g., portable computers, radios, and other electronic devices; telephones, e.g., cellular telephones, and other communication devices; power tools, heaters and coolers, military weapons such as missiles, and other applications. The very low noise produced by the microengine makes it particularly suitable for applications such as office electronics as well as military reconnaissance. The microengine is further advantageously employed in manned mobile scenarios such as fire fighting; here, individual power packs of one or more microengines can be provided to fire fighters for autonomous, mobile powering of personal protection and communication apparatus. The microengine can similarly be employed to power implanted medical devices such as pace makers.

When more power is required than can be provided by one microengine unit, many microengines can be employed in parallel. For example, approximately 1000–2000 units can be employed in a hybrid electric automobile in which the microengines provide electricity to power electric motors driving the wheels. This application achieves very low pollution production and good fuel economy, because the microengines can be individually turned on or off as power is required, essentially instantly from a driver's point of view. As a result, the array of microengines can be controlled such that no fuel is burned at "idle." In another vehicular application in accordance with the invention, the microengine is employed as an auxiliary power generator to provide power for heating, cooling, electronics, or other componentry at times when a main vehicular engine is off, for, e.g., cooling a car while the main car engine is off.

Micro-gas turbine generators can also be used for distributed power applications, e.g., where it is undesirable to run electrical power distribution wiring, such as for self-powered aircraft actuators in which electric power is preferably generated locally in the actuator. Here one or more microengine generators can be configured at the desired point of actuation. This configuration is especially advantageous in that such actuators are commonly located near a fuel supply, e.g., in the aircraft wings, for, e.g., control surface deflection. Local micro-power generators in accordance with the invention can also be employed to provide local power redundancy for critical components, thereby insuring against failure of a central power system. For example, one or more arrays of microengine generators can be employed for back up of a computer or display apparatus. In a further example, arrays of microengine generators can be employed to provide residential electric power with the waste heat used for hot water and heating. As can be recognized, a wide range of other applications of microengine generator systems is contemplated and enabled by the invention.

A micro-gas turbine engine in accordance with the invention is operationally characterized as a jet engine, and therefore is a source of thrust that can be employed for propulsion and control of air vehicles. A relatively small, e.g., drone, aircraft can be powered by a single microengine, and a larger aircraft or missile can be powered by an array of microengines, e.g., several hundred or thousand units. Indeed, a large manned aircraft can be powered by arrays of several million microengines distributed about the surface of the aircraft.

The use of arrays of microengines has several advantages, e.g., in enabling directional control of an aircraft by way of differential throttling of specific individual engines in the array. Optimally and preferably, such arrays are located in positions on a vehicle surface such that they operate within the surface boundary layer, thereby functioning as mathematical sources and sinks of fluid. This results in a reduction of the drag and an increase in the lift of an aircraft powered by the microengines, whereby airfoil lift-to-drag ratio and thus flight efficiency are improved. The boundary layer control, drag reduction, and lift enhancement capabilities provided by the invention can be utilized as a result of microengine propulsion or alternatively, in conjunction with one or conventional engines for propulsion to provide a superior flight control configuration.

The very small size of the microengine exhaust jet and the high rotational speed of the microengine turbomachinery greatly reduces the noise produced per unit of thrust over that of conventional engines. Further, the microengine size regime moves the predominance of the noise power that is produced by the microengine to frequencies that are above that of human hearing and that rapidly attenuate in air over short distances. Thus, microengine propulsion units are substantially quieter than conventional engines. This can provide substantial advantages for both consumer and military applications of large microengine arrays.

In a further example of a microengine array application, a planar array of microengines is employed for vertical propulsion of a platform. Microengines are particularly well-suited for such a vertical lift application due to their compactness and very high thrust-to-weight ratio compared to that of conventional engines. An array of about 1000 microengines each of the basic design described above can provide a lift force of about 30 lbs per square foot of engine area, with about 200 lbs per square foot available from higher power microengine versions. This enables the use of an array of microengines for a vertical lift platform for, e.g., carrying loads over rough terrain and up heights. For example, a two-foot-diameter platform with, e.g., about 2000–5000 microengines can carry a payload of about 200 lbs and fuel for about 60 minutes of flight. Vehicle directional control can here be implemented by differential throttling of specific microengines in the array, as described above.

The microfabrication techniques provided by the invention for production of the microengine enable a wide range of device adaptations that further enable many applications and improve over conventional device capabilities. For example, in the case of microengine features or subsystems that are coplanar in configuration, the features and subsystems can be fabricated simultaneously and yet take on different out-of-plane geometry. Such is the case with the planar electric-drive micro-turbine configuration, in which the microcompressor and microturbine, or propellant micropumps, are of differing out-of-plane geometry but fabricated simultaneously.

Thus, the addition of stages and other planar features to the microengine, and especially the microrocket motor, while extending the device size, does not increase fabrication complexity. This in turn enables reduction of fabrication cost, reduction of interconnection complexity, and great increase in reliability at no additional cost. Thus, a micro-heat exchanger configuration for the microengine, or a bipropellant microrocket motor with high performance would weigh little or no more nor be substantially costlier than an unrecuperated microengine or a monopropellant microrocket motor with lower performance.

Considering specific applications of the bipropellant microrocket motor, applications span the entire range of rocketry, from microsatellite altitude control to space tugs to tactical rockets, and even to launch vehicles; while advantages vary with the application, they all include very much lower weight and manufacturing cost, as well as higher performance, than conventional small-sized rockets. Independent of application, the advantages of microfabrication just mentioned particularly apply here. Integration of micropumps, microvalves, plumbing, microinjectors, and a pressure chamber together on a planar substrate greatly increases the reliability, reduces weight, and dramatically reduces cost below that required for manually machined and assembled rocket components.

Employed alone, a single microrocket motor module can be used for satellite altitude control; a pump feed scenario is here enabled, eliminating the need for conventional pressurization storage bottles and high pressure fuel tanks and delivery lines, thereby greatly reducing the propulsion system weight. Arrays of microrocket motors also can be employed to form very lightweight and highly redundant larger propulsion systems for a range of applications. For example, a microrocket motor array can be employed as an orbital transfer vehicle. Several hundred microrocket motors are here generally required to provide the thrust requirement of about 5000N. Redundant microrocket motors can be provided for, e.g., reliability, or for thrust vectoring to replace the relatively heavy motor gimbals and hydraulic systems conventionally employed to change motor direction. The very small size of the individual microrocket motors yields very fast startup and shutdown times, enabling precise impulse increments to be imparted to a vehicle. As mentioned previously, bipropellant configurations of the microrocket motor are here particularly advantageous to increase specific impulse over that achievable by monopropellant microrocket motors.

Other applications include microchemical rocket engines such as low-cost boosters for small satellites. A combination microengine-microrocket motor can provide launch propulsion for very small, e.g., 1–10 kg, satellites. Even large booster propulsion, such as single stage to orbit spacecraft propulsion, can be addressed with a combination of the microengine and the microrocket configurations. The very high thrust-to-weight ratio, the compactness, and the possible redundancy of such a system provide an attractive alternative to conventional booster configurations.

As is demonstrated by the breadth of this discussion, the range of applications for the microengines provided by the invention is truly vast. While the discussion cannot address each and every application, it is intended to indicate the extensive capabilities contemplated by the invention.

Performance Comparison

Table 1 below compares the operating performance calculated for three microengine embodiment designs, termed Microeng1, Microeng2, and Microeng3, with two conventional small gas turbine engines, namely, an automotive gas turbine and a light helicopter engine.

TABLE 1

| Performance Parameter | Microeng1 | Microeng2 | Microeng3 | Automotive Gas Turbine | Light Helicopter |
|---|---|---|---|---|---|
| Shaft power: (kW) | 0.02 | 0.1 | 0.085 | 50 | 500 |
| Airflow: (g/s) | 0.18 | 0.6 | 0.6 | 330 | 2500 |
| Fuel: | $H_2$ | JP-8 | JP-8 | JP-8 | JP-8 |
| Recuperation | No | No | Yes | Yes | No |
| Specific Fuel consumed: (kg/kW-hr) | 0.45 | 0.42 | 0.28 | 0.28 | 0.38 |
| Power/Airflow: (kW/kg/s) | 80 | 160 | 140 | 150 | 160 |
| Power/weight: | 20:1 | 100:1 | 50:1 | — | 5:1 |

These performance criteria, and especially, e.g., the power/weight criterion, indicate that all of the microengine embodiments perform respectably in comparison with the conventional engines.

Table 2 below compares calculated performance criteria of the third microengine embodiment above, Microeng3, with that of a sulfur dioxide battery, specifically, the U.S. Army model BA5590 battery.

TABLE 2

| Performance Parameter | Microeng3 | $LiSO_2$ Battery |
|---|---|---|
| Power Output: | 50 W | 50 W |
| Energy: | 175 W-hr | 175 W-hr |
| Weight: | 50 g | 1000 g |
| Size: | 60 cm$^3$ | 880 cm$^3$ |

TABLE 2-continued

| Performance Parameter | Microeng3 | $LiSO_2$ Battery |
|---|---|---|
| Specific Energy: | 3500 W-hr/kg | 175 W-hr/kg |
| Energy Density: | 3000 kW-hr/m$^3$ | 200 kW-hr/m$^3$ |

The microengine is here shown to provide about 20 times the specific energy and 15 times the energy density of the battery. In combination with the other advantages discussed earlier, the microengine is found to enable a superior mobile, modular power source over conventional batteries.

Microcompressor and Microrotor

Turning now to the microcomponentry for enabling the microengine systems described above, the invention provides cooperative micro-assemblies that can be configured to achieve a desired microengine operation. The discussion below describes the functionality of each, with descriptions of various subsystems enabled by the microassemblies discussed thereafter.

Figure 12A:
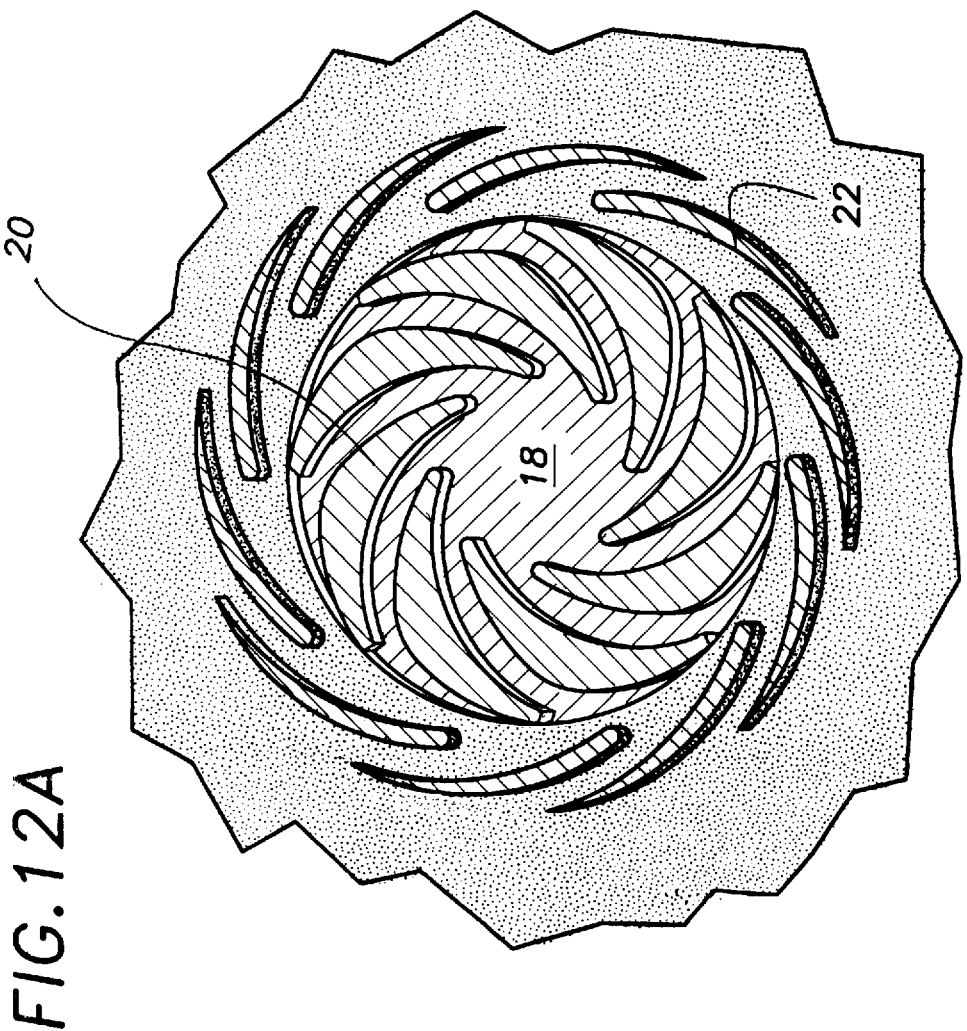
FIGS. 12A–B are perspective views of a microcompressor rotor, rotor blades, and diffuser vanes in accordance with the invention.
Figure 12B:
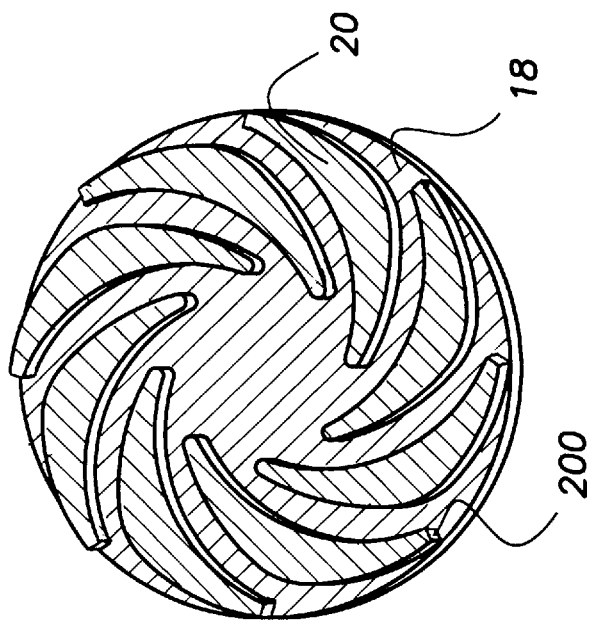

The centrifugal microcompressor provided by the invention is of a planar, untapered, configuration that is compatible with microfabrication technology. Referring to FIGS. 12A and 12B, and as described earlier, the microcompressor includes a disk-shaped rotor 18 and annular, stationary diffuser formed of diffuser vanes 22. Airfoils 20 are mounted to the face of the compressor rotor disk to provide rotor blades, and diffuser vanes are provided between the engine housing walls that form the diffuser outer walls. In the example configuration shown, there are 8 rotor blades and 10 diffuser vanes. An example rotor diameter is about 4 mm, with airfoil heights of about 250 μm. An annular ring or tip shroud is preferably mounted to the top of the rotor airfoils to reduce tip leakage losses and blade bending stresses, and to improve compressor stability. As discussed earlier, this shroud can also serve as both the rotor of an electric micromachine and a front thrust rotor bearing.

Recall that in operation, as air exits the compressor rotor, it takes on a large angular momentum that is removed by the diffuser vanes and converted to a rise in static pressure. In typical gas turbine centrifugal compressors, the rotor and diffuser annulus height changes considerably through the rotor and diffuser because, as the gas is compressed, its density increases so that less flow area is needed. In contrast, in the compressor rotor disk and diffuser of the invention, the rotor and diffuser annulus height is held constant, the blades are untapered, e.g., the heights are held constant or stepped, and instead, the flow area is changed by varying the blade and vane thickness in the plane of the blade and vane. The untapered nature of the blades and vanes is contemplated by the invention to include both flat and stepped geometries. Such an untapered configuration enables manufacture by planar microfabrication techniques.

The compressor rotor blade shaping is also designed based on diffusion considerations. In general, in a compressor, the boundary layers of the compressor are exposed to an adverse pressure gradient. As a result, boundary layer separation is typically an important concern and the amount of diffusion must in turn be strictly controlled. This is typically done with compressor endwall contouring. In the invention, diffusion is instead controlled with a specific compressor rotor blade shape that minimizes the flow area increase conventionally observed with increasing radius. Specifically, in accordance with the invention, the blade shapes follow the path desired for flow streamlines; this produces a flow passage with decreasing flow area as the radial position increases.

Based on these considerations, the invention provides, as shown in FIGS. 12A–B, e.g., compressor rotor blades that are shaped to control flow passage area by tailoring blade thickness as a function of radius while maintaining a blade height that is substantially untapered as a function of radius. For example, the blades can follow log spiral streamlines; the trailing, i.e., radially peripheral edge 200, of the blades is thereby angled close to about 90 degrees from the rotor radial line, yielding a large exit relative flow angle. A very high exit swirl angle, e.g., of over about 80 degrees in the absolute frame, is also yielded. With this design, pressure rise produced by the compressor is predominantly due to centrifugal effects. Of note is the increased importance of viscous forces in fluid flow through the compressor rotor of the invention, over that of conventionally sized rotors, due to the relatively low Reynolds number characteristic of the small size regime.

Because the microcompressor of the invention preferably is operated with a tip Mach number on the order of about one or higher to maximize energy transfer to the flow, and because the relative exit velocity tends to be subsonic due to limited diffusion in the relative frame, the absolute flow from the peripheral edge of the compressor rotor to the diffuser has a large flow angle. To control diffusion, the diffuser of the invention is provided with vanes, as shown in FIGS. 12A–B, that are shaped, e.g., slightly offset from a log spiral design. This allows for a slow area expansion, controlling the rate of diffusion to keep separation under control. As with the compressor rotor blades, diffuser vane thickness shaping is here employed in accordance with the invention as an alternative to conventional endwall contouring techniques. The result is a highly staggered diffuser vane design, given that the inlet flow angle from the rotor is so large; i.e., the diffuser vanes are highly staggered with respect to the compressor rotor blades. The large angle of the diffuser produces a relatively compact design in terms of radial extent required.

Additional considerations are preferably made with regard to the compressor rotor given that it, along with the turbine rotor, are the most highly stressed components of the microengine. There are three critical points in each of the rotors at which the stress levels are maximized during operation, namely, at the center of the rotor disk, at the transition from the rotor shaft to the disk, and at the root of the rotor blades. Considering first the stress generated at the rotor blade roots, tensile stress is here concentrated as the rotor spins. Given a maximum sustainable stress of about 500 MPa, it is preferred that each blade form a junction with the rotor disk that is a rounded fillet, and preferably a fillet with a radius of curvature greater than about 30 $\mu$m.

Likewise, it is preferable that the transition from the rotor shaft to the disk be rounded with a radius of curvature greater than about 30 $\mu$m to minimize stress concentration at that point. The rotors, by employing blades on only one side of the rotor disks, are subjected to a bending moment, caused by centrifugal blade loading, that causes this stress. The stress concentrations at the disk center are limited by limiting the rotational speed of the rotor to less than about 500 m/s. Out-of-plane deformation of the rotor disks caused by the bending moment are preferably minimized inherently by the selected thickness of the rotor disks; if desired, for some applications the un-bladed side of the rotor disks can be custom profiled during fabrication to accommodate the operational bending moment expected for that application.

Figure 13B:
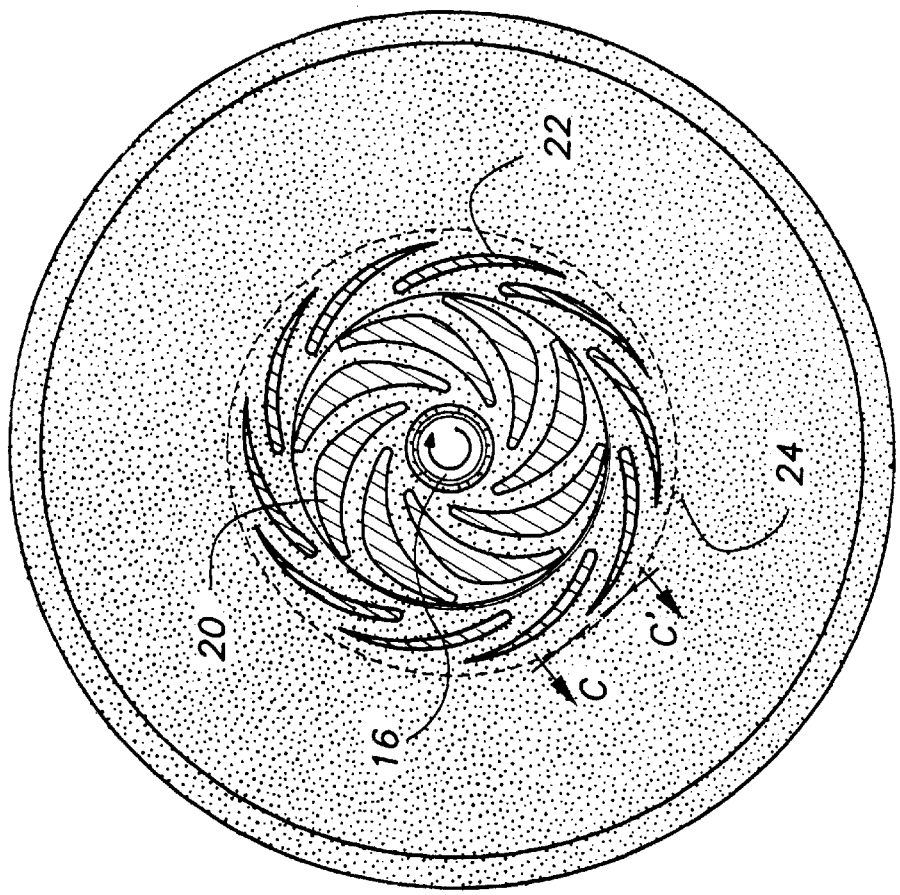
FIGS. 13A–B are a cross sectional view and a forward plan view, taken at B–B' in FIG. 13A, respectively, of a microcompressor of the micro-gas turbine engine as provided by the invention.
Figure 13A:
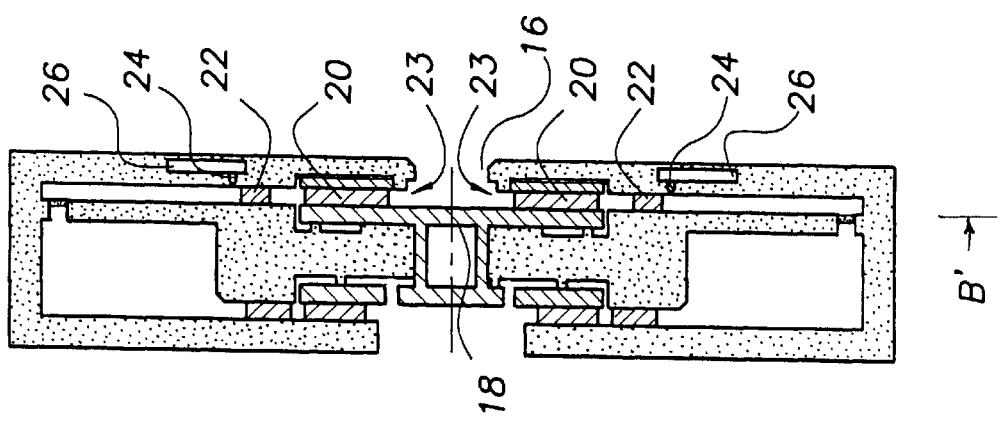

Turning to the overall microcompressor design and its integration with a microcombustor, and referring to FIGS. 13A–B, there is shown at the microcompressor inlet a forward facing step 23 around the circumference of the inlet. This step is preferably employed as it tends to reduce total pressure loss and blockage. While a smoothly contoured inlet step is conventional in macro-sized compressors and more preferable here, for considerations of aerodynamics, such a contour is difficult to produce using microfabrication techniques. At the microcompressor outlet, a circular array of the microengine fuel injectors 24 is connected from a fuel plenum 26 through the microcompressor end wall at the exit of the diffuser vanes 22, as was earlier described. In an alternative configuration, such fuel injectors can be located at the inlet to the diffuser vanes. These injectors consist of, e.g., about 100–200 holes each of about 5 $\mu$m in diameter, for use with hydrogen as the selected fuel; the holes can be circular, rectangular, or of other convenient geometry. Concomitantly fewer holes are needed for liquid hydrocarbon fuels. Preferably, the fuel injectors are located as shown, in the microcompressor forward endwall, and arrayed in a regular, circular pattern about the microcompressor centerline.

With this configuration, the microcompressor of the invention can pump about 0.2 grams per second of air at a pressure ratio of about 4:1 with the compressor rotor turning at about 2.4 million RPM with between about 70%–80% efficiency. At a rotational rate of about 2.7 million RPM, the microcompressor pressure ratio is about 5:1; the diffuser exit Mach number is about 0.3.

Figure 14B:
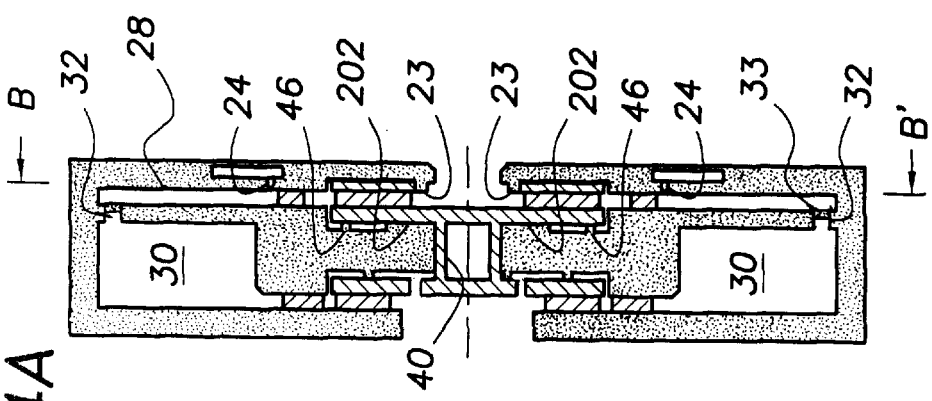
FIGS. 14A–B are a cross sectional view and an aft plan view, taken at B–B' in FIG. 14A, respectively, of the microcompressor of FIGS. 13A–B.
Figure 14C:
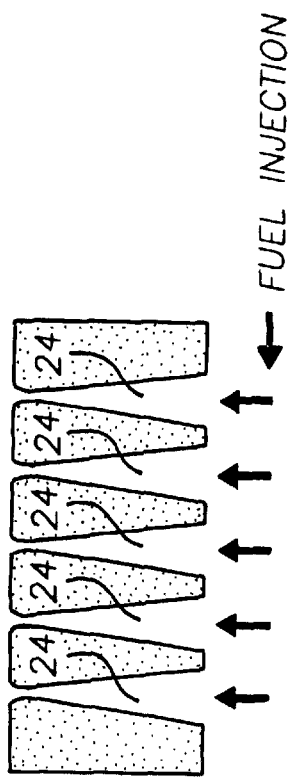
FIG. 14C is a cross-sectional view, taken at C–C' in FIG. 13B, of a fuel injector array of the micro-gas turbine engine in accordance with the invention.
Figure 14A:
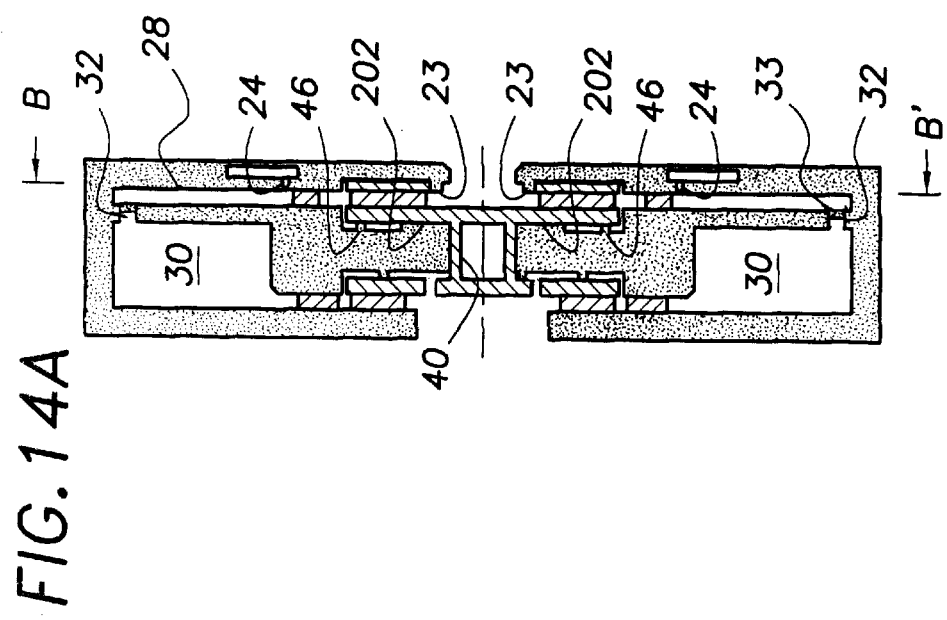

As shown in FIGS. 14A–B, the aft side of the compressor rotor disk has provisions for a rear engine thrust bearing 202, an air seal 46 to reduce leakage and form a pressure differential to balance the axial force due to the pressure gradient on the front face, and attachment to the shaft 40 connecting the compressor and turbine rotor disks. At the periphery of the diffuser 28, at which point the air-fuel mixture makes a ninety degree turn to enter the microcombustor 30, there is provided a regular, circular pattern of combuster inlet ports 32, through which the air-fuel mixture flows. These inlet ports consist of, e.g., about 40–80 holes each of about 500 $\mu$m in diameter. As can be recognized, the inlet ports can be circular, rectangular, or other convenient geometry.

Microcombustor

The microcombustor of the invention provides four fundamental capabilities, namely, conversion of chemical energy to heat, fast combustion time that is compatible with the micro-scale of the microcombustor geometry; structural mechanical integrity at combustion temperatures; and compatibility with microfabrication technology. All four of these capabilities are provided in the microcombustor with features much changed over conventional gas turbine combustors.

In one embodiment in accordance with the invention, the microcombustor capabilities are based on burning of a relatively lean mixture, i.e., low equivalence ratio, of hydrogen and air in order to reduce the required combustion temperature as well as to increase the combustion rate. Specifically, at an equivalence ratio of about 0.4, a hydrogen/air mixture burns at about 1600° K, which is within the temperature capabilities of several of the candidate microengine structural materials, namely, silicon carbide and silicon nitride. This thermal compatibility eliminates the need for the rather complicated combustor cooling configurations typically required in conventional gas turbines, and results in an elegantly simple microcombustor design and corresponding manufacturing process.

Hydrogen is an ideal microengine fuel, compared with conventional hydrocarbon fuels, in other aspects as well.

Hydrogen has a greater heating value, more rapid rate of vaporization, faster diffusion velocity, shorter reaction time, a significantly higher flame speed, wider burning limits, lower required ignition energy, and lower heat radiation than hydrocarbon fuels. Most importantly, perhaps, the broad flammability limits of hydrogen remove requirements for a relatively rich, higher-temperature, primary burning zone and follow-up dilution zone, as is typically required for hydrocarbon fuels. While storage requirements for hydrogen are currently prohibitive for use in commercial aircraft, many of the microengine applications can accommodate such storage, and transport aircraft use of the fuel is now generally supported. As can be recognized, the invention is not limited to, nor does it require, the use of hydrogen as a fuel.

In general, the volume required of a combustor scales with the residence time needed to mix the fuel and air and to burn the resulting mixture to completion. In the microcombustor, the fast diffusion speed of hydrogen in air is exploited to achieve a high flame speed and increased mixing and burning rate, given the low molecular weight of hydrogen. Even with this advantage, adequate hydrogen-air mixing prior to burning is still required. Referring back to FIGS. 1 and 14A–B, the microcombustor 30 accommodates this requirement with an annular geometry that consists of three primary sections, namely, a radial outflow diffuser section 28 positioned outboard of the microcompressor diffuser, as described above, at the input of which is located fuel injectors 24, the circular array of combustor inlet ports 32 and flame ignitors 33 in the diffuser backplate, which acts to separate the diffuser from the microcombustion chamber 30; and the annular microcombustion chamber 30 in which the combustion occurs.

The radial outflow microcombustor diffuser serves two functions; it directs the air from the microcompressor exit to the combustor inlet ports, and it provides a fuel injection site and mixing length to create and homogenize an air-fuel mixture. The diffuser has an inner diameter of, e.g., about 6 mm, an outer diameter of, e.g., about 10 mm, and an inlet height generally equal to that of the microcompressor. The diffuser passage can be of constant height or alternatively, can be stepped to progressively reduce the height as the radius increases. This latter configuration enables control of flow cross-sectional area to optimize fuel and air mixing and to minimize viscous losses. In a further alternate configuration, a second set of vanes can be located along the diffuser length to control the cross-sectional area by variation in vane thickness, here with the annulus height and vane heights held constant.

The success of the microcombustion scheme is dependent on thorough mixing of air and fuel prior to combustion; poorly mixed regions of the mixture could otherwise have a richer fuel concentration and correspondingly higher combustion temperature that could exceed the capability of the wall material. Thus, many fuel injectors 24 are desirable and sufficient diffuser length for the mixture to homogenize is preferred. Requisite mixing is indeed achieved for a hydrogen fuel if the hydrogen gas fuel injectors are located well upstream of the combustion chamber at the compressor outlet. FIG. 14C illustrates a cross-sectional, partial view taken at C–C' in FIG. 13B, of a preferable configuration of fuel injectors 24 in an array as provided by the invention.

For some microengine applications, it may instead be preferable to inject the hydrogen fuel upstream of the microcompressor. Such a configuration can more fully enable complete mixing of the fuel and air prior to its introduction to the combustor inlet ports. Although such a lean, premixed, prevaporized combustor configuration is known to cause lean blowout and flashback or autoignition at high inlet temperatures in macro-scale engines, these are not concerns in the microengine due to the wide flammability limits and low operating pressure of the microscale hydrogen-air combustion of the microengine.

A lean, premixed hydrogen-based fuel system also results in a significant reduction in complexity because of the higher operating temperatures accommodated by the combustor materials. Transpiration and film-cooling are typically used in conventional gas turbine combustors to maintain the combustor liner at a temperature below that of the material limit. However, the silicon carbide and silicon nitride microcombustor materials can withstand a local wall temperature of about 1600° K, thereby obviating the need for combustor wall cooling.

Turning to other considerations for the microcombustor, the combustor inlet port size is preferably set to provide a small recirculation zone and is thus a function of the flow Reynolds number. Ignition is provided for in the inlet port by an ignitor, e.g., a resistive heater, controlled at the air-fuel auto-ignition temperature, at one or more circumferential locations over the combustor inlet ports. Alternately, a spark gap configuration of electrodes positioned at a forward end of the inlet port, or other spark production mechanism, can be used.

The main microcombustion chamber is sized for a residence time that ensures full combustion. The microcombustion chamber is of a larger relative size, compared to the overall microengine, than that of conventional engines, to enable both the required mass flow as well as required residence time. Specifically, the dimensions of the microcombustion chamber are increased by approximately 40 times relative to the microengine to provide sufficient residence time.

A residence time of between about 300–800 microseconds is preferably provided for in the microcombustor. Based on this consideration, the ratio of the microcombustor annular height, i.e., difference between outer and inner diameters, to axial length is preferably at least about 0.5, with the annular height between about 2 mm–10 mm and the axial length between about 0.5 mm and 5.5 mm. In one example configuration that accommodates this residence time, the chamber is about 10 mm in diameter and about 2.5 mm long. As described earlier, the microcombustion chamber discharges radially inward to the turbine. Based on cycle analysis and assuming a microcompressor efficiency of about 0.7 and a microturbine efficiency of about 0.8, it is found that optimal microcombustor performance is obtained by operating at the highest achievable compressor pressure ratio, taking structural constraints into consideration for a selected microengine configuration.

The energy lost during combustion due to heat transfer at the walls of a combustion chamber is typically neglected in conventional gas turbine engine design. For the microcombustor, the surface-to-volume ratio, being proportional to the inverse of the hydraulic diameter, is greatly increased over that of conventional combustors, and thus heat transfer losses are to be considered for the microcombustor. Specifically, the ratio of heat lost to heat generated by the microcombustor is about 2 orders of magnitude greater than that of conventional combustors. This can influence the performance of the microcombustor in two ways; first, the typical large-scale combustor efficiencies of greater than about 99.9% may not always be achievable, and second, flammability limits may be affected due to flame quenching. The performance penalty associated with this heat loss can be minimized, however, by adopting the recuperated configuration described earlier.

In an alternative embodiment, the microcombustor burns a conventional or other suitable gaseous or liquid hydrocarbon fuel, preferably a lean mixture, including a fuel such as butane, JP-4, JET-A1, kerosene, or other fuel used in aviation. In this case, a combustion-enhancing catalyst, e.g., a catalytic coating, is preferably employed; such a coating can be provided on the interior walls of the microcombustor. Catalytic combustion is well known for its ability to burn lean fuel-air mixtures at low temperatures. Conventional noble metal catalysts based on platinum and palladium are suitable.

Catalytic combustors require large surface area-to-volume ratios because in general, the chemical reactions occur relatively close to the combustor surface. The microcombustor of the invention has a very large surface area-to-volume ratio compared to that of conventional burners and thus is well-suited to catalytic schemes. Should additional combustor wall area be needed for a given catalytic system, then radially oriented, pie sector plates, fins, honeycombs, or other suitable structure can be fabricated within the combustor volume and coated with the catalyst. Combustor inlet temperatures of about 600° K are needed by many catalysts. This requirement can be met by either increasing the compressor pressure ratio or employing the recuperated configuration described earlier.

The inventors herein have demonstrated the feasibility of the residence time and materials compatibility requirements of the microcombustor design using a microcombustor test rig as shown in FIGS. 15A–B. An SiC experimental microcombustor 210 having the dimensions given above, i.e., a microcombustion chamber diameter, C, of about 1 cm, was produced using laminations of ultrasonically machined SiC layers to mimic the structure produced by microfabrication techniques. The laminations were held together in compression by an external spring 212. The thusly assembled microcombustor was housed in a pressure vessel 216 to permit operation up to a pressure of about 6 atm; the vessel width, W, was about 13 cm, and the vessel height, H, was about 20 cm. A water cooling jacket 217 was provided for cooling combusted exhaust. To aid in simplicity, the pressure vessel was designed to accommodate injection of premixed fuel reactants 218. The inlet air was capable of being preheated to the engine compressor discharge temperature of between about 500° K–600° K.

As shown in the figures, a fuel injected into the experimental microcombustor 210 is directed radially outward, as in the microengine, and through combustor inlet ports 32, after which the ignited mixture enters the combustion chamber 30. The combusted mixture is then exhausted 31 downward. With this operational set-up, the experimental microcombustor was operated on a gaseous hydrogen and air mixture at equivalence ratios ranging from about 0.3–1.0 and a mixture mass flow rate of about 0.045 g/s. This flow rate was chosen to coincide with a microengine microcombustor inlet pressure of about 4.5 atm and a flow rate of about 0.2 g/s. The ignition tests were carried out by varying the hydrogen-air equivalence ratio from about 1.0 down to about 0.3 in increments of about 0.1, and then back up to about 1.0 in increments of about 0.1.

An ionization probe was positioned in the chamber to provide an indication of presence of flame in the chamber. The probe consisted of two platinum electrodes separated by an air gap. The two electrodes were maintained at a fixed electrical potential difference. When radicals associated with the combustion were present, a current was induced across the air gap, and this was manifested as a change in voltage across a resistance placed in series with the probe. Ignition of the microcombustor was achieved by resistance heating of a 0.2 mm platinum wire. The ignitor consumed about 50 watts of power during starting.

Ignition was demonstrated with inlet gas temperatures as low as 294° K and stable and complete combustion was demonstrated over the full range of equivalence ratios tested. Ignition usually occurred in a matter of seconds, but was sensitive to wire location. Ignition occurred more readily when the ignitor was positioned toward the center of the combustion chamber; however, the ignitor wires used could survive only one test in this position. Moving the ignitor closer to the combustor wall substantially increased its lifetime.

Figure 16:
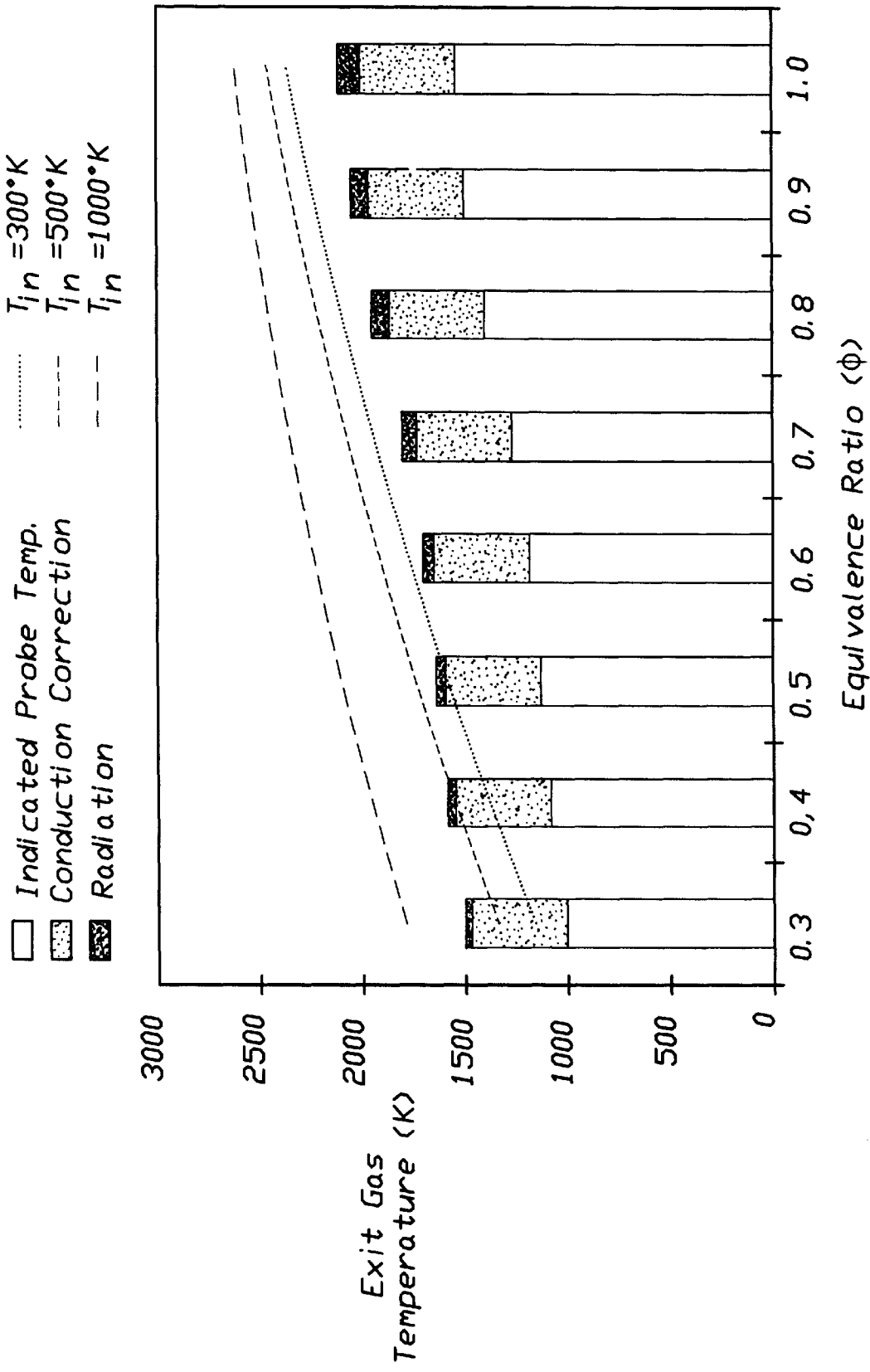
FIG. 16 is a plot of measured exhaust temperature of the experimental microcombustor of FIGS. 15A–B as a function of the equivalence ratio of fuel supplied to the microcombustor.

A 0.25 mm type thermocouple was employed at a position at the exhaust 31 to measure the gas temperature as a function of equivalence ratio. FIG. 16 is a plot of measured exhaust temperature as a function of equivalence ratio, and also provides, for comparison, the corresponding theoretical adiabatic flame temperatures for the equivalence ratios. This data confirms that the microcombustor of the invention can operate as intended.

Microturbine

Figure 17B:
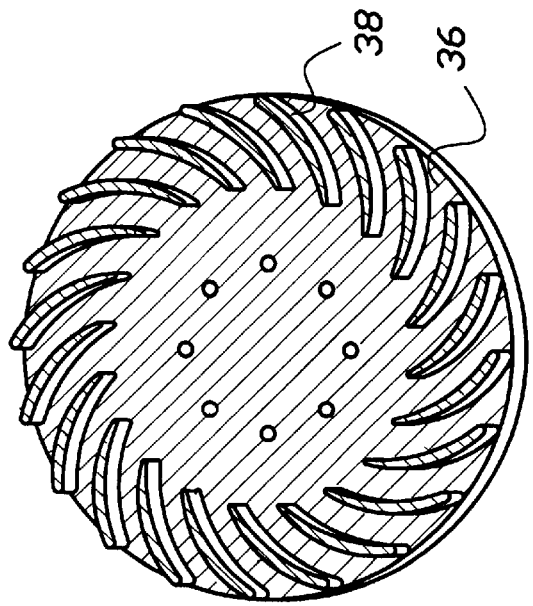
FIGS. 17A–B are perspective views of a microturbine rotor, rotor blades, and guide vanes in accordance with the invention.
Figure 17A:
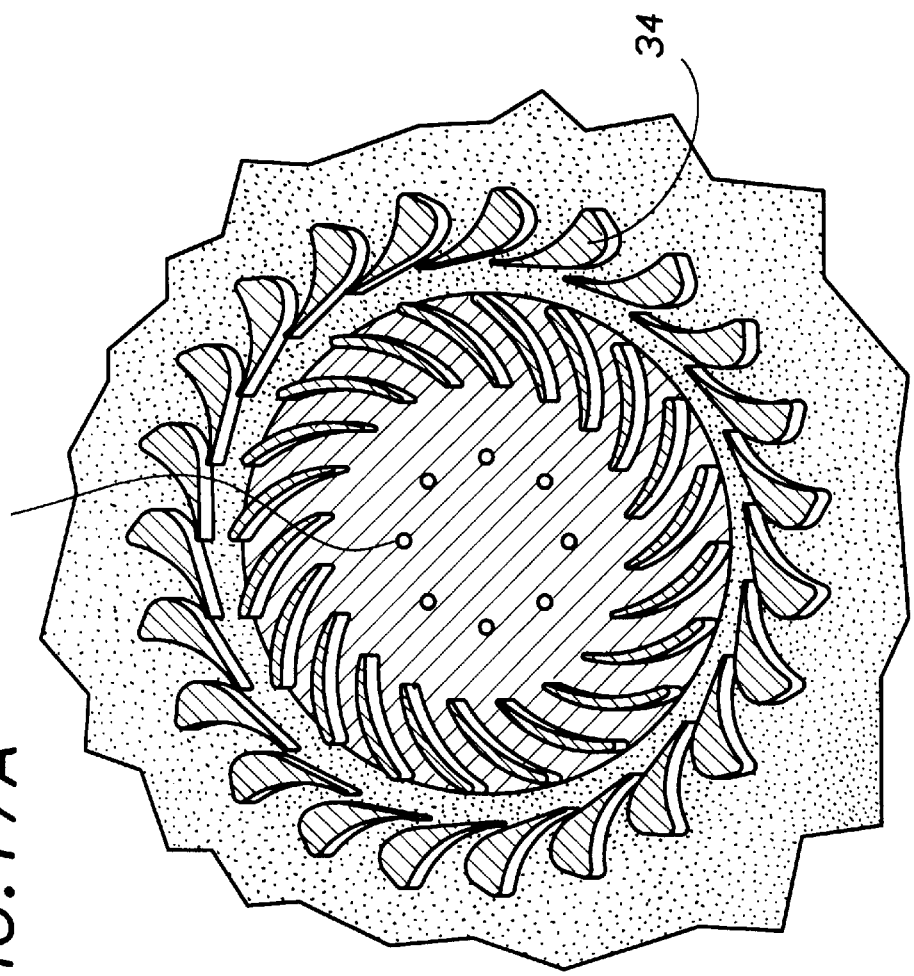

The microturbine of the invention is of a planar, substantially untapered radial inflow design unlike that of many conventional turbine arrangements. Air flow enters the microturbine radially inward from the microcombustor. Referring to FIGS. 17A–B, a circular array of stationary turbine vanes 34 of constant height accelerates the air flow inward to the turbine rotor and adds swirl. The turbine rotor disk 36 includes an annular array of blades 38 mounted to the turbine disk face. The turbine rotor further expands the air as it moves inward and removes the swirl, thereby producing shaft power. The air exits the turbine rotor blades inward and then turns 90° to exit the microengine along the centerline of rotation. In contrast with typical small turbines, the microturbine of the invention employs a full-admission design scheme to maximize efficiency and to reduce flow-induced mechanical problems.

Both the turbine vanes 34 and turbine rotor blades 38 are constant height or stepped in height, and thus, like the compressor rotor blades and diffuser vanes, are substantially two-dimensional in nature, thereby accommodating microfabrication manufacture. Combined with the very low Reynolds number regime in which the blades operate, e.g., where Re≈2000, this untapered height restriction results in unconventional turbine vane and blade shapes. As with the compressor disk and blades, it is here preferred that the disk be joined to the shaft and the blades be joined to the disk by fillets of a radius of greater than about 30 $\mu$m to reduce stress at these locations.

To achieve high efficiency, the turbine vanes are designed for high absolute and relative velocity at their exit, while the turbine rotor blades are designed to minimize the absolute velocity at their exit, given that the kinetic energy of the microengine exit flow is not recoverable. In typical radial inflow turbines, this is achieved with endwall contouring to control the flow area, combined with proper choice of the blade exit angle. But because such endwall contouring is not practical for microfabricated componentry, the turbine rotor blades are in the invention designed to provide flow area control, and further to provide flow turning control, by tailoring the turbine blade thickness as a function of radius while maintaining a substantially constant blade height along the radius. This tailoring of blade shape to control the area reduction between the blades allows for control of the acceleration of the flow, providing better control over the absolute exit velocity. The trailing edge blade angle is also chosen to reduce the exit absolute swirl velocity and further, is preferably designed with consideration for the viscous losses and blockage effects resulting from the low Reynolds number characteristic of the small length scales and elevated temperatures of the microengine.

If jet thrust is required from the microengine, then the turbine blade geometry is preferably modified; the flow turning through the blade rows is here reduced to correspondingly reduce the pressure drop through the turbine. This reduces the shaft power produced, but increases the engine exhaust jet velocity and thus engine thrust. As discussed earlier, the turbine rotor blades can be unshrouded for simplicity, but a tip shroud can be included on the turbine rotor in an arrangement similar to that in the compressor, in order to improve turbine efficiency by reducing tip leakage pressure losses.

Referring also to FIGS. 18A–B, other features of the microturbine of the invention include an air seal 46 to reduce leakage and another seal 230 to form a pressure differential to balance the axial force due to the pressure gradient on the front face, and attachment to the shaft 40 connecting the compressor and turbine rotor disks. Vent holes 205 are preferably provided and located near the center of the turbine rotor disk 36 to balance the leakage air flow from the microturbine, microbearings, and microcompressor. Such vent holes can consist of, e.g., about 8 holes circularly aligned about the center line, and each of about, e.g., 50 $\mu$m in diameter.

Sized for the microengine configuration on which the other componentry described was based, the microturbine rotor is, e.g., about 4 mm in diameter and the turbine vane and blade height is, e.g., about 320 $\mu$m. At a microturbine inlet temperature of about 1600° K and pressure of about 3.2 atm, the microturbine can produce about 60 watts of shaft power while passing about 0.2 grams per second of air and turning at about 2.4 million RPM. Because the microcompressor consumes about 30 watts of power under these microengine operating conditions, about 30 watts are available to power a generator, if the microengine is so configured.

Figure 18C:
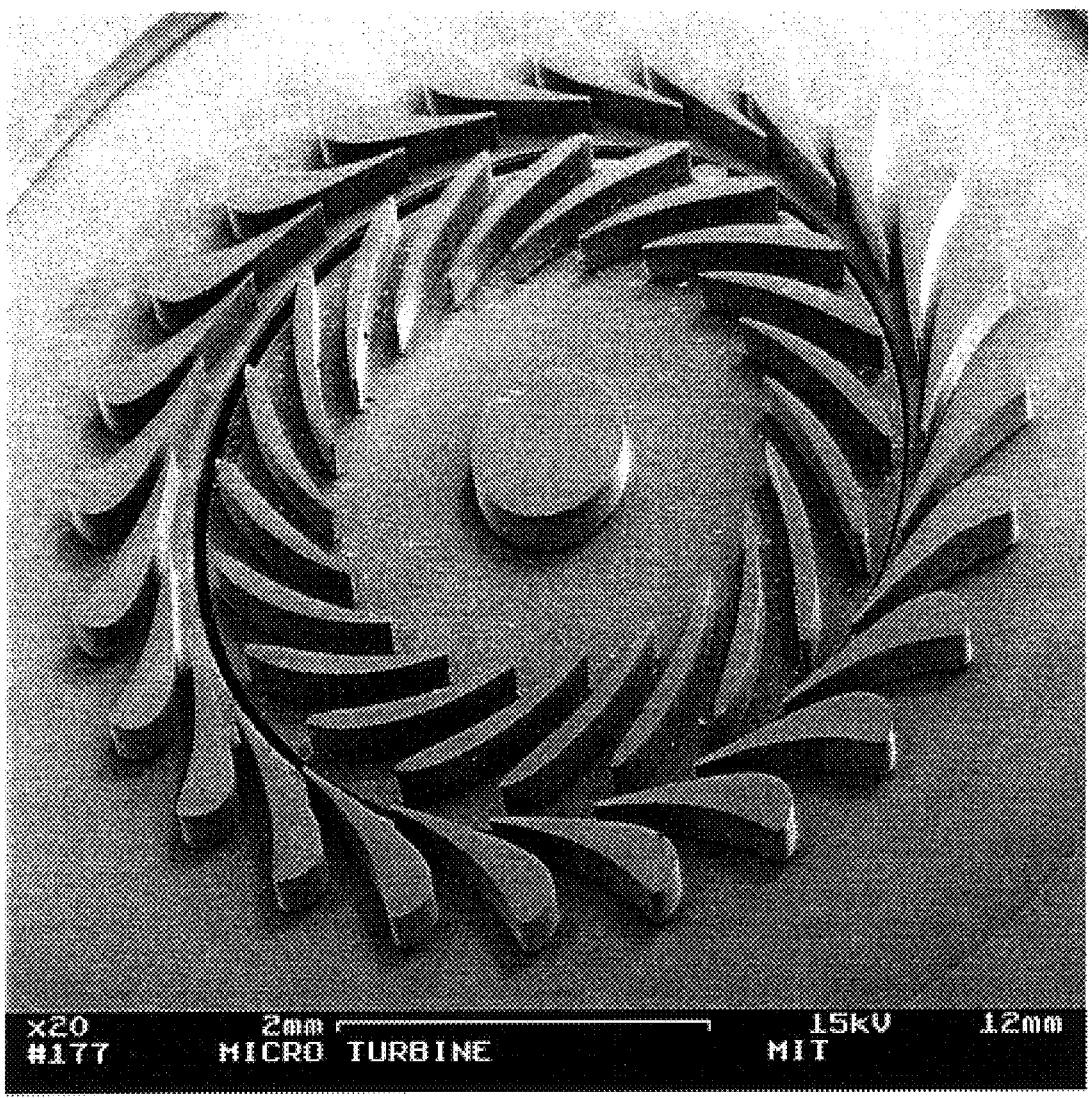
FIG. 18C is a scanning electron micrograph of a microturbine microfabricated in accordance with the invention.

FIG. 18C is a scanning electron micrograph of a silicon microturbine fabricated in accordance with the invention. The fabrication sequence employed here will be discussed in detail in later sections. The microturbine shown has a turbine disk of about 300 $\mu$m in height and turbine blades and vanes of about 200 $\mu$m in height. The turbine blades are of a maximum thickness, i.e., width, of about 100 $\mu$m, with a trailing edge thickness of about 25 $\mu$m.

Microbearings

Figure 19:
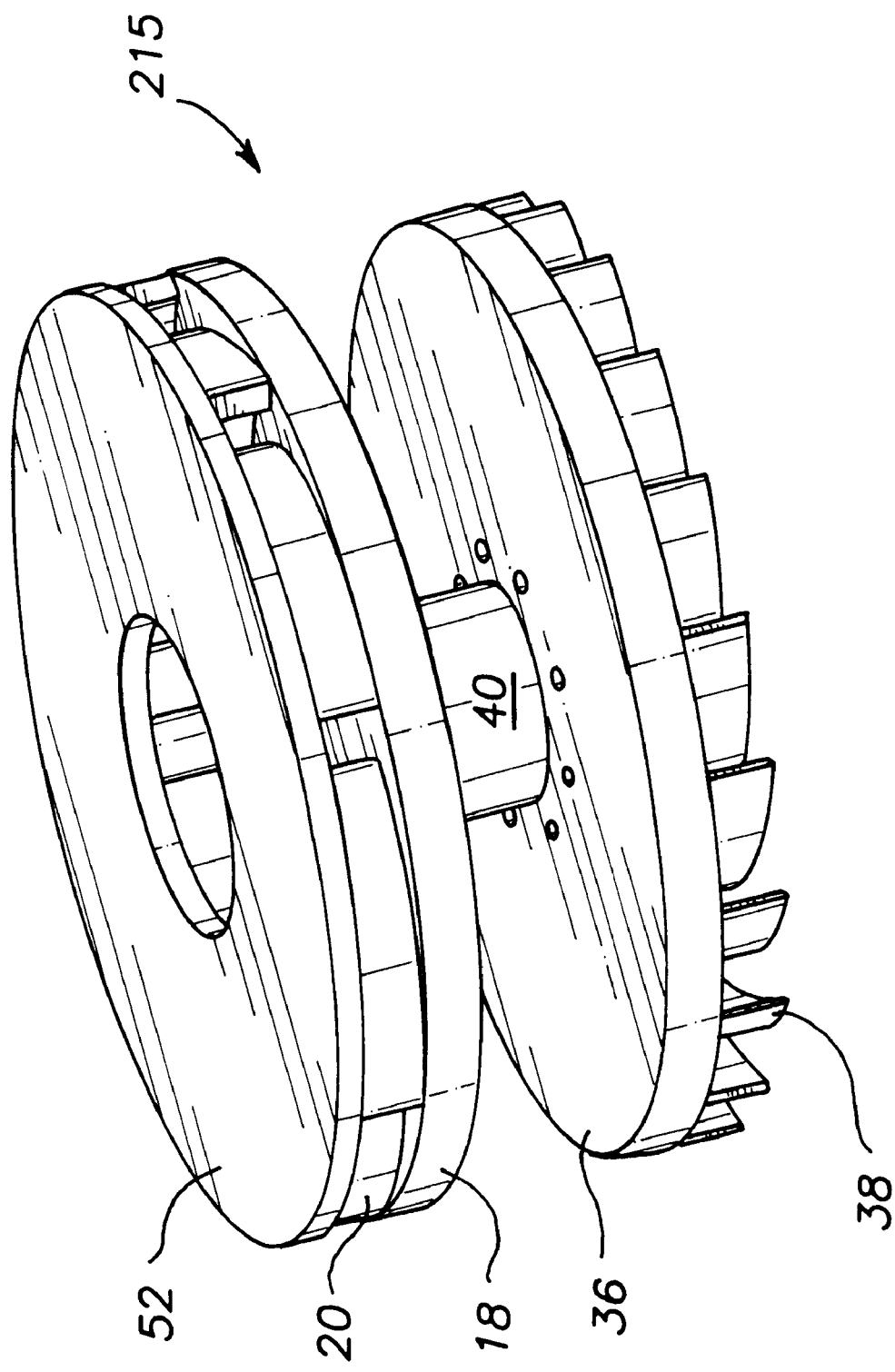
FIG. 19 is a perspective view of a micro-gas turbine engine rotor provided by the invention.

In general, high speed rotating machinery critically relies on low friction bearings to support the machine rotor. Such bearings must generally bear loads resulting from gravity, rotor imbalance, engine accelerations, and net axial forces due to pressure and electrical force distribution on the rotating elements. They should optimally exhibit low friction, long life relative to the intended machine application, and should optimally maintain rotor dynamic stability. In the microengine of the invention, air bearings and balance air pistons formed by air seals are provided to support the microcompressor rotor, microturbine rotor, and connecting shaft, these components together constituting the microengine rotor 215, as shown in perspective view in FIG. 19. The air bearing design of the invention has specific design features that accommodate the microscale regime of the microengine rotor.

Figure 20:
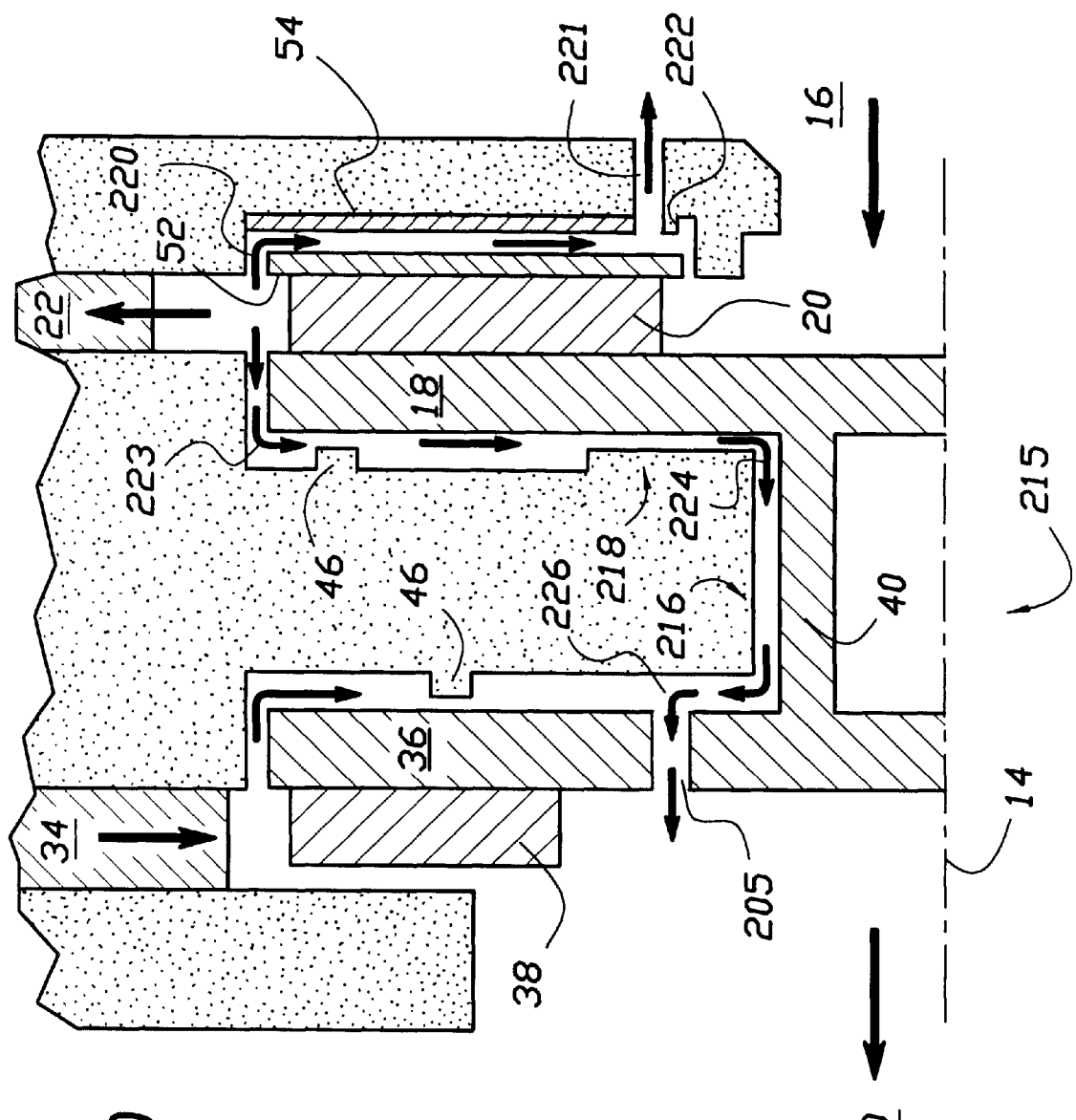
FIG. 20 is a cross-sectional view of micro-gas bearings provided by the invention in the micro-gas engine of FIG. 1.

Referring now to FIG. 20, the air bearing designs are shown explicitly. The radial loads of the microengine rotor 215 are supported by a journal bearing 216 about the shaft 40. The use of a journal bearing is preferred in accordance with the invention in consideration of the compressor and turbine rotor dynamics. The turbine rotor disk can increase in radius as it spins up to operating speed. This rotational growth can be significant, amounting to, e.g., an increase in radius of about 4 $\mu$m at about 500 m/s. This growth makes it impossible to achieve very tight clearances on a conventional disk/static shaft bearing arrangement. The journal bearing configuration provided by the invention accommodates this disk growth.

Figure 21C:
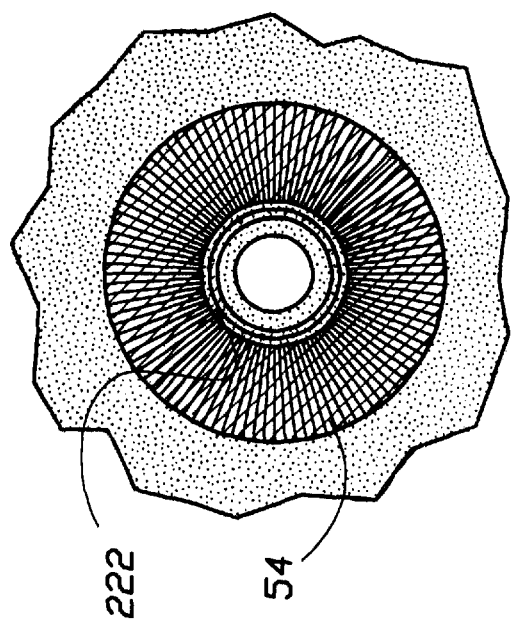
FIGS. 21A–C are a cross-sectional view and two plan views, taken at B–B' and C–C' in FIG. 21A, respectively, of the micro-gas bearings of FIG. 20.
Figure 21B:
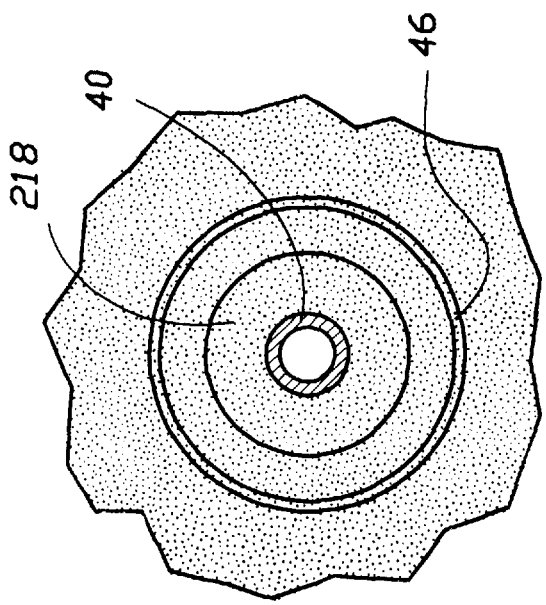
Figure 21A:
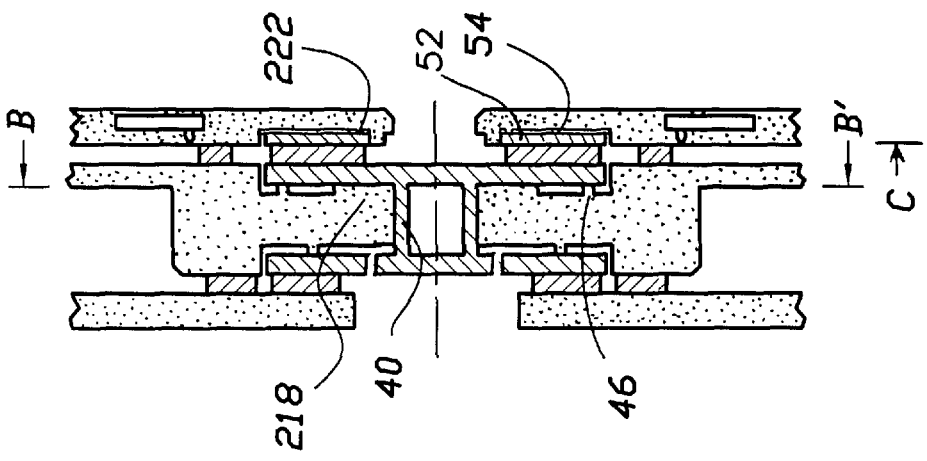

The axial rotor loads are taken by two annular thrust plates—the forward axial load being supported by the annular tip shroud 52 on the compressor rotor blades 20 and the rearward force by the inner rear 218 of the compressor rotor disk. Referring also to FIGS. 21A–C, the forward thrust bearing is formed by the compressor rotor tip shroud 52 and the generator stator electrodes 54 on the microengine housing. As described earlier, the gap between the two surfaces, under equilibrium running conditions, is preferably between about 2–5 $\mu$m. The resulting forward thrust bearing is supplied 220 by compressed air from the compressor rotor discharge, as shown in FIG. 20. The bearing air is vented out of a vent 221 in the microengine housing. A forward air seal 222 is provided in the housing just past the vent 221 to reduce leakage into the compressor inlet.

The aft thrust bearing 218 is similar to the forward unit in that it is also supplied 223 by the compressor rotor discharge, here to the rear side of the compressor rotor 18. The aft thrust bearing discharges to the journal bearing 216. The thrust bearings must support relatively little load due to the low mass of the microengine rotor and the balanced nature of the air piston arrangement, so that this design provides sufficient static capacity and stiffness. Should more capacity be required, it can readily be achieved by increasing the thrust plate area, fabricating spiral pumping grooves into the thrust plates, or decreasing the running clearance between the plates.

Figure 9:
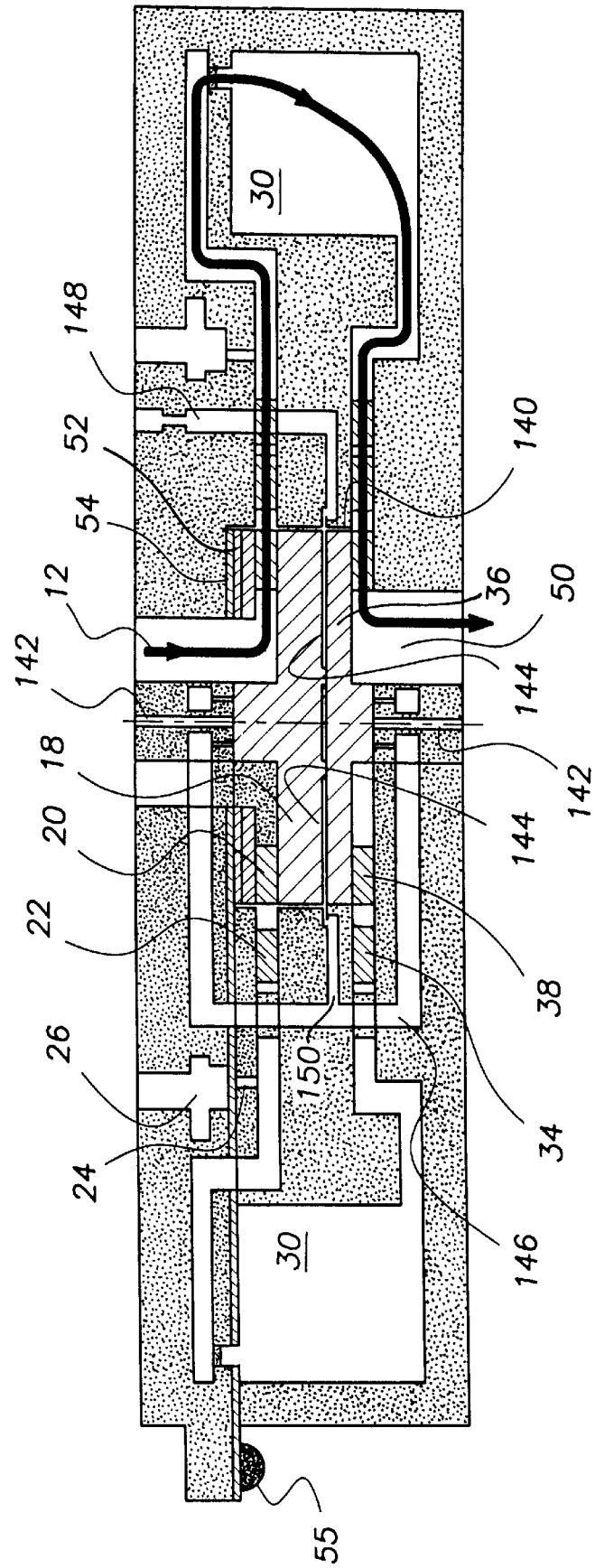
FIG. 9 is a cross-sectional view of a compacted micro-gas turbine engine in accordance with the invention.

Alternatively, a static thrust bearing arrangement can be used, as illustrated in FIG. 9. In operation, the static thrust bearings derive their action from the source of constant pressure supplied through the corresponding supply vent as just described, the pressure drop through which is directly related to the amount of flow being supplied, to the axial gap between the opposing rotor and corresponding endwall. Any excursion of the rotor that opens this axial gap tends to increase the amount of flow supplied to the bearing and hence to increase the pressure drop in the supply vent. The resultant reduction in film pressure effects a reduction in the pressure force on the rotor and constitutes a net effective stabilizing stiffening or spring-like action which works to restore the original position of the rotor. The combined spring-like action of the forward and aft thrust bearings then stabilizes the overall axial position of the rotor and limits its axial excursions under a wide range of unbalancing thrust conditions to thereby prevent contact across the relatively close axial clearances of the thrust bearings themselves, of the turbine and compressor rotor blades and their corresponding tip shrouds, of micromachines configured with the microcompressor or microturbine, and of the clearance axial seals.

Figure 22B:
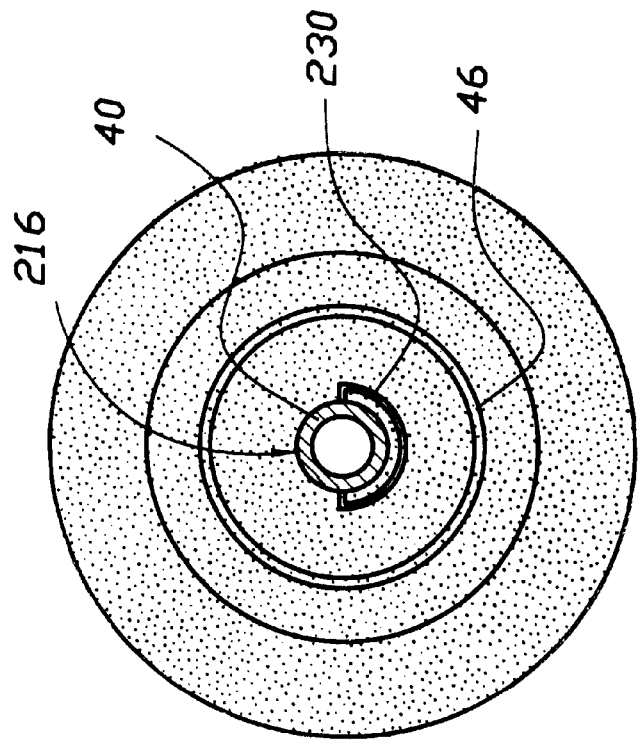
FIGS. 22A–B are a cross-sectional and a plan view, taken at B–B' in FIG. 22A, respectively, of the micro-gas turbine engine of FIG. 1 adapted with a central journal stabilizing seal in accordance with the invention.
Figure 22A:
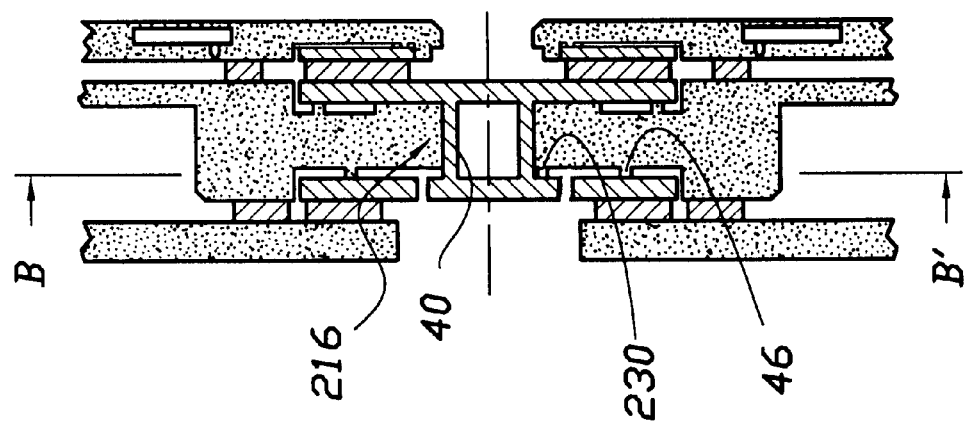

As stated above, the shaft 40 connecting the microturbine and microcompressor forms the radial journal bearing 216. The journal bearing air is supplied 224 from the microcompressor exit, through the aft thrust bearing, and discharges 226 through vent holes 205 in the turbine rotor disk 36, as discussed earlier. As shown in FIG. 22A–B, a turbine rotor balance air seal 46, like that of the compressor rotor (FIG. 21A–B) reduces leakage on the rear face of the turbine rotor.

Because of the low microengine rotor mass and high rotational speed, microengine rotor dynamics must be considered in design of the journal bearing, given that radial rotor instabilities can destroy a machine. One approach provided by the invention for control of microengine rotor dynamics is to raise the rotor critical, i.e., resonant, frequency by way of rotor design such that that the machine operates either subcritically or below the second or third shaft critical frequency, as is done for conventional small gas turbine engines. This is achieved in the invention with small, e.g., less than about 1 μm, radial clearances for the radial bearing, which impose large viscous losses in the bearings, on the order of tens of watts, and which demand rather tight fabrication tolerances.

An alternative, preferable approach to microengine rotor stability provided by the invention is a microengine rotor design characterized in that the first few critical frequencies are well below the microengine operating range. In this design, the radial clearance between the microengine shaft 40 and the journal 216 inside diameter is relatively large, e.g., between about 5–20 μm, with a result that the radial bearing losses are low, generally less than about 1 watt, and the first critical frequency is below about 1% of the microengine speed. Microengine rotor stability is here then achieved by positioning the rotor eccentrically, that is, by positioning the center of the shaft slightly offset from the center of the journal. Such an eccentricity scheme is generally known to have a stabilizing influence on journal bearings.

In the invention, the microengine rotor is eccentrically positioned with respect to the journal by imposing asymmetric pressure about the journal circumference. In one example, such circumferential pressure asymmetry is provided by an arrangement of seals and bleed holes on the shaft side of the turbine rotor, as shown in FIGS. 22A–B. A circumferential bearing side force seal 230, extending over about 180° of the journal circumference, is located radially inward of the circumferential array of vent holes 205 on the turbine rotor disk 36. The seal is formed by, e.g., a raised ridge, which reduces the clearance between the stationary and rotating parts, thereby introducing a flow restriction between the bearing discharge 226 (FIG. 20) and the vent holes. This in turn raises the pressure in that part of the circumference so sealed compared to the rest of the annulus, which has no such restriction on the bearing outflow. The magnitude of the side force so generated, and thus the microengine rotor eccentricity, can be adjusted by changing the circumferential extent of the seal, the seal clearance, and the radial position and diameter of the vent holes on the turbine rotor disk, as can be recognized. A shaft offset of, e.g., between about 40–90% of the mean radial clearance is preferable.

Figure 23:
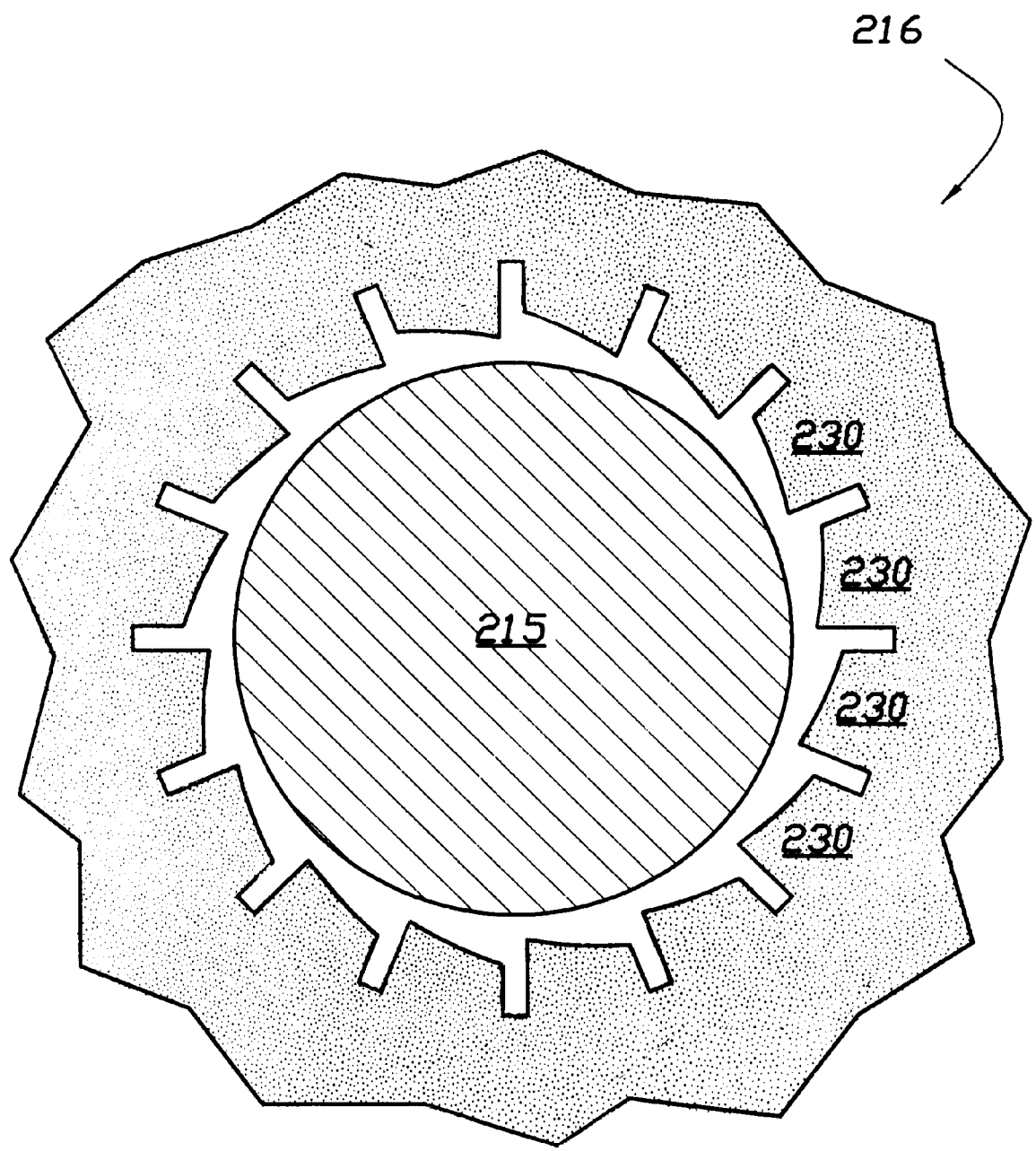
FIG. 23 is a plan view of a segmented journal provided by the invention.

Referring to FIG. 23, in an alternative configuration provided by the invention, the journal bearing is stabilized by adopting a segmented journal geometry in which the outer journal surface 216 is broken into discrete, segmented journal pads 230 in a manner as is conventional. The spaces between the pads vent the pad edges, enforce colinearity of the load and support, and break up the cross-coupling characteristic of smooth journals, which generally leads to instability. The segmented journal pads also increase the effective aspect ratio of the journal bearing surface in the local region of each pad, further enhancing stability. The segmented journal geometry is well-suited to microfabrication technology and thus is easily manufactured. The principal penalty paid for the journal segmentation is loss of load-bearing capability, but that capability remaining is sufficient for most microengine applications.

As can be recognized, other bearing schemes beyond the self-pressurizing thrust bearings just described can be employed with the microengine of the invention. For example, hydrostatic bearings can be employed in which high pressure air, provided from, e.g., the compressor discharge, is fed through bleed holes on the thrust plate to support the bearing, as in the configuration shown in FIG. 9. This provides increased flexibility in thrust bearing design at the cost of increased fabrication complexity.

Many other bearing arrangements are suitable with the microengine of the invention. Specifically, the external rim of the compressor and turbine rotor disks can function as the journal bearing. Here, the microengine rotor shaft serves only to thermally isolate the turbine and compressor and so can be relatively short. In this case, it may be convenient for some applications to position the rear thrust bearing at the aft center of the turbine rotor disk supported on a spider, in which case the turbine exit nozzle is then annular, as in the configuration shown in FIG. 9.

Micromotor-compressor

The microcomponentry and subsystems provided by the invention for the micro-gas turbine engine and its adaptations have many applications in themselves that are exploited in the invention to enable a wide range of energy and thermodynamic cycles.

In a first example of a thermodynamic process enabled by microcomponentry of the invention, a micromotor-driven compressor 232 is provided, as shown in FIGS. 24A–B. The diameter, D, of the microcompressor is, e.g., about 9 mm and the thickness, T, is about 2 mm; at this size, an airflow of about 0.11 grams/sec at STP inlet conditions is accommodated.

As with the microengine compressor, the micromotor-compressor 232 includes a compressor rotor disk 18 the centerline of which is the microcompressor inlet 16. Unlike the microengine application, however, the rotor disk here is not attached to a rear face shaft. Compressor rotor blades 20 are provided on the rotor disk in the geometry previously discussed, as are stationary compressor diffuser vanes 22 about the disk. A rotor blade tip shroud 52 is provided over the blades, and acts as the rotor for a micromotor, e.g., an induction motor, having stator electrodes 54 on the inner housing, as described previously with regard to the motor-generator of the microengine.

The micromotor-compressor rotor disk is supported on a radial gas bearing 234 at the disk rim that is fed by radial exhaust out of the rotor. Axial rotor disk loads are supported by thrust plates; the forward thrust plate is formed of the tip shroud 52 and stator 54, and the rear thrust plate 236 is formed of the aft face of the rotor disk and the aft housing endwall. Both the aft and rear thrust plate bearings are fed by the radial rotor discharge, with the forward bearing exhausting out the forward vent holes 237 and the rear bearing exhausting out of rear bearing air vents, a first vent 238 at the centerline and a second vent 240 rear of the journal bearing.

The aft face of the micromotor-compressor rotor disk is optionally provided with a conducting layer to form the rotor for an aft motor configured in registration with aft stator electrodes 242. For low pressure ratio and correspondingly low power applications, only one of the two motors is needed.

In operation, air fed at the inlet 16 passes through the rotor disk blades and, as air exits the compressor rotor, it takes on a large angular momentum that is removed by the diffuser vanes and converted to a rise in static pressure. The resulting high-pressure air is then discharged through one or more air discharge vents 244. The total discharge area is preferably about equal to the radial flow area, e.g. about 7 mm² in this example. Many other discharge arrangements can be employed, including, e.g., forward, aft, and radial arrangements, and are preferably selected to accommodate a given application requirement. At an operational speed of about 1.9×10⁶ RPM, the micromotor-compressor can produce a pressure ratio of about 2:1 while consuming about 17 watts of power. At an operation speed of about 2.5×10⁶ RPM, the pressure ratio produced by the micromotor-compressor is about 4:1.

The micromotor-compressor can be employed as a source of compressed air of, e.g., up to about 7–9 atm pressure rise for, e.g., manufacturing or ventilation applications. Modular arrays of such units can be employed for providing larger pressure ratios and larger airflow rates. In one application enabled by the micromotor-compressor of the invention, fuel cells in the range of about 100 watts are pressurized by the compressed air discharge.

The micromotor-compressor can also be employed as a fluidic micropump to pump liquids for, e.g., medical applications, microrocket motors, automatic applications such as fuel or brake fluid pumping, or other applications requiring mass flows up to about 50 grams/sec and delivery pressures up to about 200 atm. Indeed, recall in connection with the planar micro-space power unit described earlier the use of a compressor rotor disk for pumping liquids such as fuel; the compressor rotor blade shapes described above can pump liquids as well as gases. As can be recognized from that discussion, it is preferable that the blade shapes be optimized for a particular pressure rise and flow rate desired for a given application. The bearing geometries are also amenable to liquid as well as gas bearings, with small changes in gaps and feed hole sizes As discussed in connection with the space-power unit, electrostatic micromotors can here be employed with the micropump, but the use of electrostatic micromotors confines the pump to only electrically nonconductive liquids. The pumping of conductive liquids requires the use of either an electromagnetic motor or the removal of the motor from the liquid, using, e.g., a shaft and seal configuration.

For liquids with a specific gravity of about 1, the micropump can accommodate liquid flow rates of up to about 50 grams/sec. Several hundred atmospheres of pressure rise can be achieved without exceeding the structural limitations of the micropump material. Combinations of large mass flows and larger pressure sizes require several hundred watts of pumping power, which in some cases may challenge the power capability of the micromotors. In these cases, turbopumps can be employed. A turbopump consists of a turbine-driven pump in a configuration like that of the micro-gas turbine. As discussed below, the use of a high pressure gas supply in such a configuration enables this operation.

The high peripheral rotational velocities of the micromotor-compressor lend the compressor as a micro-gas centrifuge for isotope separation. Here the individual centrifuges and heat exchangers can be interconnected in series on the wafer level to provide the needed separation. Other such applications of the micromotor-compressor are contemplated by the invention.

Microturbine-generator

Figure 25A:
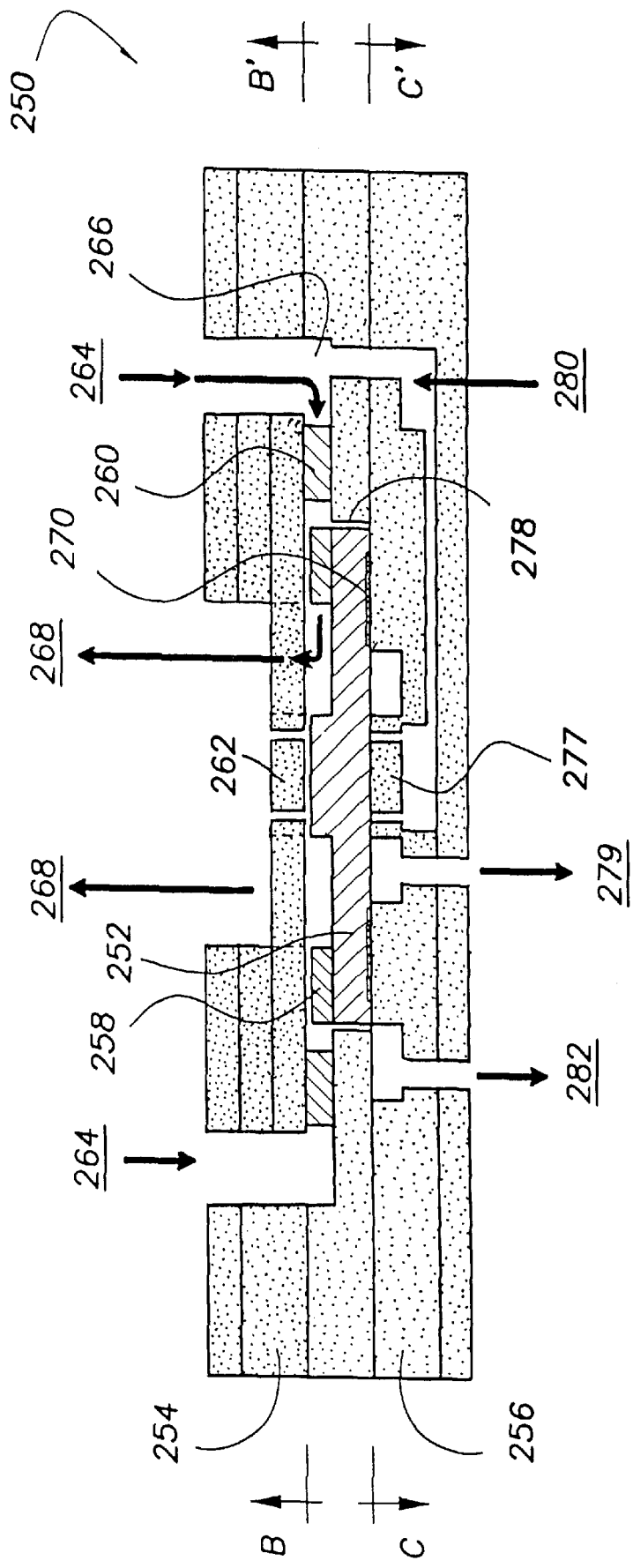
FIG. 25A is a cross-sectional view of a microturbine-generator in accordance with the invention.

Referring to FIG. 25A, a microturbine-generator 250 in accordance with the invention is illustrated. The microturbine-generator includes a relatively thin, disk-shaped rotor 252 sandwiched between two end support plates, namely, a forward support plate 254 and an aft support plate 256. The forward side of the rotor disk functions as a microturbine, while the aft side functions as a microgenerator.

Referring also to FIGS. 26A–B, the turbine rotor 252 has a thickness of, e.g., between about 300 $\mu$m–600 $\mu$m and a diameter of, e.g., about 4 mm. There is provided on the rotor blades 258 having a geometry like that described previously. Stationary vanes 260 are provided at the radial periphery of the turbine rotor. As in the previous designs, the vanes and rotor blades are untapered and preferably of constant height, e.g., about 200 $\mu$m in height. While the number of vanes and blades can be varied, in one example, the rotor has 20 rotor blades and 24 vanes are provided.

In operation, compressed gas is supplied at the annular inlet 264 of the microturbine-generator. Essentially any practical source of compressed gas can here be employed. If the temperature of the gas to be used is no more than about 900° K, then the microturbine-generator can be constructed entirely from silicon. Alternatively, as discussed earlier, silicon carbide can be used for applications up to at least about 1600° K.

Inlet gas flows aft in the turbine and turns radially inward 266 to pass through the vanes 260 and turbine rotor blades 258, after which the gas turns forward and is exhausted 268 back out of the forward end wall of the microturbine-generator. As the inlet compressed gas causes the turbine rotor to turn, power is generated by way of the microgenerator on the aft side of the turbine rotor. The microgenerator is formed of the continuous turbine rotor disk aft face and an array of stator electrodes 270 arranged on the aft support plate 256 opposite the rotor. With this configuration, the generator operates as an electric induction-type generator in the manner described in connection with FIGS. 5 and 6. Likewise, electric power produced by the microgenerator can be controlled and collected for driving a load as discussed above. As can be recognized, other generator configurations are also suitable.

Turning also to FIGS. 25B–25C, the forward support plate 254 defines the circumferential geometry of compressed gas inlets 264 and the microturbine exhaust 268. A forward hydrostatic thrust plate bearing 262 of the turbine rotor is provided by the central region of the rotor disk and a corresponding region 262 of the forward plate 254. This central plate region 262 is connected across the exhaust vent 268 by, e.g., a plurality of struts 272. Forward thrust bearing supply orifii 274 are provided in the central plate region to maintain the hydrostatic pressure.

Similarly, as shown in FIG. 25C, the aft support plate 256 provides an aft hydrostatic thrust plate bearing 277 with the central region of the turbine rotor disk. The aft bearing 277 is maintained at pressure with supply orifii 273 in the central region of the aft support plate 256. The aft thrust bearing is supplied with air by a pressurization channel 280 and exhausted out of an exhaust vent 279 provided in the aft support plate. The aft support plate also provides the stator electrode array 270 in registration with the turbine rotor.

A journal bearing is provided by the rim 278 of the turbine rotor; differential pressurization of the journal is provided by exhausting one sector of the journal bearing pressurization out of a journal bearing exhaust vent 282 in the aft support plate 256, while the remainder exits through the aft thrust bearing exhaust 279. This pressurization scheme provides a side force to stabilize the journal bearing. The journal bearing pressurization channel 280 is also employed as a cooling channel for cooling the microgenerator during operation. Cooling air passing through the microgenerator is exhausted out of the aft thrust bearing exhaust vent 279 in the aft support plate.

With this configuration, the microturbine-generator can be operated to turn the turbine rotor at about 2.4 million RPM. Given a rotor blade height of about 200 microns, the microturbine can produce about 80 watts of power at an inlet gas flow of about 0.4 g/s, at about 8 atm and about 600° K. Many applications are well-suited to the microturbine-compressor, given its elegantly simple operational requirements. For example, the microturbine-generator can be employed to power local electronics on a factory floor, or indeed any location where compressed air is generally readily available. Such an application is particularly important where, e.g., factory power lines are often noisy due to large electrical equipment loads, local powering of electronics therefore being preferable to central powering schemes. Underwater and space applications for power, in which compressed gas can be generated by chemical means, are also well-addressed by the microturbine-generator. Arrays of microgenerator units can be employed locally or in a distributed arrangement to accommodate specific needs of an application and thus, as can be recognized, are adaptable to a wide range of power production needs.

Thermodynamic Cycles

In common thermodynamic nomenclature, the micro-gas turbine engine is an open-loop "Brayton" or "air" cycle intended for power production and propulsion. But the micro-components of the microengine, i.e., the microturbine, microcompressor, micromotor-generator, micro-heat exchangers, and other subsystems provided by the invention can be rearranged to form other thermodynamic cycles for a variety of power generation, heating, and cooling applications. The power levels of the systems vary with the details of each cycle but are on the order of tens of watts.

Figure 27A:
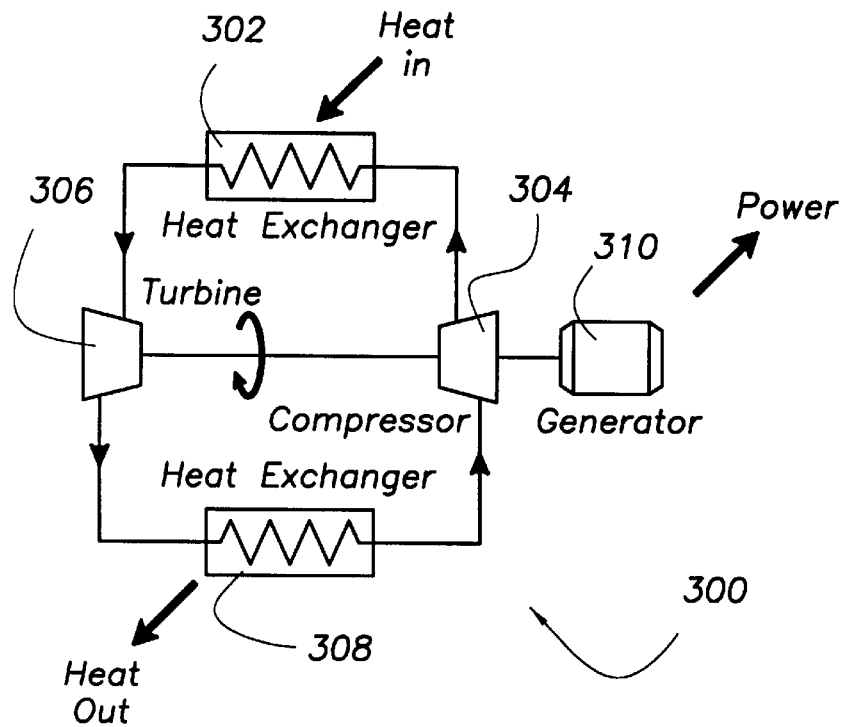
FIG. 27A is a closed-loop micro-Brayton cycle for power generation formed of microcomponents of the invention.

Referring to FIG. 27A, a second class of thermodynamic cycles enabled by the invention is the closed-loop Brayton, or air, power generation cycle 300. An externally-heated micro-heat exchanger 302 is connected between a microcompressor 304 and microturbine 306. The microturbine exit is in turn connected to the microcompressor inlet through a low-temperature micro-heat exchanger 308 that rejects heat to the environment. In this configuration, the closed-loop Brayton cycle 300 generates power through a microgenerator 310 connected to the turbine rotor; the externally-heated microheat exchanger 302 thereby substitutes for a microcombustor. The working fluid used in the closed-loop cycle can be air or other suitable phase, e.g., a xenon-helium mixture can give superior performance.

Figure 27B:
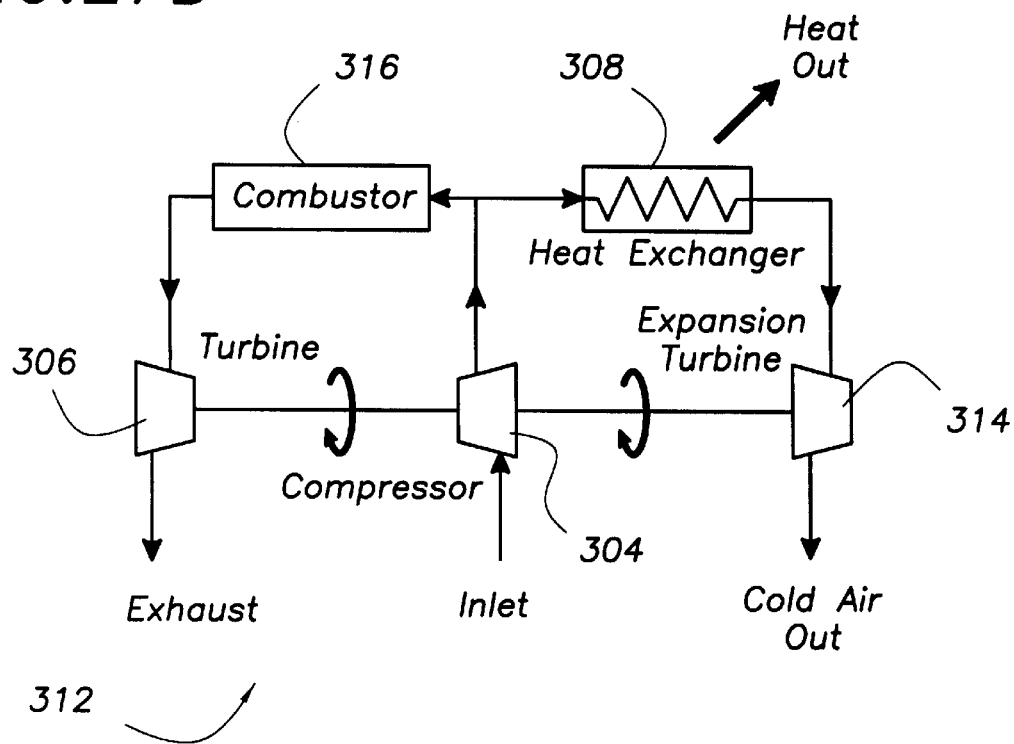
FIG. 27B is an open-loop micro-Brayton cycle cooling for cooling formed of microcomponents of the invention.

The microcomponents of the invention can also be configured in an open-loop Brayton cycle employed for cooling. In a first example of such a system, shown in FIG. 27B, an open loop air cycle cooler 312 is formed by bleeding up to about 50% of the high pressure air exhausted from a microcompressor 304, and directing this air through a microheat exchanger 308, thereby cooling the air to about ambient. The cooled air is then expanded through an expansion microturbine 314 to ambient pressure, thereby dropping the gas temperature to well below ambient. A microcombustor 316 and microturbine 306 are employed in the loop to run the microcompressor 304 and micro-heat exchanger 308, as in the microengine. This cooling cycle can be adapted to liquefy gas using a microturbo-expander scheme in place of the microcombustor configuration.

Figure 27C:
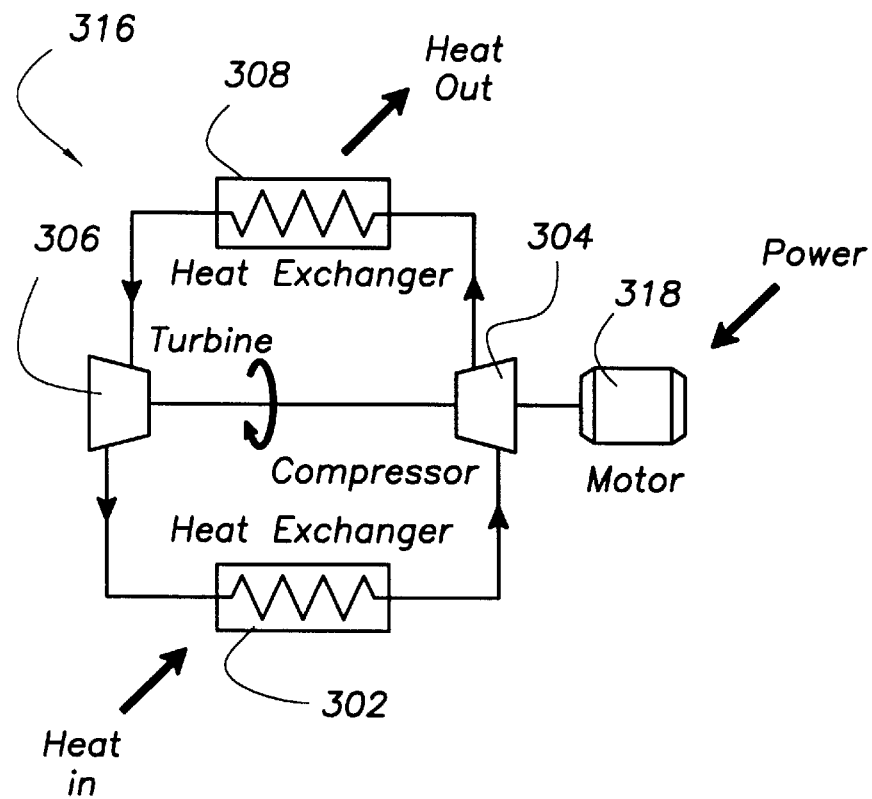
FIG. 27C is a closed-loop micro-Brayton cycle for cooling formed of microcomponents of the invention.

A closed-loop Brayton cycle cooler 316 can also be configured in accordance with the invention, as shown in FIG. 27C. Here, a low-temperature micro-heat exchanger 308 that rejects heat to the environment is connected between the output of a microcompressor 304 and the input of a microturbine 306. The microturbine exit is in turn connected to the microcompressor through an externally-heated micro-heat exchanger 302. A micromotor 318 is employed to power the cycle, whereby ambient cooling is achieved. The microturbine can be replaced with an orifice, trading cycle efficiency for fabrication simplicity.

Figure 27D:
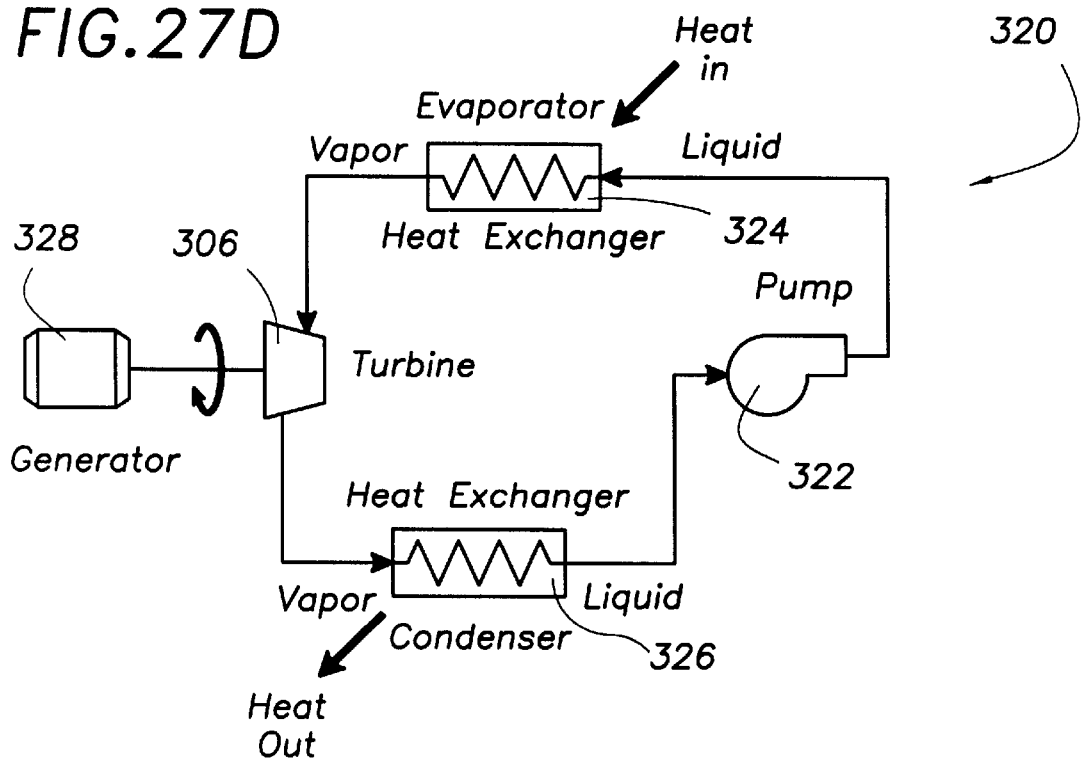
FIG. 27D is a closed-loop micro-Rankine cycle for heat pumping or power production formed of microcomponents of the invention.

In a further example of a thermodynamic cycle enabled by the invention, a Rankine cycle, or vapor cycle 320, shown in FIG. 27D, is provided in which advantage is made of the phase change of a working fluid in the cycle closed loop to either produce power or pump heat. In a heat pump configuration, a micropump 322 is provided to pump a liquid, the pump being driven by, e.g., a microturbine 306 or alternatively, a micromotor. A microevaporator 324, formed of a micro-heat exchanger at the compressor exit, is employed to collect ambient heat; a microcondenser 326, also formed of a micro-heat exchanger, is located at the turbine exit to dissipate heat. Alternatively, when the pump is driven by an electric motor, the turbine can be replaced with an expansion orifice, trading cycle efficiency for fabrication simplicity. In this heat pump scenario, the working fluid of the closed loop is preferably chosen to match the heat addition and rejection temperatures for a given application. Example working fluids include refrigerants for low temperature applications, water for higher temperature application, and liquid metals for very high temperature applications. In an alternative scenario, the closed loop generates power through the generator 328 in a manner similar to that of the closed-loop Brayton cycle.

As can be recognized, additional micro-heat exchangers and microcompression stages beyond those illustrated can be added to this and each of the cycles described above to achieve enhanced performance for a given application; for example, intercoolers and multiple compressors can be added to improve microengine power production capabilities. In any case, the cycle microcomponentry can be manufactured, based on the fabrication techniques discussed later, as modular microcomponents or as integrated systems. In addition, the various adaptations and modified configurations described above can be applied to the cycle microcomponentry. For example, the shafts shown in the figures for driving the microcompressors can be eliminated by employing a microelectric motor drive of the microcompressors. Other such adaptations are readily apparent.

Many applications exist for the micro-power and micro-cooling cycles of the invention. In one example, a solar power system is provided that employs a solar concentrator to focus energy on an inlet micro-heat exchanger of the Brayton or Rankine cycle, with the waste heat being rejected through convection, in terrestrial applications, and through radiation, in space applications. Such a system can provide at least about twice the efficiency, i.e., power per unit collection area of conventional solar battery technology.

In a further application example, chemical reactions are employed in one of the closed-loop cycles to generate heat for, e.g., underwater applications such as diving. These power cycles can also be used in applications for generating power from waste heat, thereby functioning as a "bottoming cycle," from a micro-gas turbine, an internal combustion engine, or a building heating system. When configured for cooling, these cycles can cool electronics such as semiconductor chips, wafer-scale subsystems, or modular arrays, for example, as well as sensors, and people, e.g., in an integral cooling garment provided for protective suits, hot climates, or similar scenarios. For some of the larger applications, human cooling, for example, several microcooling units can be arrayed in a manner similar to that described above for arrays of microengines. As can be recognized, still other applications exist for the thermodynamic microcycles of the invention; the light weight and efficiency of the microcycles gives them superior advantages over conventional macro-scale cycles for many applications and enables many thermodynamic applications heretofore not practical.

Micro-gas Turbine Engine Fabrication

The invention provides microfabrication techniques for manufacturing the microengine and its variations using batch processing sequences. As explained earlier, the materials selection for the microengine is generally dictated by a given application; for example, relatively low-temperature applications call for the use of, e.g., silicon microcomponentry, while high-temperature applications are best addressed by a refractory ceramic such as silicon carbide. An example manufacturing process for producing a silicon-based microengine is first presented, after which variations and subsystem manufacturing sequences are discussed. Silicon carbide and other materials systems are then presented.

The silicon microengine is fabricated using silicon wafers, e.g., 4 inch, <100>double polished wafers of between about 10–20 Ω-cm, n-type or p-type wafers. The wafers are preferably cleaned throughout the fabrication sequence in the conventional manner, using, e.g., a standard RCA cleaning procedure. In the cross-sectional figures referred to throughout the fabrication discussion, only a symmetric right-half of the microengine is shown, with the centerline at the left side of the cross sections. The microengine is fabricated by successive combinations of chemical vapor deposition (CVD) of various conducting and insulating layers, photolithographic patterning, masked etching, and wafer-to-wafer fusion bonding.

Figure 28A:
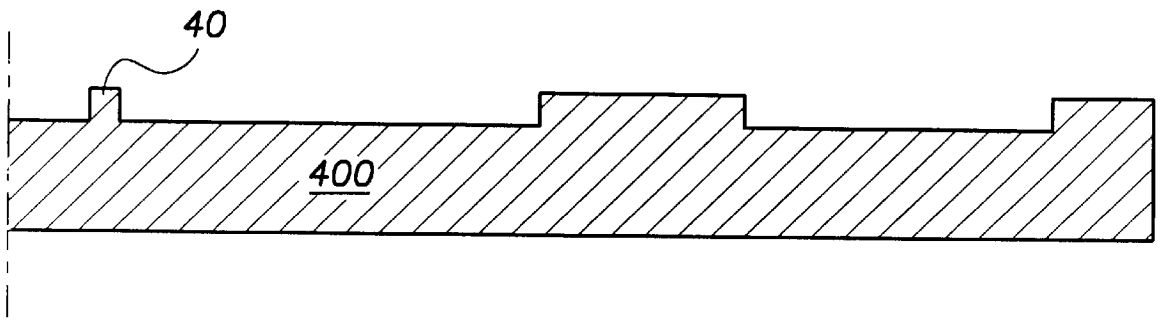
FIGS. 28A–W are cross-sectional views of a fabrication process in accordance with the invention for manufacturing the micro-gas turbine engine of FIG. 1.

Turning then to FIG. 28A, there is shown a first silicon wafer 400 of, e.g., about 830 $\mu$m in thickness, employed to form portions of the microengine core housing. A first standard photolithography masking process is undertaken to pattern a masking layer (not shown), e.g., CVD oxide, to act as a mask for a shallow trench etch of about 2 $\mu$m. Throughout the fabrication sequence, such standard photolithography and masking layers will not be illustrated as they are well-known, conventional processes. The trench etch is completed using, e.g., a plasma etch chemistry of $SF_6/O_2$. The etch produces a feature that later defines the wall of the microengine shaft 40.

Figure 28B:
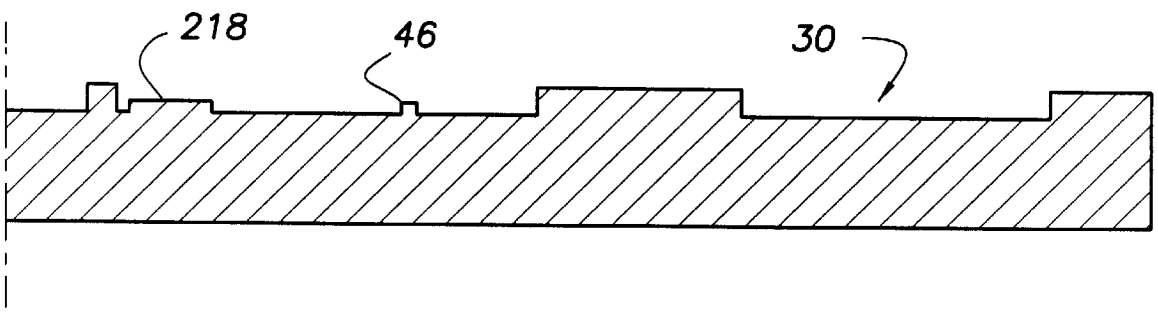

A second masked plasma etch is then completed, as shown in FIG. 28B, to produce a trench of about 50 $\mu$m. In a preferred process, an $SF_6$-based plasma trench etch chemistry, available from Surface Technology Systems, Ltd. (STS), of Redwood City, Calif., in the STS model ICP etcher, is employed to produce the trench, which produces the microengine rotor seals 46, and aft compressor rotor bearing 218, and removes interior material at locations for later definition of the microcombustor 30. This trench etch chemistry and process are described in U.S. Pat. No. 5,501,893, issued Mar. 26, 1996, the entirety of which is hereby incorporated by reference. As can be understood, other plasma etchers and etch chemistries can be employed; preferably, the etcher and chemistry selected is capable of etching deep trench geometries having high aspect ratios.

Figure 28C:
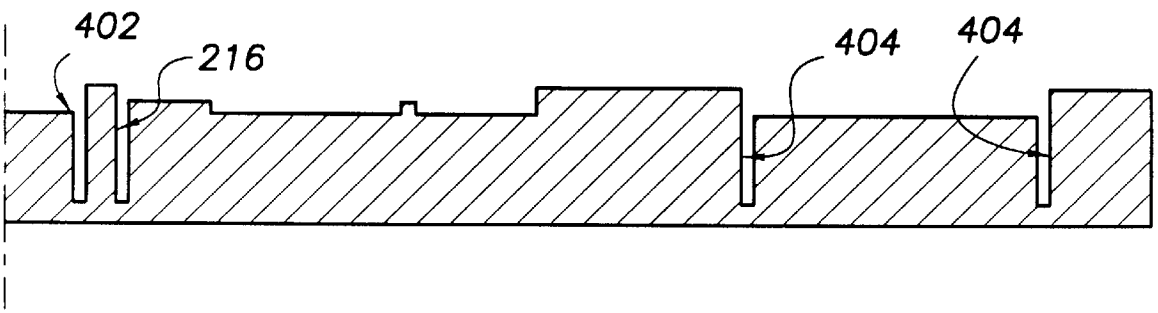

Referring to FIG. 28C, a deep trench etch is then completed to define the clearance of the journal bearing 216 and to define areas 402, 404 of the wafer that delimit large wafer sections to later be removed for producing the microengine rotor shaft and the microcombustor, respectively. The deep trench etch preferably extends to about 780 $\mu$m into the wafer and is accomplished using an $SF_6$-based plasma chemistry in the STS etcher. This deep etch requires a tri-level masking sequence, e.g., a conventional polyimide-based tri-level photoresist system employing a planarizing layer, a hard mask layer, and a lithographic layer.

In one suitable tri-level masking process, a planarizing layer, e.g., polyimide, is spun on the wafer and cured or baked as is conventional. A hard mask material is then deposited, e.g., by evaporating a layer of aluminum. This hard mask material is patterned using a standard photoresist layer and lithographic processing techniques and is then employed as a mask for reactive ion etching of the underlying polyimide layer. The aluminum mask is then stripped, exposing the patterned polyimide layer for use as the mask during the deep trench etch process described above.

Figure 28D:
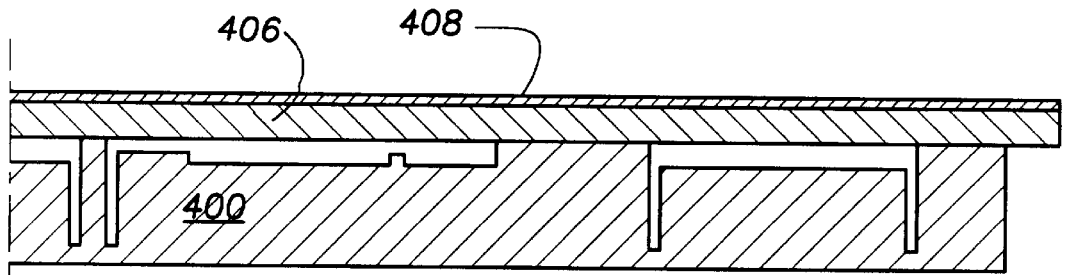

As shown in FIG. 28D, a second wafer 406 is then fusion bonded to the etched side of the first wafer 400. The fusion bonding process is completed using the conventional sequence of first cleaning the two wafers in an RCA cleaning step, then contacting the wafers in a manner that eliminates air pockets between the wafers, and then annealing the contacted wafers in an inert gas at a temperature of between about 800° C.–1100° C. for about 60 minutes. Because the fusion bonding process produces a true fusion of the wafers, the distinction between the first and second wafers is lost after the bonding process. The second wafer 406 is then thinned to about 240 $\mu$m using a conventional chemo-mechanical silica slurry polish process. An insulating layer 408 is then deposited on the back side of the second wafer.

One suitable insulator is a low-stress, silicon-rich silicon nitride layer of about 2 $\mu$m in thickness. In an example deposition process for producing this layer, dichlorosilane and ammonia are reacted in a ratio of between about 4:1 and 10:1 in a vertical tube, low pressure reactor at a temperature of between about 700° C.–800° C. and a pressure of between about 200 mTorr–300 mTorr.

Figure 28E:
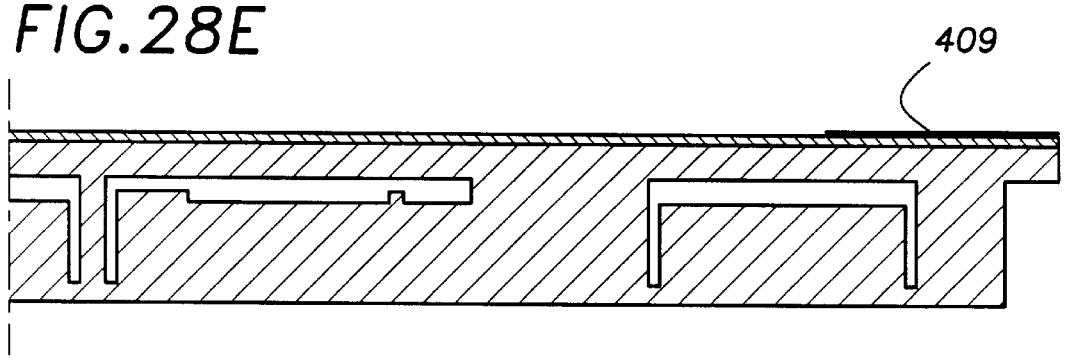

At this point, as shown in FIG. 28E, a resistive heater layer 409 is deposited to act as the microengine ignitor. One example resistive heater layer is a titanium/platinum conductor, produced by first E-beam evaporation of a standard titanium adhesion layer and then evaporation of a platinum layer of about 1000 Å in thickness, both layers being patterned by, e.g., a lift off process using an image reversal photoresist system.

Figure 28F:
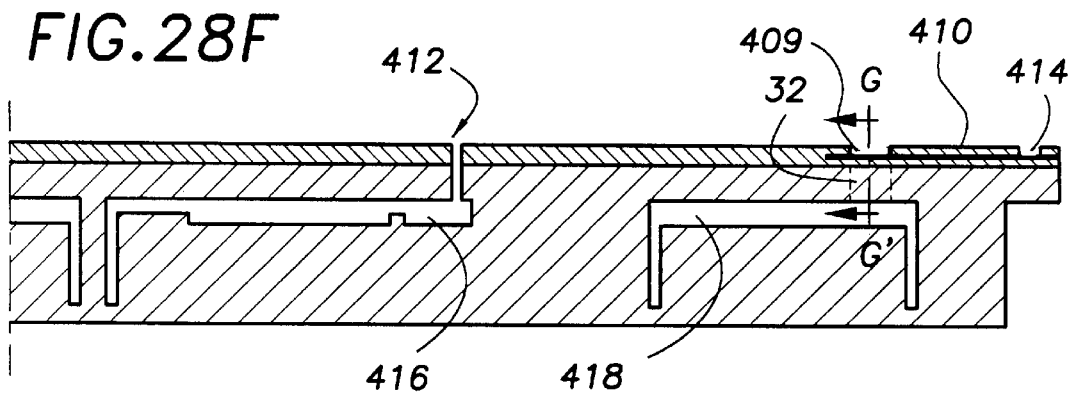

Illustrated in FIG. 28F, the patterned resistive heater layer 409 is then coated with a second insulating layer 410 of, e.g., low-stress, silicon-rich silicon nitride, of a thickness of about 1 $\mu$m, and the layer is planarized using, e.g., a chemo-mechanical polishing process. The resulting smooth surface serves as a fusion bonding surface and an etch stop layer in further processing steps. Note that for some silicon etch chemistries, the silicon nitride layer may not prove to be a sufficient etch stop layer. For microengine embodiments to be operated at less than about 600° C., an oxide layer can be substituted for the silicon nitride layer; such an oxide layer may provide a better etch stop for some silicon etch chemistries. This oxide layer can be employed alone or in combination with an underlying low stress silicon nitride layer. If the oxide layer is deposited, rather than thermally grown, it preferably is polished to provide a sufficiently smooth bonding surface. Throughout the remaining fabrication discussion, it is intended that an oxide layer can be substituted where a silicon nitride layer is suggested, based on etch selectivity requirements of a given fabrication process.

The insulating layers 408, 410, and the second wafer 406 are then etched using an $SF_6$-based plasma chemistry to define the rim 412 of the compressor rotor disk. This etch also defines the microcombustor inlet ports 32 and a contact region 414 for electrical connection to the resistive ignitor 409. Note that the trench etch is stopped at the juncture with the cavities 416, 418 previously formed by the wafer bonding process.

Figure 28G:
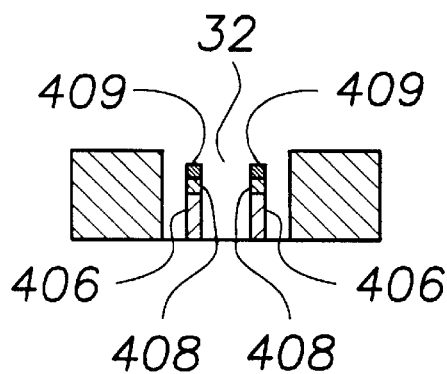
Figure 28H:
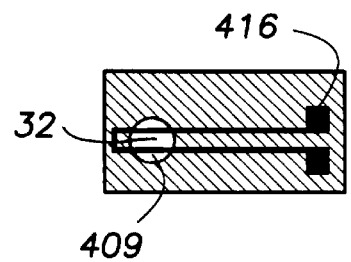

As shown in FIG. 28G, which is a cross-sectional view of the combustor inlet port 32 taken at G–G', and FIG. 28H, which is a top-down plan view of the combustor inlet port, the ignitor 409 is preferably defined as a conducting trace that forms a loop having two legs, each of which cross over the combustor inlet port and that provide contact pads 416 in the location of the contact region 414 for external contact with the pads. Note in FIG. 28G that the ignitor, being a refractory metal, is not etched by the plasma chemistry, and thus acts as an etch mask to the underlying silicon nitride layer 408 and second wafer 406. With this configuration, the two legs of the ignitor loop and their underlying materials are suspended across the combustor inlet port 32 above a cavity 418.

The ignitor of FIG. 28H is shown as being partially suspended across the combustor inlet 32. The advantage of this design is that the electric power required to heat the ignitor to ignition temperature is reduced by the thermal isolation of the suspended segment of the structure. However, in some cases, the presence of the suspended segment may interfere with the air flow pattern so as to disrupt the effectiveness of the combustor inlet port. In such cases, the resistive ignitor metal can alternatively be positioned adjacent to but not suspended over the combustor inlet port opening, e.g., so as to surround it on three sides. While greater electric power is required to heat such an ignitor to ignition temperature, the air flow pattern in the combustor inlet port is not disturbed by the presence of the ignitor.

Figure 28I:
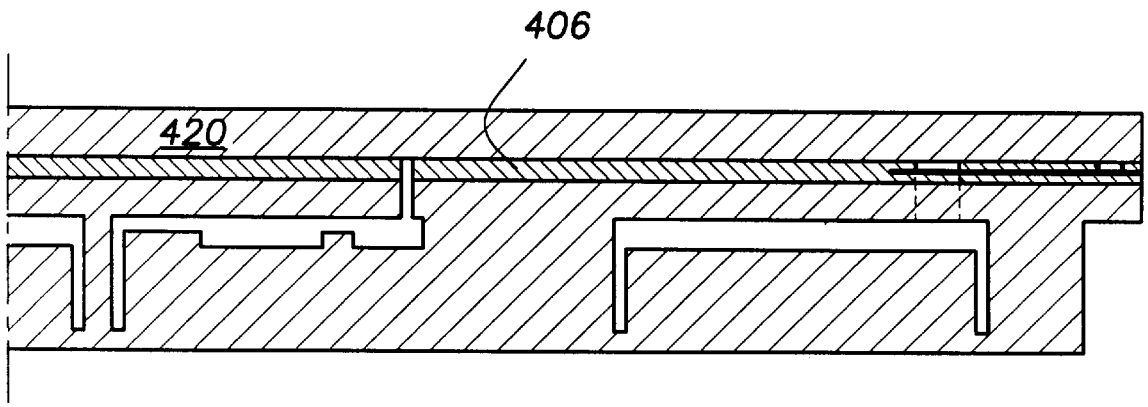
Figure 28J:
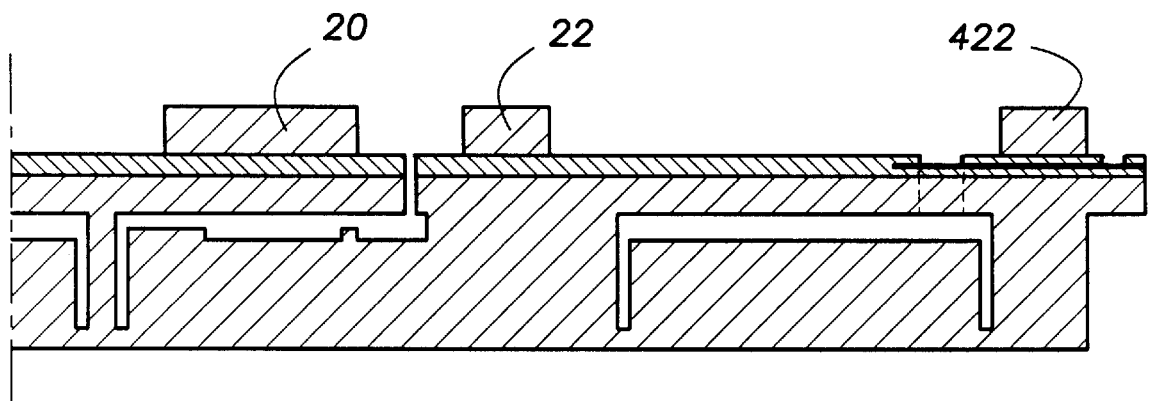

Turning to FIG. 28I, a third wafer 420 is then fusion bonded, using the conventional bonding sequence described above, to the second wafer 406. The third wafer 420 is thinned to about 300 μm in thickness using a chemo-mechanical polishing process, and then a deep trench etch, through the entire thickness of the third wafer, is undertaken, as shown in FIG. 28J. This patterned etch, using an $SF_6$-based plasma chemistry in the STS etcher, defines the compressor rotor blades 20, the microcompressor diffuser vanes 22, and a radially peripheral endwall 422 of the microengine core.

It is preferable to produce fillets of about 30 μm in radius at the base of the rotor blades to reduce operational stresses at that point. Such fillets can be produced by careful control of the patterned etch endpoint, by, e.g., timing the etch or adjusting the plasma pressure, chemistry, or other reaction conditions near the end of the expected etch duration, to achieve a less directional, more isotropic etch profile at the base of the etched blades. Such end-point tailoring of etch conditions, as is commonly employed in conventional plasma etch processes, can also be employed later in the fabrication sequence in defining the turbine blade configuration.

Figure 28K:
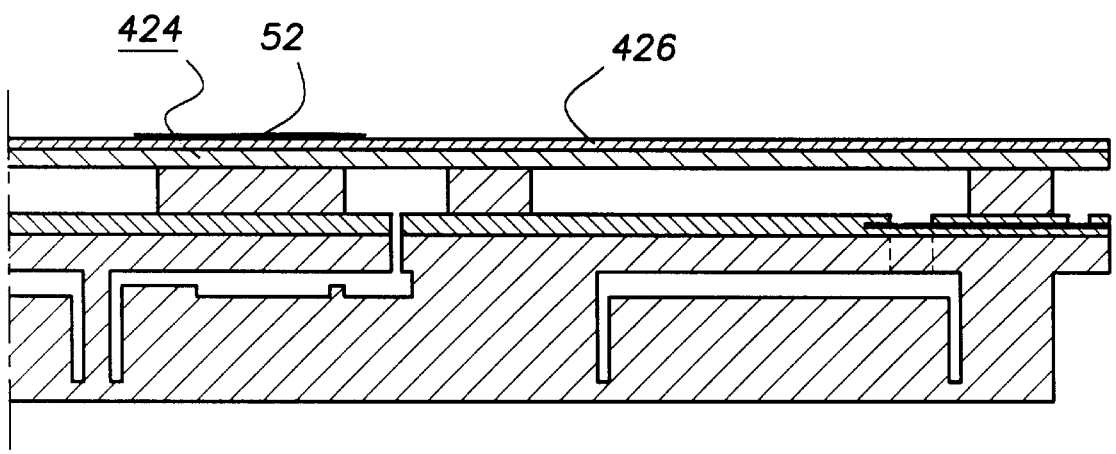

Next, as shown in FIG. 28K, a fourth wafer 424 is fusion bonded to the third wafer and is then thinned by chemo-mechanical polishing to about 100 μm in thickness. An insulating layer, e.g., a silicon dioxide layer 426 of, e.g., about 10 μm in thickness, is then deposited and planarized, and a conducting layer is deposited to define the conducting tip shroud 52 of the compressor rotor blades. The conducting tip shroud 52 is preferably formed of a thin film semiconductor, such as fine-grained polysilicon produced by a standard CVD process, and is patterned to achieve a desired resistivity for operation of the induction motor-generator, as explained earlier, based on the intended temperature and operating frequency. Specifically, the shroud layer is patterned, using, e.g., an $SF_6$ plasma chemistry, to achieve an effective in-plane net sheet resistivity of between about 100–1600 MΩ/□, preferably closer to about 1600 MΩ/□, at the anticipated operating temperature, e.g., below about 200° C., and frequency, e.g., 10 MHz, of the silicon microengine.

Figure 28L:
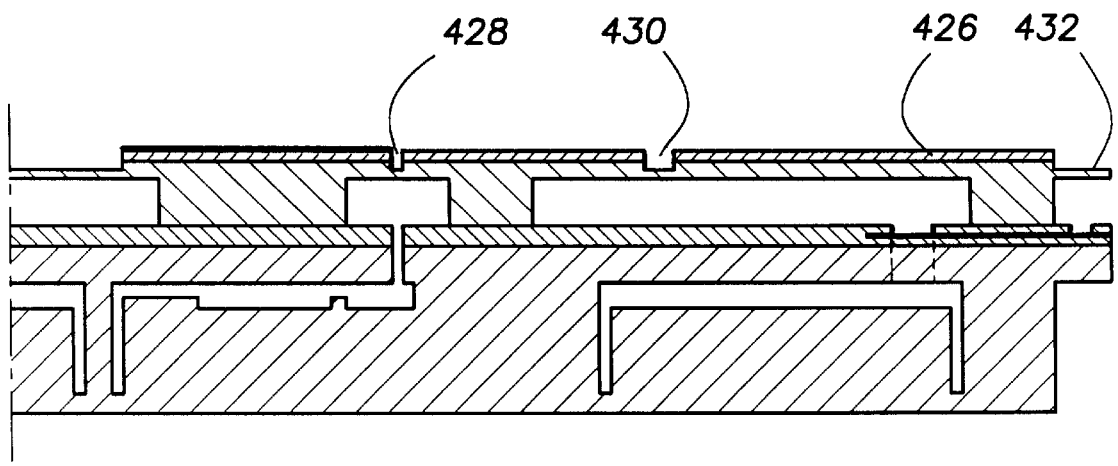

Following the shroud etch process, a masked plasma trench etch of about 50 μm is undertaken through the thickness of the silicon nitride layer 426 and into the fourth wafer to define, as shown in FIG. 28L, an annular cut 428 for later release of the compressor rotor and to define a circumferential array of cuts 430 for later formation of the fuel injector orifii. The trench etch also forms a handle 432 for later use in manipulation of the wafer laminations.

Figure 28M:
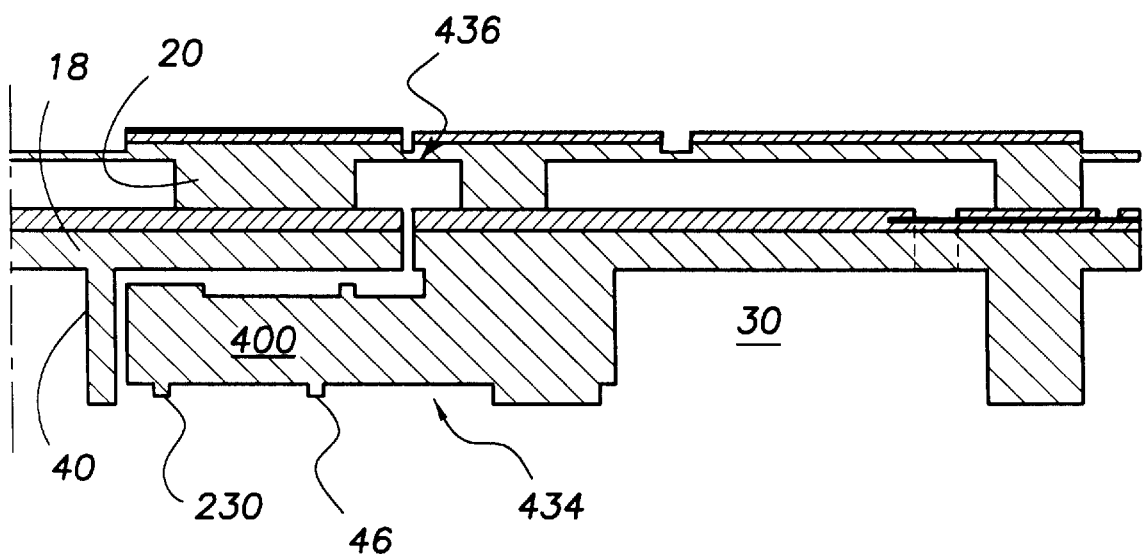

At this point, processing is directed back to the first wafer 400, as shown in FIG. 28M; two masked trench etches, each of about 50 μm in depth and performed using an $SF_6$ plasma recipe from STS, are undertaken. The first etch is masked to define the semi-circular, eccentric side load 230 and the bearing seal 46 for the microturbine, as well as a clearance 434 for the turbine rotor. The second etch is masked to etch through the first wafer in the regions of the wafer cavities 416, 418 (FIG. 28F), whereby blocks of material are released from the wafer between the cavities, to define the interior of the combustion chamber 30 and the interior of the microengine rotor shaft 40. This elegant technique for defining and producing internal chambers with edge cavities is particularly advantageous because it eliminates the need for etching of extensive regions of the wafer; it thereby is a faster and more cost-effective approach than conventional etch techniques. The three-dimensional microengine rotor 215, including at this point the shaft 40 and compressor rotor 18 and blades 20, is completely free to move and is held in place only by a connecting bridge support 436.

Figure 28N:
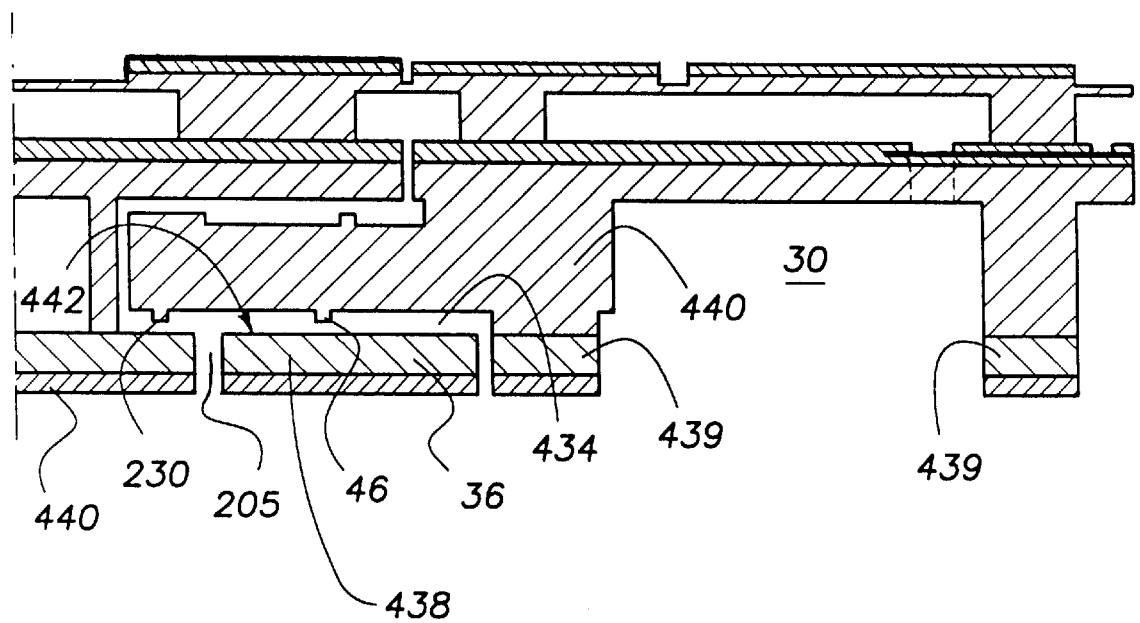

Turning to FIG. 28N, a fifth wafer 438 is then fusion bonded to the first wafer 400, over the combustion chamber 30, and the fifth wafer is chemo-mechanically thinned to about 360 μm in thickness. An etch stop layer 440 consisting of, e.g., a 2 μm-thick silicon-rich silicon nitride layer, is then deposited on the fifth wafer 438. An $SF_6$ plasma chemistry, using the STS etcher, is then employed in a masked etch to etch completely through regions of the etch stop layer and completely through corresponding regions of the fifth wafer. This etch results in lateral definition of the turbine rotor disk 36 and vent orifii 205 for venting the microengine journal bearing. Note that the prior clearance etch 434 produces a vertical offset of the forward face 442 of the turbine rotor disk from the seals 230, 46, above the disk, whereby the disk is inherently vertically defined. The fifth wafer and its subsequent etch also define aft extensions 439 of the microcombustion chamber 30.

Figure 28O:
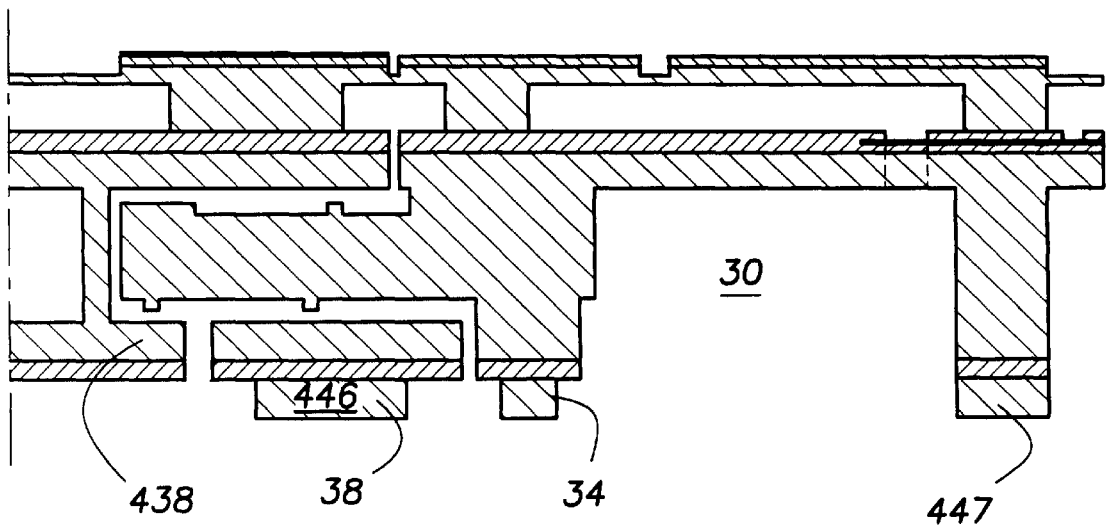
Figure 28P:
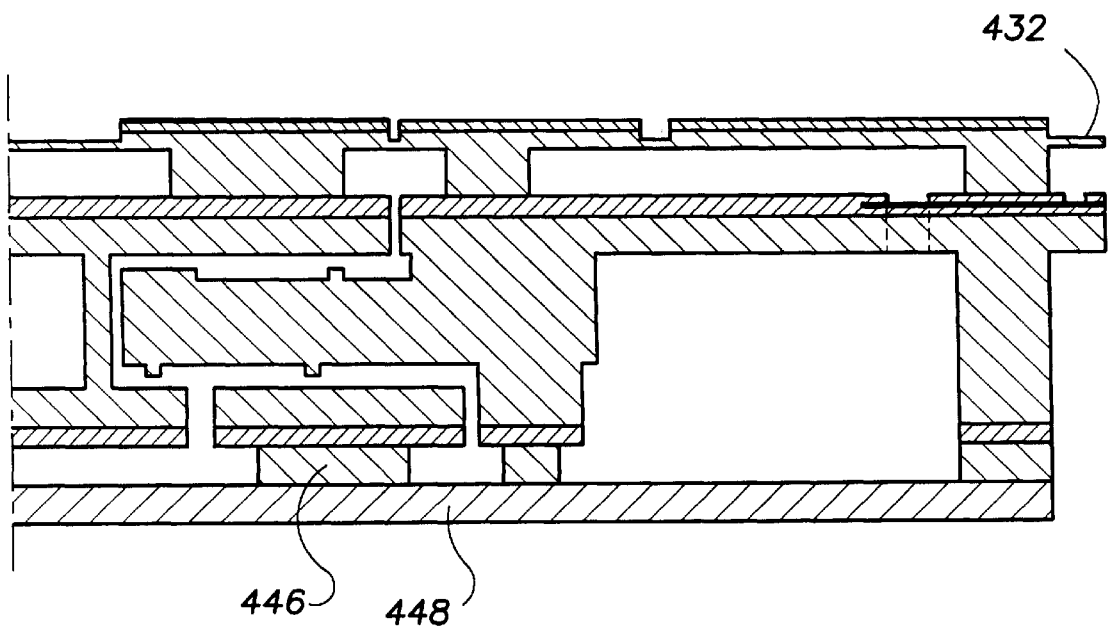

As shown in FIG. 28O, a sixth wafer 446 is then fusion bonded to the fifth wafer 438, and chemo-mechanically thinned to a thickness of about 250 μm. A masked trench etch is then undertaken through the entire thickness of the sixth wafer 446 to produce the microturbine guide vanes 34 and turbine rotor blades 38, preferably with provision for turbine blade fillets as described above, and an extension 447 of the microcombustion chamber. Then, as shown in FIG. 28P, a handle wafer 448 is attached to the sixth wafer 446 to protect the microturbine vanes and rotor blades, as well as to protect the interior of the microcombustion chamber, during the next processing step.

The handle wafer is preferably attached using an adhesive process that enables removal of the handle wafer at a later stage of the sequence. In one example adhesive process, a photoresist layer of between about 1 $\mu$m–5 $\mu$m is spin-coated on the handle wafer 448. The handle wafer is then pressed against the sixth wafer 446 and the entire composite structure is heated at a temperature of about 90° C. for about 30 minutes. This produces a sufficient fixation of the handle wafer to the structure.

Figure 28Q:
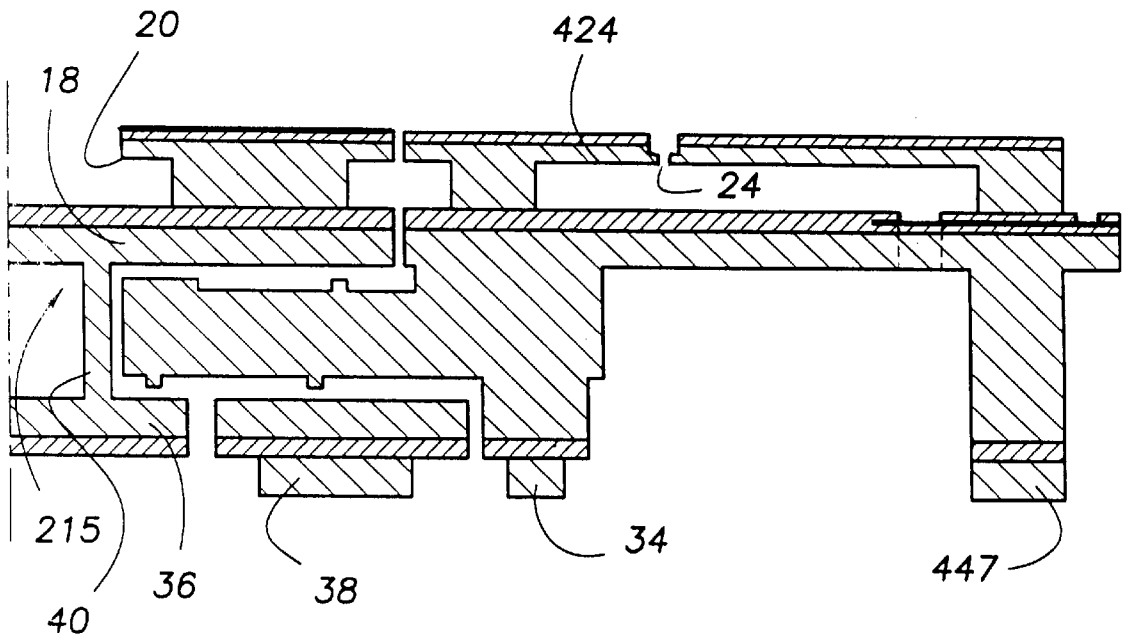

With the handle wafer in place, processing is directed to the other side of the laminated structure, namely, the fourth wafer 424. The bridge 436 (FIG. 28M) holding the compressor rotor 18 and its rotor blades 20 to the microengine housing is here released, and the cuts 430 (FIG. 28L) to define fuel injection orifii are simultaneously completed through the thickness of the fourth wafer 424, as shown in FIG. 28Q, to produce the completed injection orifii 24. This release is accomplished with a masked trench etch; the handle wafer facilitates manipulation of the laminated structure during lithographic and etching processes.

At this point, the microengine rotor 215 including the compressor rotor 18 and turbine rotor 36, is completely free to turn and is fully supported by the shaft 40 within the microengine core. The handle wafer is then removed from its connection with the turbine guide vanes 34, rotor blades 38, and extension 447 of the microcombustion chamber 30. In one example handle wafer release process, the handle wafer and composite structure are immersed in a photoresist solvent, e.g., acetone, and the handle wafer is manually removed as the acetone attacks the photoresist adhesive layer.

Figure 28R:
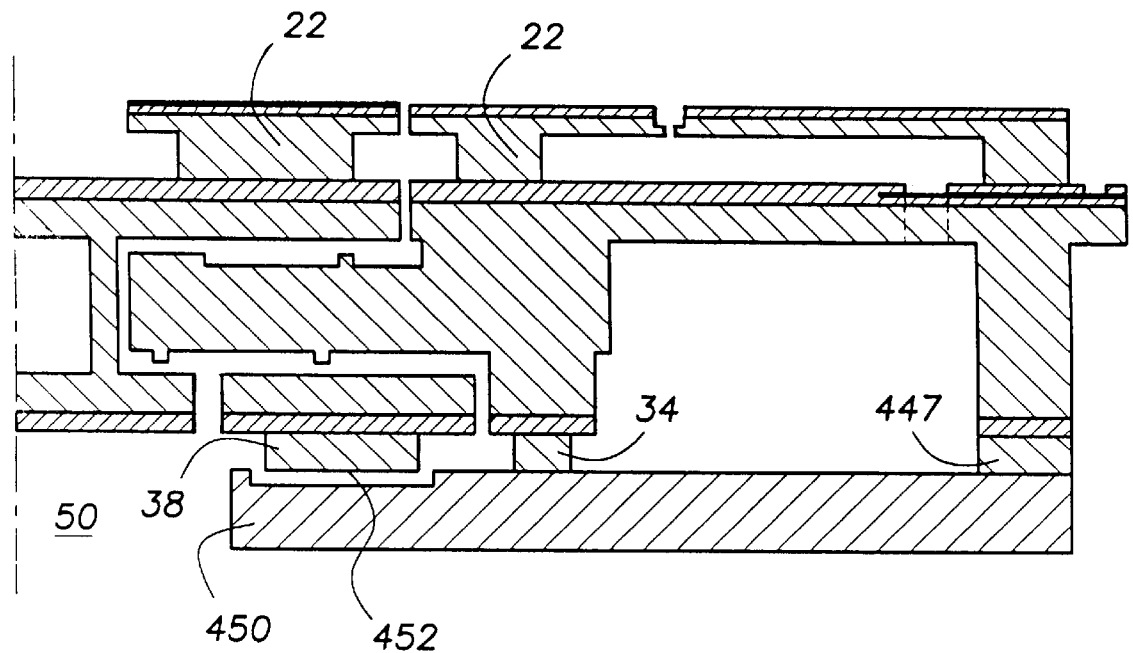

A seventh wafer 450 is then processed to form the aft endwall of the microengine core. Referring to FIG. 28R, first, the seventh wafer is masked and etched using an $SF_6$ plasma etch recipe to a depth of between about 2 $\mu$m–10 $\mu$m to define a clearance 452 between the aft side of the turbine rotor blades and the endwall. The seventh wafer is then fusion bonded to the protrusions in the sixth wafer, namely, the microturbine guide vanes 34 and the microcombustor wall extension 447. The clearance etch results in no bonding of the seventh wafer to the turbine rotor blades 38. The seventh wafer is then chemo-mechanically thinned to a thickness of about 400 $\mu$m. Finally, the seventh wafer is masked and etched through its thickness using an $SF_6$-based plasma etch with the STS etcher to define the microengine exhaust 50.

Figure 28S:
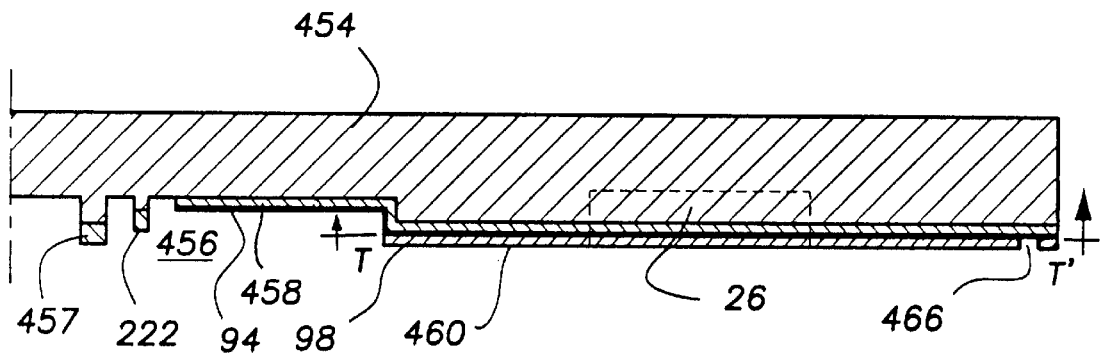

Next, an eighth wafer 454 is processed to produce the forward endwall of the microengine and optionally, the micromotor and its connections to the microcompressor. As shown in FIG. 28S, the eighth wafer is first patterned and a shallow $SF_6$-based plasma etch of between about 3 $\mu$m–8 $\mu$m is undertaken to produce a clearance 456 between the endwall and compressor rotor. A second trench etch, here of between about 8 $\mu$m–20 $\mu$m is then completed to define the annular forward thrust bearing seal 222 and a thrust bearing endwall 457 at the microengine inlet. Then, an insulating layer 458, e.g., a 2 $\mu$m-thick silicon-rich silicon nitride layer, is deposited over the trenches.

Stator electrodes 94 and stator electrode interconnections 98 are then defined with a titanium/platinum layer evaporation and lift-off etch process like that described above for the microengine ignitor. As can be recognized, a conventional multi-level metal configuration, e.g., a double-level metal configuration, is preferably employed to produce multi-phase, e.g., 3-phase, stator electrode interconnections. A second insulating layer, e.g., a silicon nitride layer 460, is then deposited and planarized, and then patterned and etched to remain only over the endwall in the region of the electrode interconnections 98. This etch also partially defines the fuel plenum and microengine inlet.

Figure 28T:
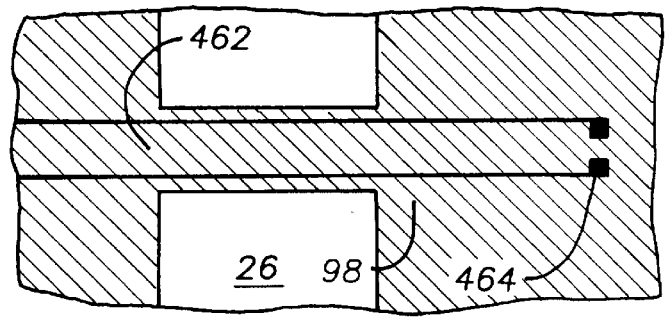
Figure 28U:
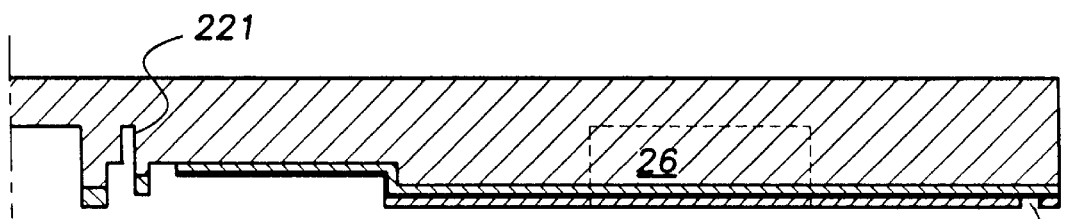
Figure 28V:
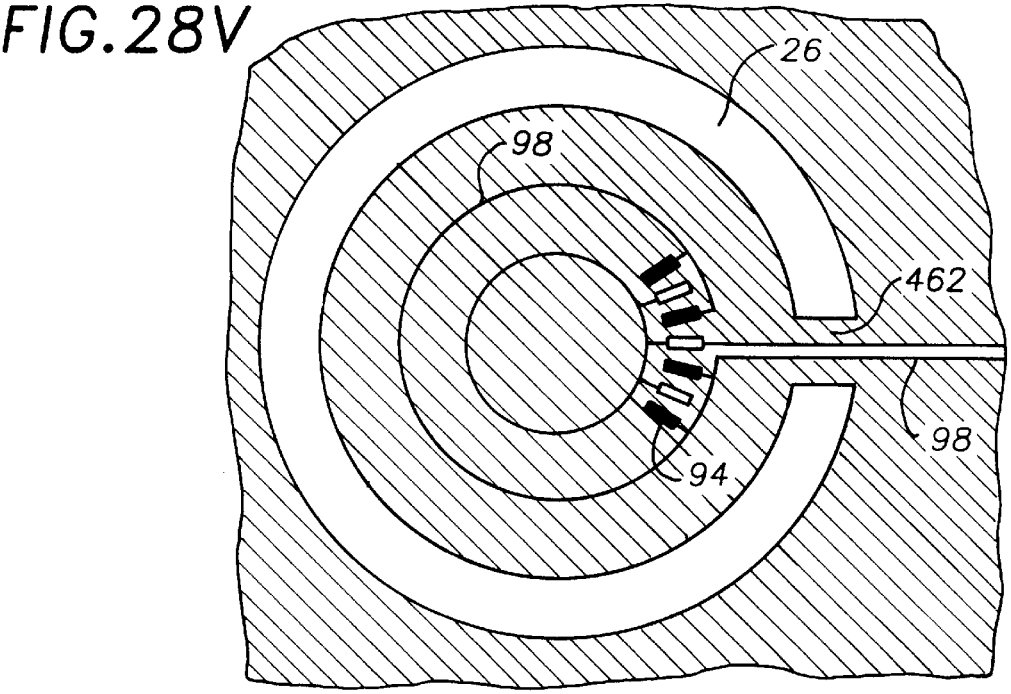

The insulating layer and the exposed regions of the eighth wafer are then again patterned and a deep trench etch of between about 20 $\mu$m–80 $\mu$m is completed to define the microengine fuel plenum 26. Referring also to FIG. 28T, showing an aft plan view at section T–T' of FIG. 28S, and referring to FIG. 28V, showing an aft, full circumferential plan view of the endwall, the fuel plenum 26 is defined as an incomplete annulus that provides an unetched region 462 for support of the stator electrode interconnections 98. The interconnections extend radially outward from the compressor rotor region to contact pads 464 to which external electrical contact can be made by way of an etched gap 466 that is formed, as shown in FIG. 28S, when the second insulator 460 is patterned and etched. The deep trench etch employed to define the plenum is also employed, as shown in FIG. 28U, to partially define the forward thrust bearing exhaust 221.

Figure 28W:
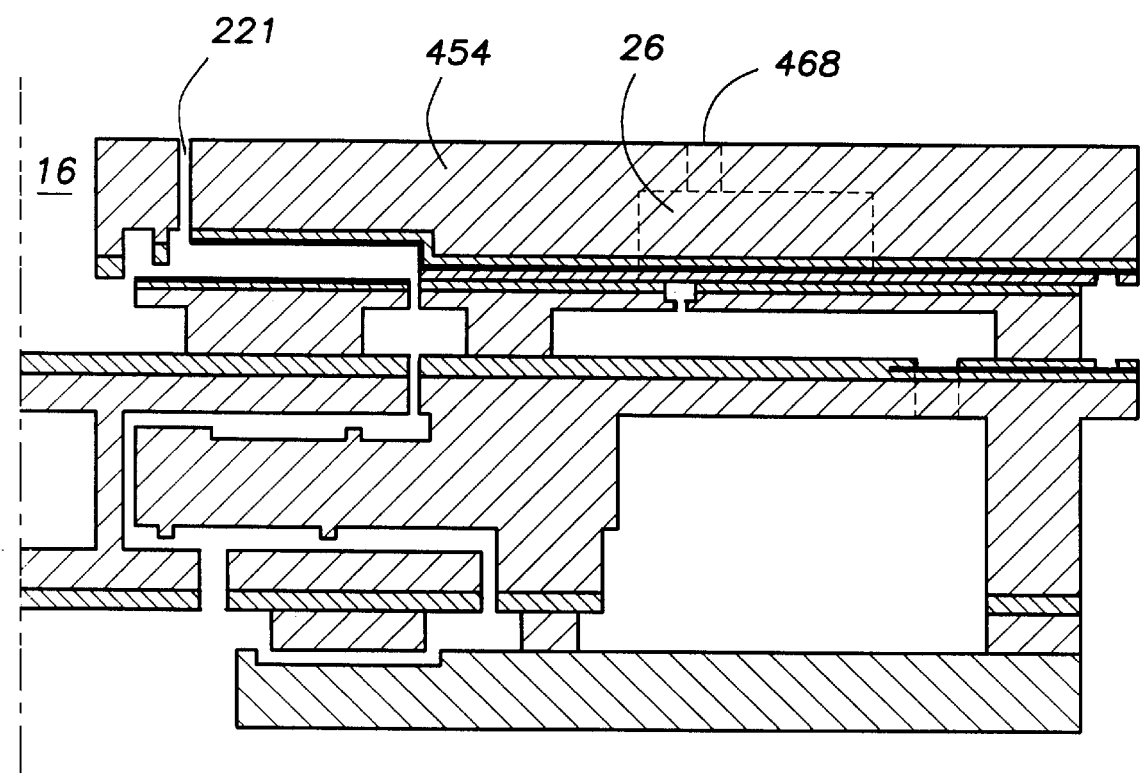

Referring finally to FIG. 28W, the eighth wafer 454 is fusion bonded to the forward section of the compressor, and is chemo-mechanically thinned to about 300 $\mu$m in thickness. The eighth wafer 454 is then patterned and etched through its full thickness to fully define the forward bearing exhaust 221, a fuel inlet 468 to the fuel plenum 26, and finally, the microengine inlet 16.

Turning now to fabrication techniques in accordance with the invention for manufacturing microengine adaptations, the recuperated microengine design can be fabricated in a process very similar to that just described. In fabrication of a recuperated microengine design, the process given above is followed up to the step shown in FIG. 28R, namely, etching and bonding a seventh wafer 450 to the processed lamination to form the aft endwall of the microengine core. Because the flow of the air-fuel mixture in the recuperated microengine includes traversal of micro-heat exchange channels prior to combustion, the combustion inlet port location in the recuperated microengine is moved to the end of such channels and thus, the flame ignitor and combustor inlet port processing, shown in FIGS. 28E–H, is here eliminated from the process flow.

After bonding of the microengine core aft endwall, multiple wafers are bonded to the endwall and etched in an appropriate pattern to form the micro-heat exchange channels, 108, 110 (FIG. 7B) of the recuperated design. The first wafer to be bonded to the endwall is processed in a manner similar to that shown in FIGS. 28E–H to produce a flame ignitor and combustion inlet port at the end of the micro-heat exchange channels and the entrance to the combustion chamber. Lead-out connection to the resistive flame ignitor can be accomplished also as shown in those figures. The last wafer to be bonded is patterned and etched to define the exhaust of the microengine. In one example, eight wafers are bonded and etched to the microengine core aft endwall to produce the microheat exchanger configuration of FIG. 7B. With the micro-heat exchanger channels formed, the fabrication process then proceeds as described above and shown in FIGS. 28S.

Similarly, a fabrication process for manufacturing a bypass microengine design closely follows the fabrication process given above. In this case, as shown in FIG. 8, a second stage including a bypass rotor, its blades, and bypass diffuser blades is to be formed above the core microcompressor, as is a bypass flow path around the microcombustor and a bypass exhaust aft of the microturbine. In one example process to produce these features, the process described above is completed up to the step illustrated in FIG. 28R, with additional patterning and etching processes at appropriate steps to form the bypass flow path around the microcombustor. Because the bypass fan, not the core microcompressor, provides the micromotor rotor, the compressor rotor blade conductor deposition shown in FIG. 28K is also eliminated.

Once the aft endwall wafer 450 is etched and bonded to the lamination, an additional wafer is bonded and etched to the endwall to form the bypass exhaust path. Then a wafer is bonded to the top of the compressor rotor blades 20 and diffuser blades 22 and etched to form bypass fan and diffuser blades; a further thinned wafer is then employed, with insulating and conducting layers, to form the rotor of the micromotor. Finally, the fabrication process proceeds as described above, beginning with the step shown in FIG. 28S, to form stator electrodes opposite the bypass fan.

The planar microengine design described above and illustrated in FIGS. 10A–C is manufactured in accordance with the invention by, e.g., the fabrication process illustrated in FIG. 29. This process employs the same patterning procedures described in the first fabrication process, including use of an etch mask layer such as silicon nitride and deep trench etching in an $SF_6/O_2$ plasma environment such as that obtained with the STS etcher. In the fabrication process outlined below, it can be assumed that unless otherwise noted, each patterning, trench etch, bonding, and film deposition step is carried out in the manner given above.

Referring then to FIG. 29A, which illustrates the results of several process steps as seen at a cross section through the microcompressor, as in FIG. 10B, a first wafer 480 of, e.g., about 380 $\mu$m in thickness is patterned and then etched in two trench etching processes, forming a first trench 482 of about 50 $\mu$m and then a second trench 484 also of about 50 $\mu$m to define the edge of the compressor rotor disk 18 and to provide a support connection to the rotor during subsequent process steps. Similar rotor disk definition is also here produced for the coplanar turbine rotor located adjacent to the microcompressor. This etch also partially defines the location of the fuel manifold 26 and defines the wafer region to be processed for forming the microcombustor 30 and the peripheral combustion entry point 32.

A second wafer 486 is then bonded to the first wafer 480, thinned to about 200 $\mu$m in thickness, and an etch stop layer (not shown) is deposited and patterned. A trench etch is then carried out to etch through the entire depth of the second wafer to define a top rim 488 of the compressor rotor 18; the lateral extent of the trench defines the rim bearing for the compressor rotor. Definition of the turbine rotor is similarly here produced. This trench etch also continues formation of the fuel manifold 26 and the microcombustor 30.

A third wafer 490 is bonded to the second wafer 486, thinned to between about 200 $\mu$m–250 $\mu$m, coated with an etch stop layer, and then etched through its entire thickness in the manner in which the second wafer was etched. This defines the compressor rotor blades 20 and diffuser blades 24 as well as the turbine rotor blades and guide vanes and the entrance to the peripheral combuster cooling channels 152.

At this point, continuing as shown in FIG. 29A, a fourth wafer 492 is bonded to the top of the rotor blades and thinned to between about 100 $\mu$m–200 $\mu$m in thickness.

Then, following the process described in conjunction with FIGS. 28K–L, an insulating layer (not shown) is deposited on the fourth wafer and a conducting layer 494 is deposited and patterned to form a conducting micromotor rotor. The insulating layer and the fourth wafer are then etched through their entire thickness to define the compressor rotor tip shroud 52, was well as the turbine rotor tip shroud, the upper endwall of the microcompressor diffuser and the lower wall of the microcombustor's upper cooling channel 152.

A fifth wafer 496 is then processed to form the microengine electric micromotor for driving the microcompressor, as well as to form the microturbine exhaust and the upper end wall of the microcombustor's upper cooling channel 152, which preferably is about 50 $\mu$m in height. Here the fifth wafer is patterned and trench-etched to define a stator-rotor clearance 498 and inlet boundary layer control features 500. Then a conducting layer 502 is deposited and patterned on the fifth wafer, in a manner similar to that shown in FIGS. 28S–V, to produce stator electrodes, interconnections, and external connection pads. The stator conductor is preferably coated with an insulating layer. Recall that this stator configuration is also employed, in conjunction with the turbine rotor, to produce an output generator. With the stator conductors in place, the fifth wafer is then bonded to the fourth wafer 492 as shown in FIG. 29A.

Figure 29C:
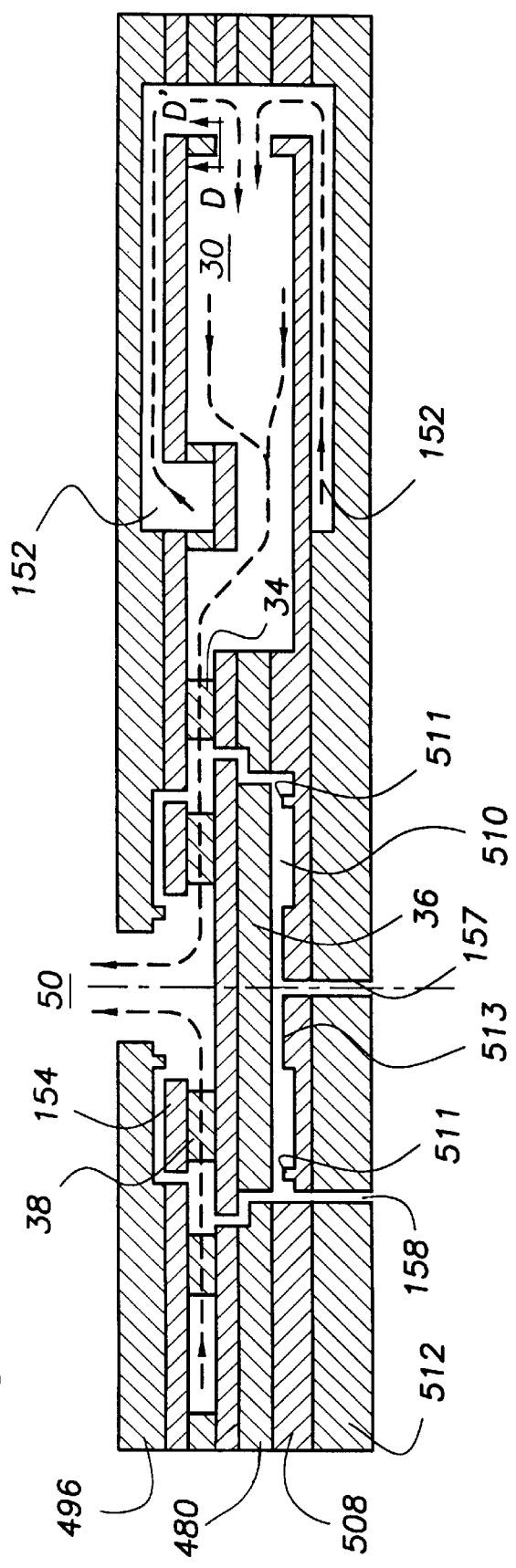

Turning to FIG. 29B, which is also a cross section taken through the microcompressor, as in FIG. 10B, and FIG. 29C, which is a cross section taken through the microturbine, as in FIG. 10C, the first wafer 480 is then etched in the region of its deep trenches 484 to release the compressor rotor 18 and the turbine rotor 38, and to further define the fuel manifold 26, the entrance 504 to the microcombustor cooling channels 152, and the peripheral entrance 32 to the microcombustor 30. Note that in releasing each of the rotor disks, the wafer feature in the area of the rotor disk clearance etch 482 holds each rotor, at its radial periphery, from falling free from the assembly.

Figure 29D:
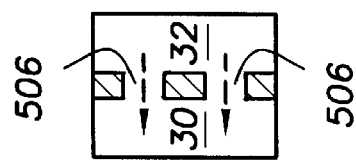
FIG. 29D is a forward plan view, taken at D–D' in FIG. 29C, of the combustor inlet of the micro-gas turbine engine of FIGS. 29A–C.

As shown in FIG. 28M, illustrating a step similar to a corresponding step in the first fabrication process described above, this etch results in removal of substantial blocks of wafer, particularly that block 506 (FIG. 29A) which defines the microcombustion chamber and which would otherwise need to be entirely etched in a less efficient process. Referring also to FIG. 29D, there is shown an upper cross sectional view taken through D–D' in FIG. 29B and C, illustrating inlet ports 506, at the entrance to the microcombustion chamber from the peripheral entrance 32, that are formed by this etch.

As shown in FIGS. 29B–C, a sixth wafer 508 is then processed in a first trench etch step to define a clearance 510 for lower thrust bearings for the compressor and turbine rotors and a second, more shallow trench etch step to define seals 511 and an aft bearing 513. The etched sixth wafer is bonded to the first wafer 480 and then etched through its entire thickness to form an upper section of a thrust bearing inlet port 157 and a bearing air bleed vent 158 under each of the rotors, as well as to form the lower endwall, of about 50 $\mu$m in thickness, of the microcombustion chamber 30, now having a length of between about 600 $\mu$m–700 $\mu$m, and the fuel manifold 26.

In a similar process step, a seventh wafer 512 is etched, here to define the endwall of the microcombustor's lower cooling channel 152, as shown in FIG. 29C. The seventh wafer is then bonded to the sixth wafer 508 and etched through its thickness to complete formation of the bearing inlet port 157 and vent 158, as well as an inlet 514 to the fuel manifold 26.

In a final process step, the fifth wafer 496 is etched through its thickness to define the microengine inlet 12 and exhaust 50 areas. Depending on the etch technique and etch apparatus used here, a lower handle wafer may need to be affixed to the composite structure. In such a case, the photoresist adhesion process described previously, and its corresponding release process, both described above, can be employed.

With this step, the planar microengine fabrication process is complete. Recall that secondary micromotor and microgenerator configurations can be included with the compressor rotor and turbine rotor on the back side of each of such rotors. In this case, the sixth wafer 508 is suitably processed in a manner similar to that for the fifth wafer 496, and the lower sides of the rotors are provided with a conducting layer.

Microcomponentry Fabrication

The invention provides fabrication processes for individually producing the many microcomponents described above that are subsystems of the microengine and that can be employed together in various configurations for, e.g., the range of thermodynamic cycles discussed earlier. Considering first perhaps the most common component of such systems, namely, an untapered microrotor disk having constant-height, axial microrotor blades in a selected configuration for, e.g., a desired pressure increase, FIG. 30 illustrates various steps in a process for fabrication of a rotor.

Figure 30A:
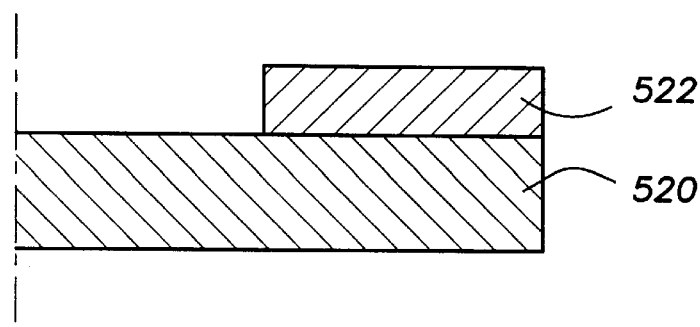
FIGS. 30A–D are cross-sectional views of a fabrication process in accordance with the invention for manufacturing a microrotor.

Turning then to FIG. 30A, in an example microrotor fabrication process provided by the invention, a first wafer 520 is thinned to a desired microrotor disk thickness and after deposition of an etch masking layer (not shown) corresponding to a desired blade pattern, a trench etch is undertaken to define microrotor blades 522. As with FIG. 28, FIG. 30 shows symmetrical cross sections of only one-half of a microrotor disk. Note that a rimmed microrotor disk like that shown in FIG. 29, in connection with the planar microengine, can here be independently formed by bonding an additional wafer (not shown) to the bottom of the first wafer 520 and etching the additional wafer to the desired disk geometry, whereby the first wafer forms the disk rim and the additional wafer forms the disk itself.

Figure 30B:
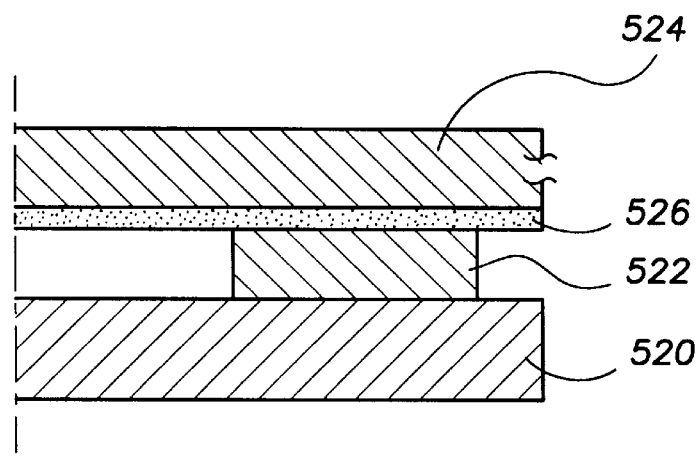

In either case, in a next step, as shown in FIG. 30B, a second wafer 524 is coated with an etchable layer 526 that is characterized by a preferential etch rate, by a selected etchant, over that of the wafers. One suitable etchable layer is, e.g., CVD silicon dioxide. Once the etchable layer is deposited, the second wafer is bonded on the side of the etchable layer to the rotor blades 522. The second wafer 524 provides a handle for processing of the microrotor disk formed by the first wafer 520.

Figure 30C:
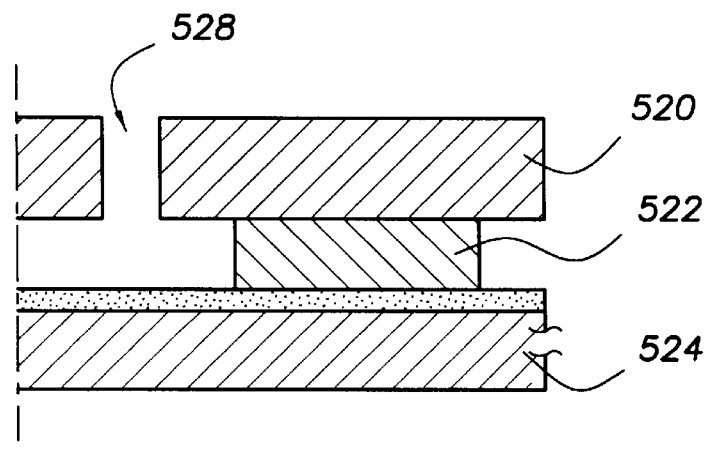

At this point, desired processing of the microrotor disk, and particularly the back side of the microrotor disk, can be easily accomplished with the handle wafer in place. For example, as shown in FIG. 30C, a patterned etch can be completed through the thickness of the microrotor disk wafer 520 to form one or more holes in the disk that define, e.g., bearing vent holes such as those 205 illustrated in connection with a turbine microrotor disk in FIGS. 17A–B and 18A–B. Additional process steps, such as coating with a conductive layer for a backside microgenerator or micromotor configuration, can also at this point be easily undertaken.

Figure 30D:
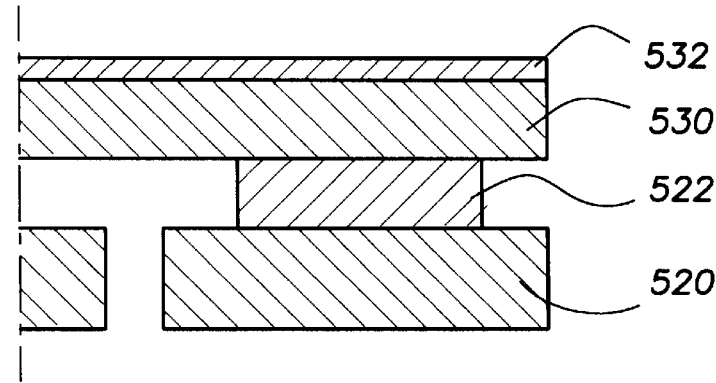

Upon completion of disk processing, the handle wafer 524 is removed by, e.g., exposing the entire assembly to a suitable etchant; for the example etchable layer of CVD silicon dioxide, a suitable etchant is hydrofluoric acid or buffered hydrofluoric acid. This etch attacks the etchable layer 526 and separates the handle wafer from the microrotor. Then, as shown in FIG. 30D, the microrotor is complete and ready for any additionally desired processing. In one example additional process, a third wafer 530 is bonded to the microrotor blades 522 and thinned to form a blade tip shroud. A conducting layer 532 can then be layered on the tip shroud and etched to define, e.g., a microrotor for a micromotor or microgenerator configuration. The shroud and its conducting layer is then etched to form an annular shroud geometry over the microrotor blades.

As can be recognized based on this discussion, a wide range of process variations can be accommodated by this basic microrotor fabrication sequence, whereby microrotors for microcompressors, microturbines, and other microturbomachinery configurations is enabled. For example, the microrotor disk can be fabricated with blades on both sides for producing a compact dual compressor-turbine rotor. Furthermore, a double-microrotor configuration in which two microrotors are connected by way of a shaft can be fabricated by bonding a first microrotor to wafer that is etched to form the shaft and then bonding a second microrotor to the etched shaft. Many other such configurations can also be easily fabricated.

Figure 31A:
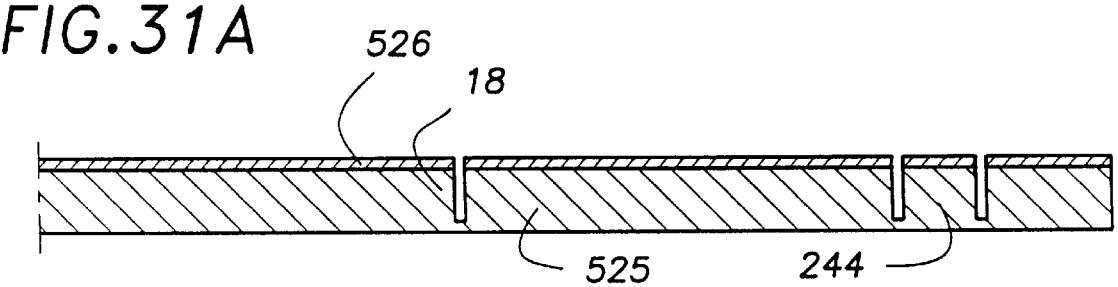
FIGS. 31A–J are cross-sectional views of a fabrication process in accordance with the invention for manufacturing a micromotor-microcompressor.

A fabrication process is further provided by the invention for manufacturing a micromotor-compressor system like that discussed earlier and shown in FIGS. 24A–B. This process employs many of the same fabrication steps already presented and unless otherwise stated, it can be assumed that a similar process step indeed is undertaken in the manner described above. Turning then to FIG. 31A, in which is shown a cross section of only the symmetrical right-half of the micromotor-compressor, in a first step a first wafer 525 is thinned to a desired compressor rotor thickness, and an etch stop layer 526 is layered over the first wafer. A deep trench etch is then undertaken to define the edge of the compressor rotor 18 and to define a region of wafer to later be processed for forming the microcompressor outlet port or ports 244.

Figure 31B:
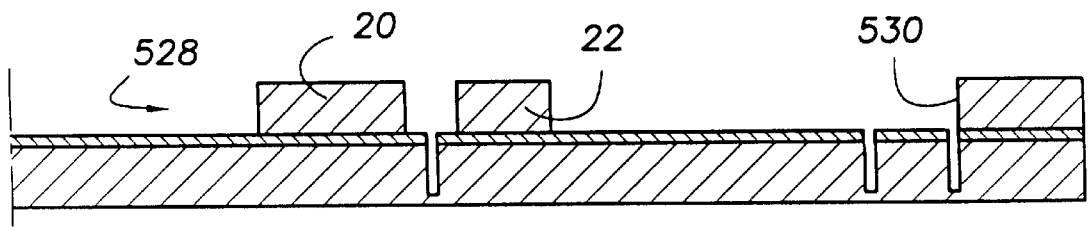
Figure 31C:
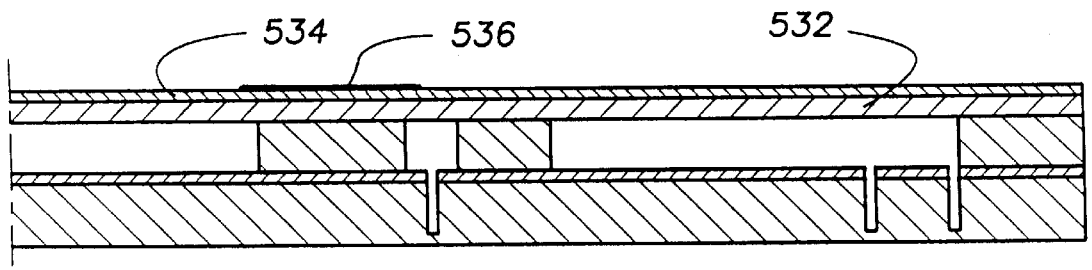
Figure 31D:
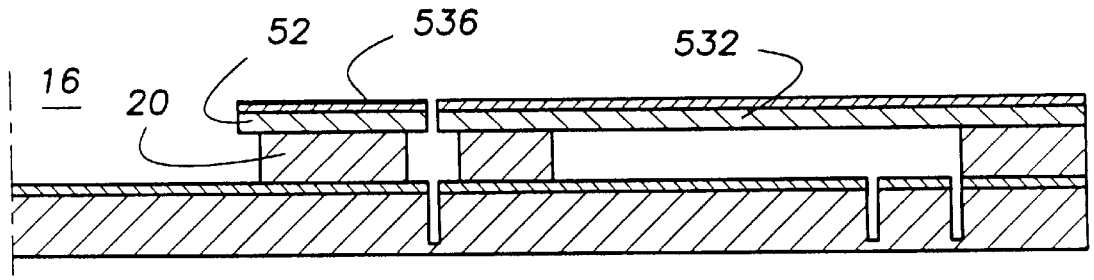

A second wafer 528 is then bonded to the first wafer 526, as shown in FIG. 31B, is thinned to a desired thickness, and is etched to form compressor rotor blades 20, diffuser vanes 22, and a radially peripheral microcompressor endwall 530. Then, as shown in FIG. 31C, a third wafer 532 is bonded to the blades and endwall and thinned; this wafer forms the rotor blade tip shroud. An insulating layer 534 is deposited on the third wafer 532 and then a conducting layer 536 is deposited and etched in a pattern to form a rotor conductor for the microcompressor's driving micromotor. As shown in FIG. 31D, the third wafer 532 is then etched through its entire thickness to produce part of the microcompressor inlet 16 and to fully define the edge of the blade shroud 52.

Figure 31E:
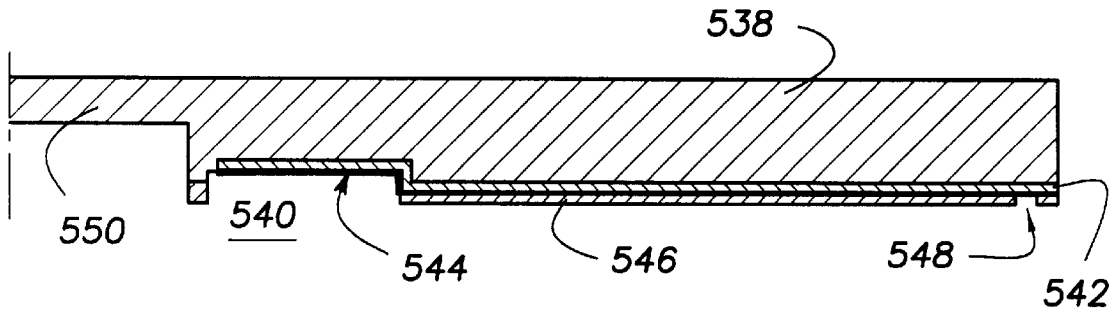
Figure 31F:
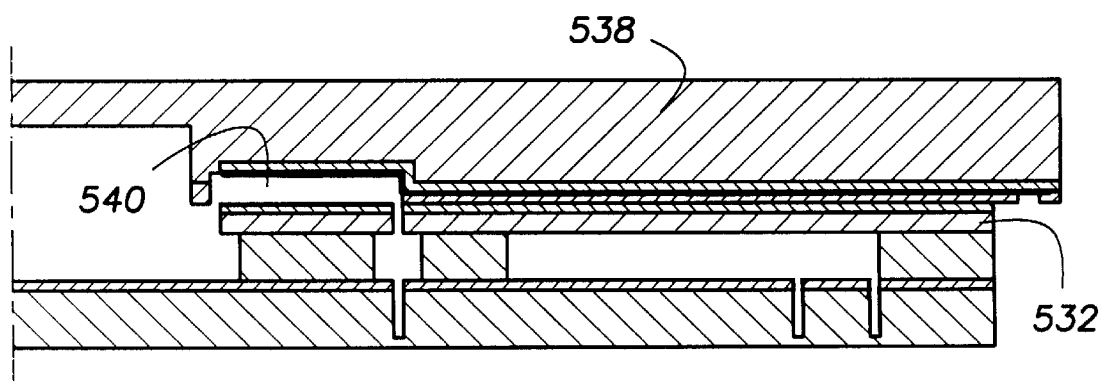

At this point, as shown in FIG. 31E, a fourth wafer 538 is processed to form the micromotor stator electrode configuration and electrical interconnections in the same manner employed in earlier processes. First a shallow trench etch is completed to define the micromotor stator-rotor clearance 540, and then a first insulating layer 542 is deposited, over which a conducting layer 544 for the stator conductors is deposited. The conductor and first insulator layers are then etched in the stator configuration, as in the manner shown in FIGS. 28S–V; however, no fuel plenum 26 is needed here, of course. A second insulating layer 546 is then deposited and etched in a corresponding pattern 548 to expose external stator connection pads. This layer is planarized to enable bonding of the layer to other wafers in a subsequent process step.

A deep trench etch is then undertaken to define a region 550 that will later form the microcompressor inlet in the aft endwall. The fourth wafer 538 is then bonded to the third wafer 532; note that a microcompressor stator-rotor clearance 540 is automatically achieved by the shallow trench etch of wafer four.

Figure 31G:
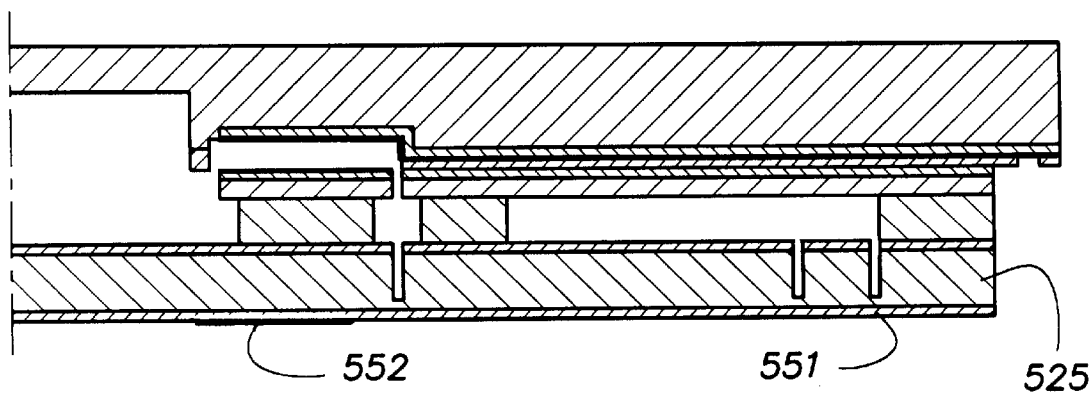

If a second micromotor is desired for driving the microcompressor, then as shown in FIG. 24A, the aft side of the compressor rotor can be configured as the rotor of an aft micromotor. In this case, as shown in FIG. 31G, an insulating layer 551 is deposited on the aft side of the first wafer 525, and then a conducting layer 552 is deposited on the insulating layer and etched in a pattern corresponding to the desired configuration for the aft micromotor.

A fifth wafer 554 is here then processed in the same manner as was the fourth wafer to produce aft stator electrodes 556 and a radially peripheral opening 558 in an overlying insulating layer 560 for external electrical connection to the aft micromotor. Whether or not an aft micromotor is included, the fifth wafer 554 is etched through its entire thickness to define the microcompressor bearing vents 238, 240, and the microcompressor discharge vents 244. Note that this trench etch is carried out in the same manner as that shown in FIGS. 28F–H; the stator electrodes are supported on underlying insulator and wafer material across the expanse of each etched section.

Figure 31H:
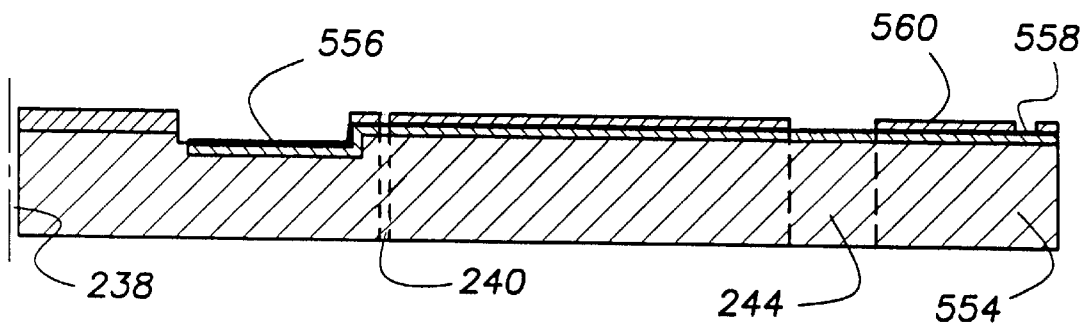
Figure 31I:
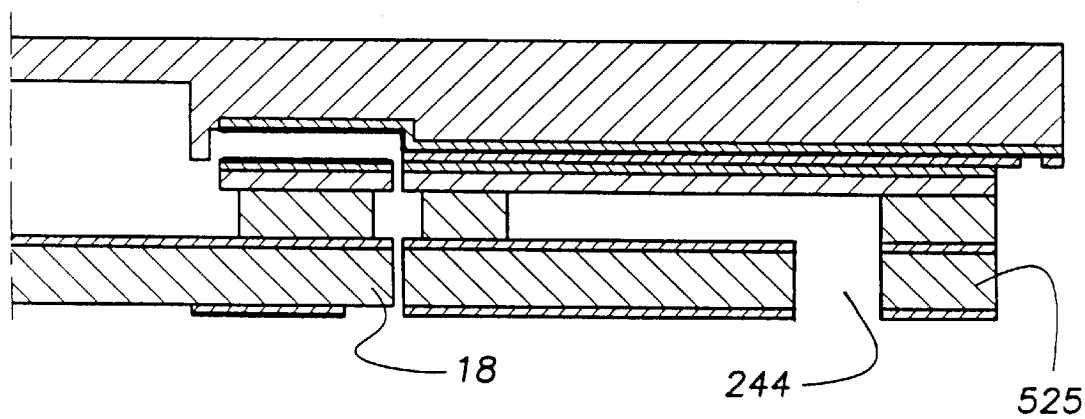
Figure 31J:
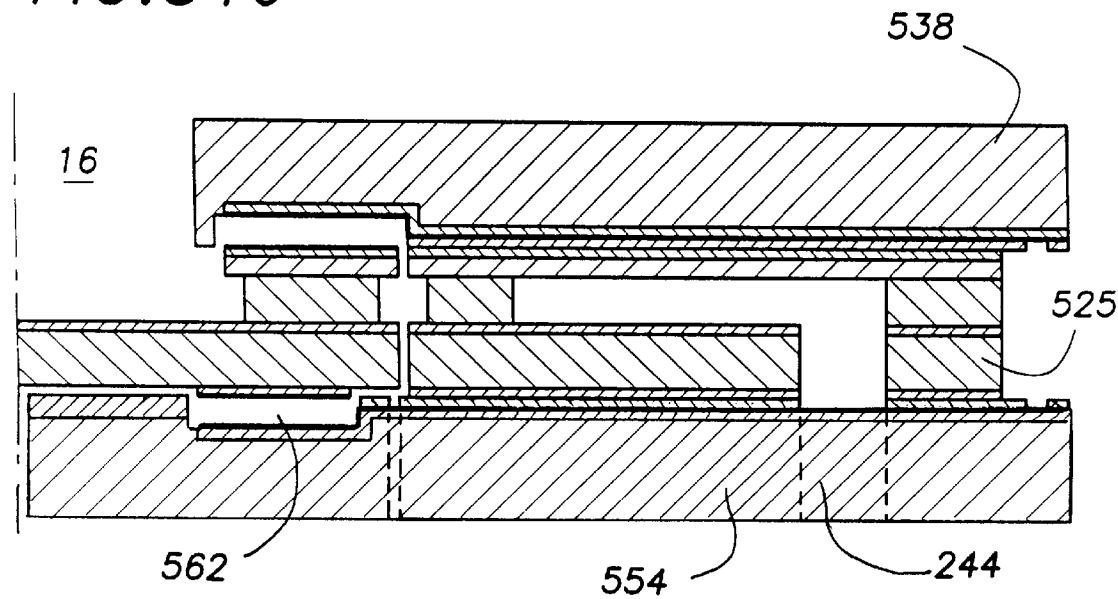

A trench etch of the first wafer 525 is then carried out at the locations of the first deep trenches (FIG. 31A) to release a block of the wafer and produce, as shown in FIG. 31I, a complete microcompressor exhaust vent area 244. This etch also is carried at in the region of the rim of the compressor rotor disk 18 to fully release the disk. The disk thus becomes a completely independent part that is not in any way connected to the remaining structure. The released rotor disk is manually positioned and then the fifth wafer 554 is bonded to the first wafer 525, as shown in FIG. 31J. Note that the clearance 562 between the aft micromotor rotor and stator is automatically set by the shallow etch of the fifth wafer (FIG. 31H). As a final processing step, the fourth wafer 438 is etched through its thickness to fully form the microcompressor inlet 16; with this step, the micromotorcompressor is fully produced.

Figure 32A:
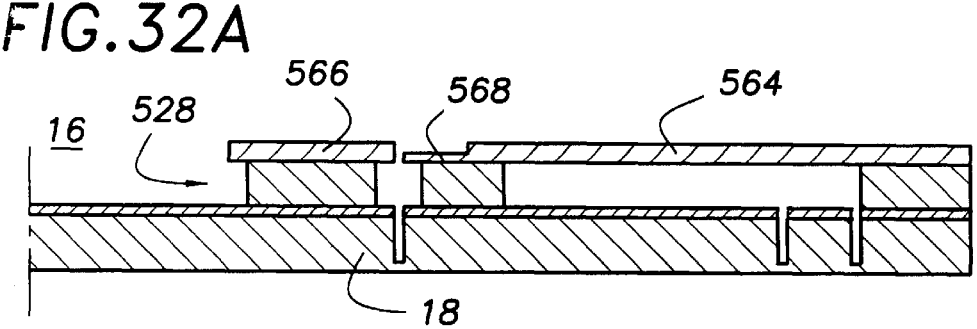
FIGS. 32A–D are cross-sectional views of additional fabrication steps to be employed in conjunction with those of FIGS. 31A–J in an alternative process in accordance with the invention for manufacturing a micromotor-microcompressor.

The invention provides an alternative fabrication process to that just described that eliminates the need for manual repositioning of the compressor rotor after its etch and release. Turning to FIG. 32A, this alternative fabrication process adds an additional step after the step shown in FIG. 31B; in the additional step, an additional wafer 564 is bonded to the second wafer 528, is thinned to a desired thickness, and is etched to form a rotor blade lower rim 566 and holding feature 568. The additional wafer 564 is then etched through its thickness to open up areas at the radial periphery of the rotor disk and the microcompressor inlet 16.

Figure 32B:
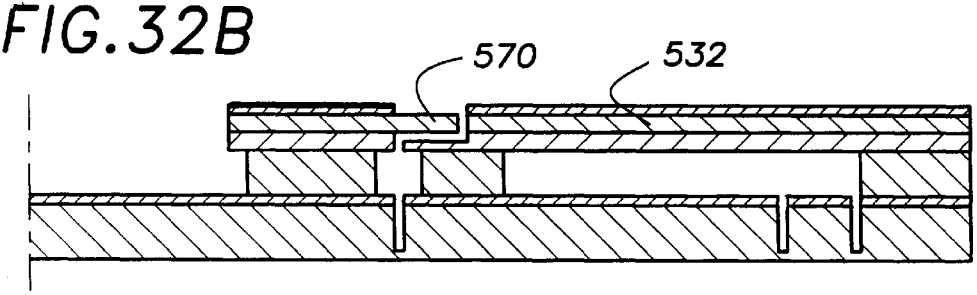
Figure 32C:
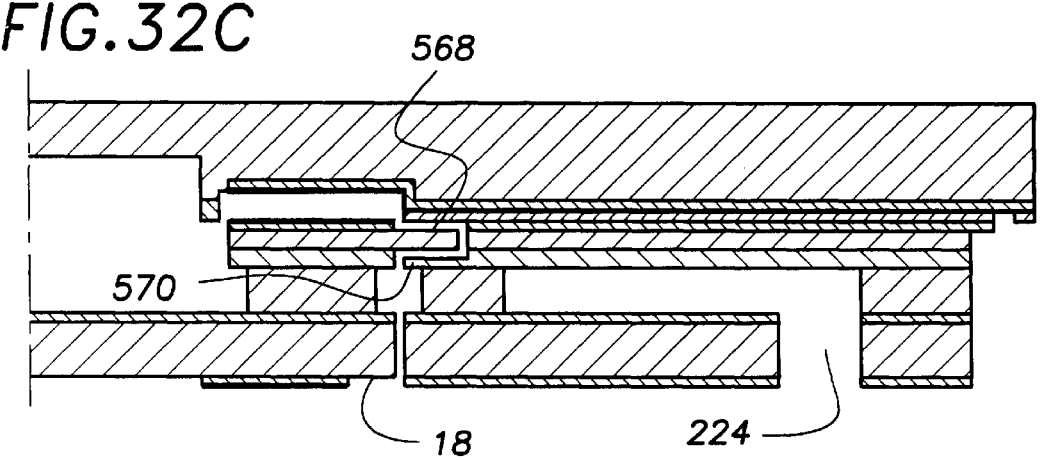
Figure 32D:
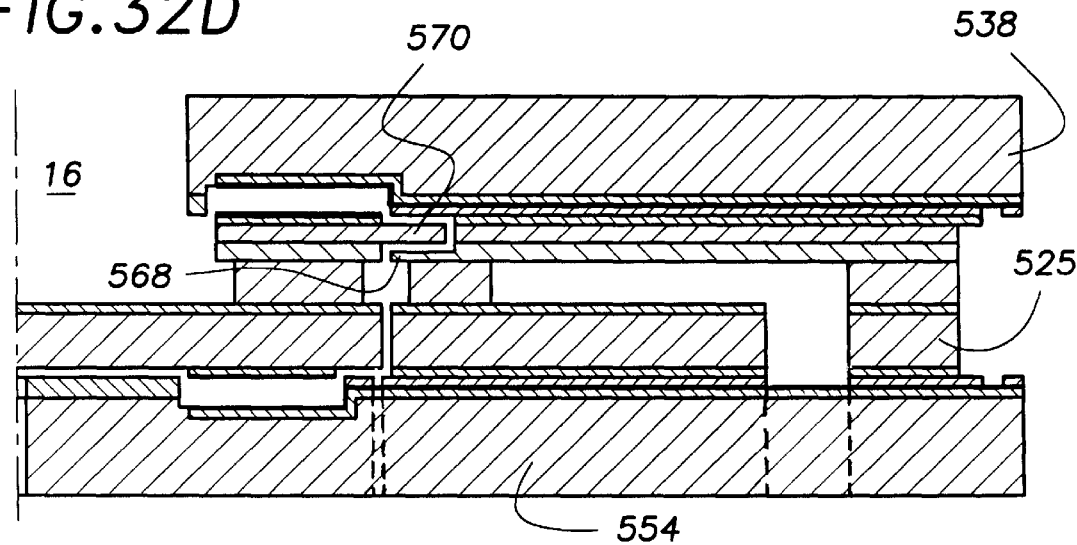

At this point, as shown in FIG. 32B, the wafer 532 employed to form a rotor tip shroud in the process step given above and shown in FIG. 31C is processed as before, except that the shroud is formed with an extension feature 570 that cooperates with the holding feature 568 in subsequent processing steps to contain the rotor disk within the microcompressor assembly. Processing then proceeds following the steps shown in FIGS. 31E–J above. Here, upon etch of the rotor disk rim, as shown in FIG. 32C, the rotor disk is contained by cooperation between the tip shroud extension feature 570 and the holding feature 568 in the additional wafer. The fifth wafer 554 is bonded to the first wafer 525 as above, and the fourth wafer 538 is then etched in a final process step to form the full microcompressor inlet 16.

Considering now fabrication of a microturbine-generator, one design of which is shown in FIG. 25A, a first wafer of about 500 $\mu$m in thickness is patterned and trench etched to produce a circular shallow recess of, e.g., about 1 $\mu$m, to define the region of the turbine rotor. Then the wafer is patterned and etched to a depth of about 200 $\mu$m to form the turbine rotor blades 258 and stationary vanes 260.

A second wafer of, e.g., about 500 $\mu$m in thickness is etched to a depth of about 100 $\mu$m to form the thrust plate bearing inlets 274 as well as the compressed gas inlets 264 and the exhaust 268. The opposite side of the second wafer is then etched to a depth of about 400 $\mu$m to complete formation of the inlets and exhausts. The etched second wafer is then bonded to the first wafer.

A third wafer of about 500 $\mu$m in thickness is etched completely through its thickness with a manifold pattern to connect the second wafer inlets and exhausts. The third wafer is then bonded to the second wafer. Following this bonding step, the generator rotor conductor is deposited and patterned on the first wafer in the rotor region. Then a 300 $\mu$m-deep etch through the first wafer is carried out to completely release the rotor.

A fourth wafer of about 500 $\mu$m in thickness is then processed by first depositing an insulator, e.g., a silicon nitride layer, of about 1 $\mu$m in thickness on the fourth wafer, and then depositing and patterning a conducting layer to define the stator electrodes. A dielectric layer, e.g., a silicon nitride layer, of about 1 $\mu$m in thickness, is deposited over the stator electrodes and planarized by, e.g., a chemomechanical polishing step, to serve as a smooth bonding layer and an electrical isolation layer. The dielectric layer covering the electrodes is then removed in the region of the rotor and the region of electrical contact outside the region of the rotor.

The fourth wafer is then etched on the side of the stator electrodes, to a depth of about 100 $\mu$m, to form the aft thrust plate bearing inlets 273, as well as the exhaust vents 279, 282. The opposite side of the fourth wafer is next etched to a depth of about 400 $\mu$m to complete the formation of the inlets and exhausts. A fifth wafer of about 500 $\mu$m thick is etched completely through its thickness with a manifold pattern to connect the fourth wafer inlets and exhausts, and is then bonded to the fourth wafer. This pair of bonded wafers is then bonded to the first three wafers. Care must be taken during positioning of the wafers prior to bonding to insure that the free rotor is captured between the wafers, and that it is free to rotate.

In an alternative microturbine-generator configuration, the micromotor-compressor design and fabrication process can be adapted for production of a microturbine-generator design. Referring to FIG. 31J, here, the microcompressor exhaust 244 is employed as an inlet for the microturbine, and the microcompressor inlet 16 is employed as an outlet for the microturbine. The fabrication processes given above for the micromotor-compressor can thus be directly employed for producing the corresponding microturbine-generator. The only process adaptation required is reconfiguration of the radial geometry of the vanes and rotor blades to correspond to desired turbine inlet vane geometry and turbine blade geometry.

Alternative Fabrication Techniques

The fabrication processes described above rely on bulk trench etching of microelectronic wafers, e.g., silicon wafers, to define topological features of the microengine such as compressor and turbine rotor blades and vanes. Silicon carbide wafers can also be employed, to produce a silicon carbide microengine or subsystem, using similar processes. Considering process details, silicon carbide wafers can be fusion bonded using a process like that employed for silicon wafers to produce an interface-free multi-wafer stack as the various microengine housing features and components are formed. Etching of bulk silicon carbide is currently more complicated than bulk silicon etching due to the comparatively low reactivity of silicon carbide, but reaction ion etching of silicon carbide can be carried out using a $CHF_3/O_2$-based etch chemistry, and electron cyclotron resonance plasma etching of silicon carbide can be carried out using a $CF_4/O_2$-based chemistry. A hard masking material, e.g., aluminum or indium tin oxide, is preferably employed with these chemistries.

It is recognized that for some silicon carbide microengine manufacturing scenarios, bulk silicon carbide trench etch techniques may be too lengthy to be practical; the silicon carbide etch rates for these chemistries are much lower than typical silicon trench etch rates. Thus, although fabrication of the microcomponentry using SiC wafers and bulk SiC trench etching is indeed contemplated by the invention, it is recognised that alternative SiC processes may be preferable in some cases.

In one alternative process in accordance with the invention, molding processes are provided that enable fabrication of microengines and microcomponentry subassemblies of refractory materials such as SiC that are not particularly amenable to conventional microfabrication processing techniques. In a first such process in accordance with the invention, microengine components are molded by chemical vapor deposition of the selected component material into a pre-etched mold formed in, e.g., a silicon wafer; the resulting molded components are removed from their molds and then bonded together to produce the desired microengine or subassembly configuration. This process eliminates the need for complicated or questionable etching of materials not accommodated by conventional etch techniques and instead employs deep trench etching of silicon, a well-established technique, to produce the desired structures.

Figure 33A:
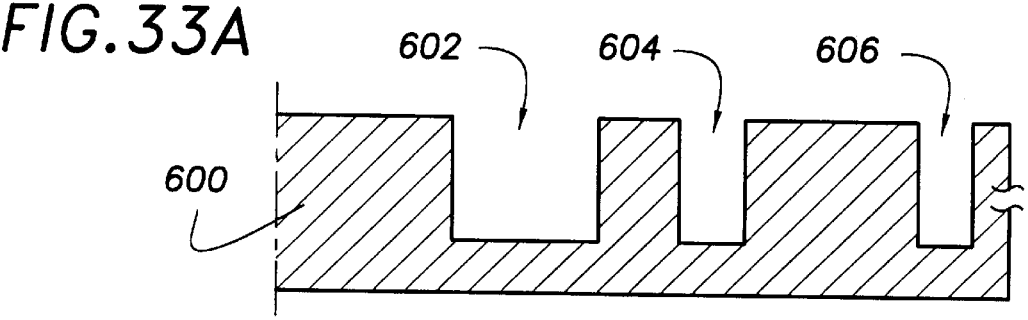
FIGS. 33A–D are cross-sectional views of a fabrication process in accordance with the invention for manufacturing molded SiC microcomponentry.
Figure 33B:
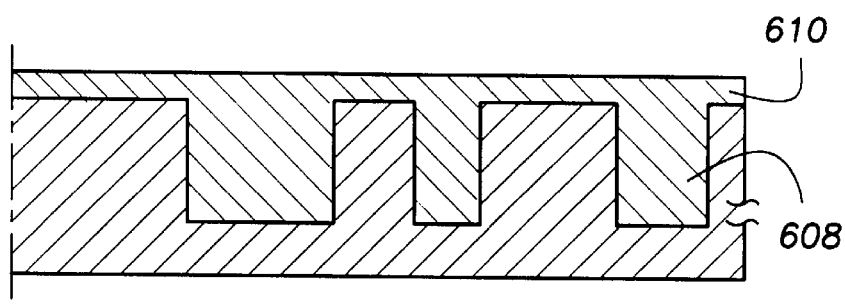

For example, considering the formation of a silicon carbide microcompressor, in a first process step, as shown in FIG. 33A, a silicon wafer 600 is etched to form cavities that correspond to locations of rotor blades 602, diffuser vanes 604, and a microcompressor endwall 606. This and the following figures show only a symmetrical right-half cross-section of the wafer. With the cavities formed, silicon carbide is deposited on the wafer to fill the cavities with silicon carbide 608, as shown in FIG. 33B, and to form an upper connector plate 610 of silicon carbide. In one example deposition process, the silicon mold is subjected to an initial carbonization step using, e.g., hydrogen and propane, and then a film growth step is carried out at a temperature of about 1360° C. using, e.g., hydrogen, propane, and silane reactants with flow rates of about 25 slm, 25 sccm, and 100 sccm, respectively.

Figure 33C:
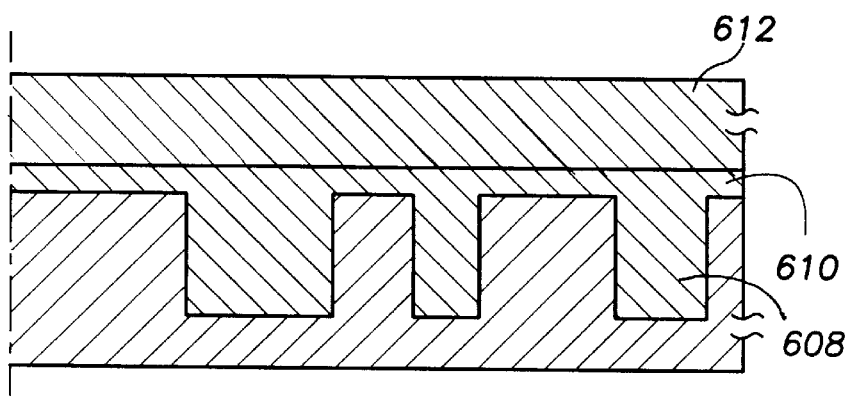

At this point, as shown in FIG. 33C, a silicon carbide wafer 612 is then fusion bonded to the silicon carbide connector plate 610. A suitable bonding process is that described earlier for bonding silicon wafers. In an alternative process, a single crystal, polycrystalline, or amorphous silicon carbide layer can be grown on the upper connector plate 610, using, e.g., a deposition process like that described above.

Figure 33D:
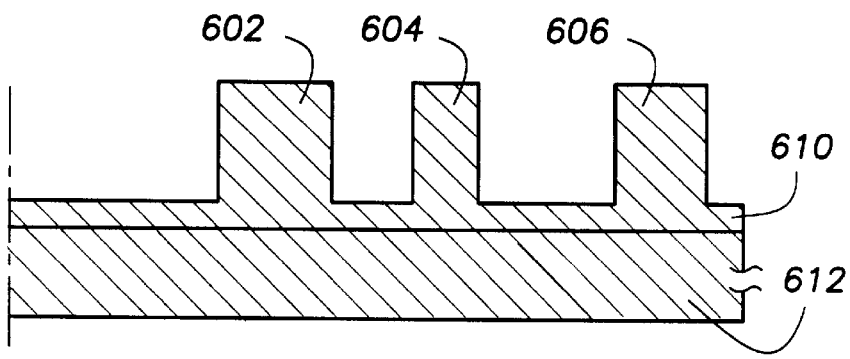

The silicon mold wafer 600 is then removed from the SiC features by a conventional etchant that preferentially etches the silicon over the silicon carbide; a conventional KOH-based etching process or electrochemical etching process is here suitable. This etch results in, as shown in FIG. 33D, a free-standing silicon carbide part, including topology for silicon carbide rotor blades 602, vanes 604, and a microcompressor endwall 606. In a similar manner, other microcomponents for the microcompressor, or a microengine or other desired system, can be molded. The microcomponents are then bonded together using the conventional wafer bonding process to produce a complete system.

As can be understood based on this description, other molding processes can be employed to produce microcomponentry and the microengine. For example, if a selected mold material cannot be preferentially etched over a selected material to be molded or if a mold is preferably reused, an intermediate etch layer can be included in the mold cavities for release of a molded material. For example, a layer of silicon dioxide can be employed for etching by hydrofluoric acid to release a silicon carbide part molded in a silicon mold without etching the silicon mold itself. Other such intermediate etch layers are also suitable.

In an alternative molding process, a silicon mold is produced and used in a silicon carbide deposition process to form a silicon carbide structure that itself is then used for molding microengine componentry, e.g., using a sacrificial mold release layer. Other suitable molding process scenarios can also be employed. In an alternative microfabrication sequence for producing a silicon carbide microengine, silicon structural components are formed and converted to silicon carbide by exposing the silicon components to a carbon source. One example process for this conversion is described in U.S. Pat. No. 4,123,571, issued Oct. 31, 1987, the entirety of which is hereby incorporated by reference.

Based on this discussion, it is to be understood that a wide range of manufacturing processes and materials are contemplated by the invention and that no single manufacturing process is required. If microelectronic materials are employed, it is preferred that their thermal limitations, e.g., the flow temperature of silicon dioxide, the temperature at which silicon exhibits creep due to stress, and other such thermal considerations, be noted for accommodating a selected microengine operational temperature. Beyond microfabrication-based processes, machining processes such as electro-discharge milling, like those employed for manufacturing conventionally-sized componentry can be employed. It is to be noted, however, that many of the geometries and tolerances in the microcomponentry designs are more preferably produced by a microfabrication process; combination machining and microfabrication sequences are thus contemplated as well.

Packaging

At the completion of a suitable manufacturing process for the microengine or one of its variations, the microengine and its ancillary support subsystems are together packaged in accordance with the invention to produce a self-contained, portable system. As is clear from the earlier discussion, this portable system can be configured to provide a portable source of electrical power, a source of thrust, a thermodynamic cycle, or other of the many systems described above.

Preferably, the microengine package both supports and connects together the microengine and its support subsystems, and as well provides environmental protection of the overall system. In general, the minimum subsystems provided for a self-contained microengine system include a fuel tank, a fuel valve and fuel pump, if required, a pressure or other suitable transducer, a microengine controller, air intake and exhaust ports, and some auxiliary power source for starting the microengine. Additionally, an electrical power conditioner and other control subsystems can optionally be included, as can be recognized based on the earlier discussion of the micromotor/microgenerator subsystem.

With these subsystems, the package functions to provide distribution of electrical control signals, distribution of electrical power, fuel and air distribution, heat dissipation, and overall device protection. Electrical distribution and device protection functionality are common to most electronic package configurations, but fuel and air distribution functionality, being specific to combustion-based machines, introduces additional package features not typically associated with electronic package configurations. In addition, the heat dissipation capability required of the microengine package is more demanding than that required of conventional electronic package configurations because the exhaust heat rejected to the package by the microengine is about 500° K. Accordingly, both the microengine package material and its configuration are preferably tailored to accommodate the specific operational characteristics of the microengine.

Figure 34A:
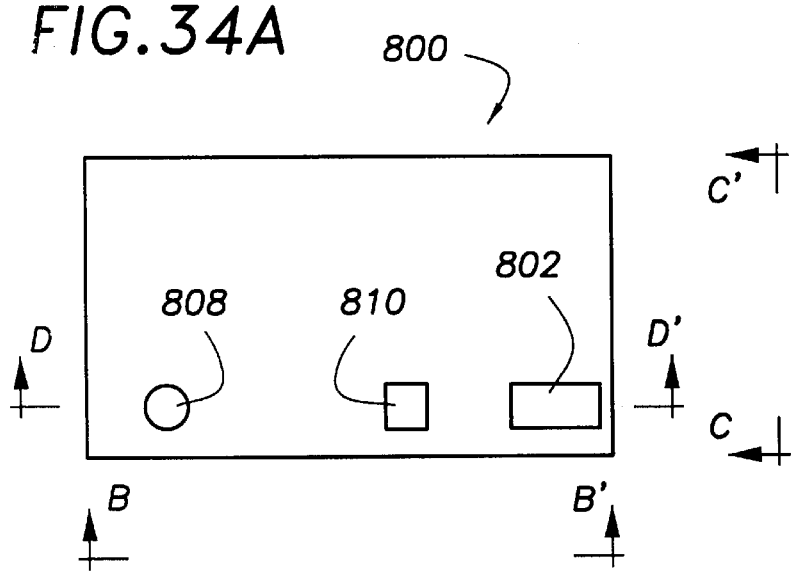
FIGS. 34A–C, are top, side, and end views, respectively, of a microengine package in accordance with the invention.
Figure 34B:
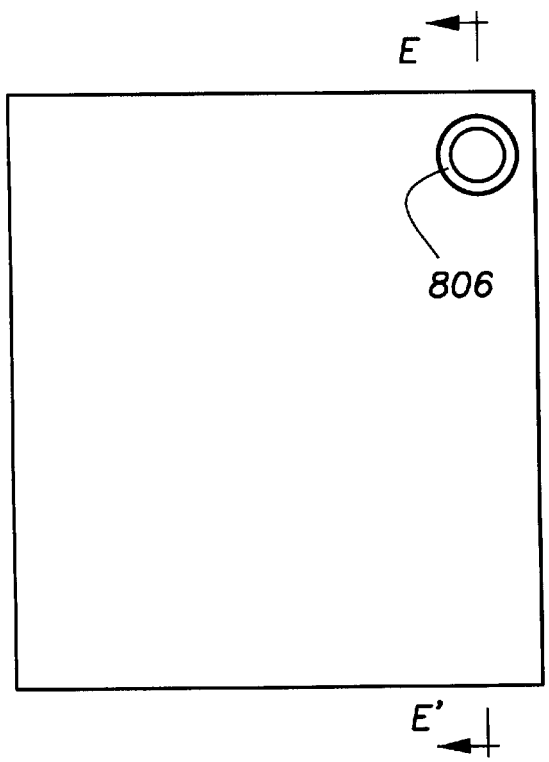
Figure 34C:
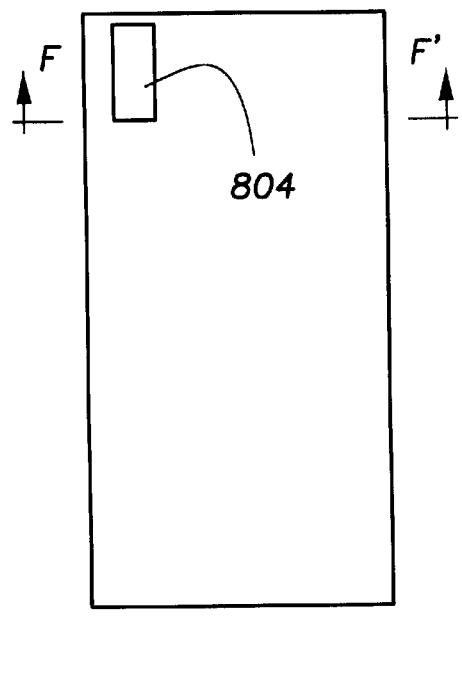

Referring now to FIGS. 34A–C, showing a top, side, and end view, respectively, of the microengine package 800, the overall package is shaped in a convenient form, e.g., a rectangle, to accommodate its intended use. A rectangular package is particularly advantageous for electrical power supply applications because its overall form matches that of a conventional battery, but other geometries are equally suitable. Such a microengine package is in one example about 127 mm tall, about 112 mm wide, and about 62 mm deep. The complete packaging of a microengine and all its ancillary subsystems in such a compact size is one particular advantage of the packaging configuration provided by the invention.

As shown in the figures, the package includes a first air intake port 802, located on the top of the package, and optionally includes a second air intake port 804, located, e.g., on an end of the package. Dual air intake ports are provided for flexibility in configuring, mounting, and connecting the package in a larger system. Each of the air intake ports is preferable sufficiently large to provide the entire air inflow required of the microengine. On the side of the package is provided an exhaust port 806, e.g., an annular exhaust port, that is connected, as described below, to the microengine exhaust. On the top of the package is provided a fueling port 808, of suitable size and geometry, for filling of the internal fuel tank. Finally, an electrical connector 810 is provided on the top of the package for making external connection to the various electrical subsystems housed within the package. This package shape and external connection configuration is very flexible; as can be readily understood, the size, shape, and configuration of the package, as well as placement of the external connections, can be suitably adjusted to accommodate a specific application.

Figure 34D:
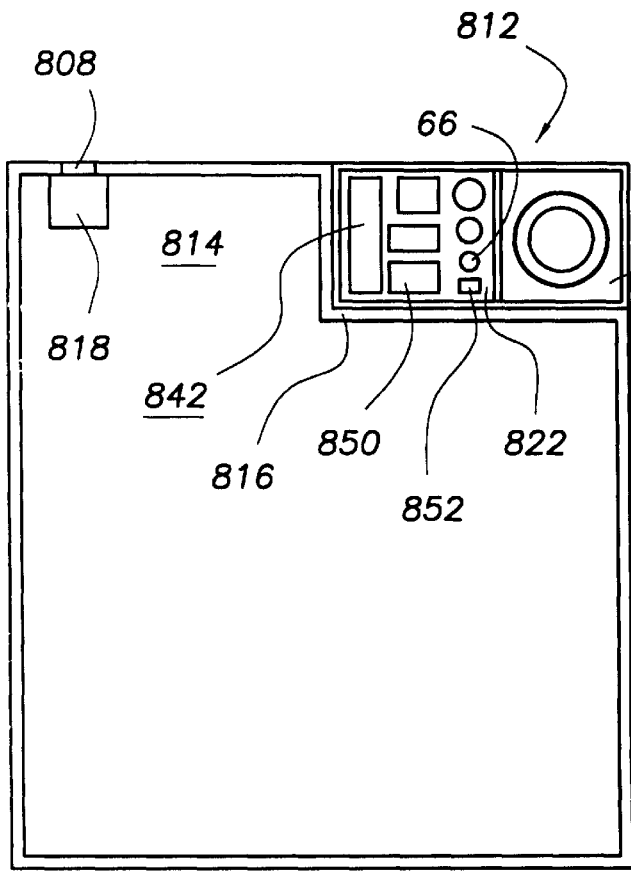
FIGS. 34D–F are three cross-sectional microengine package views taken at D–D', E–E', and F–F', respectively, in FIGS. 34A–C.
Figure 34E:
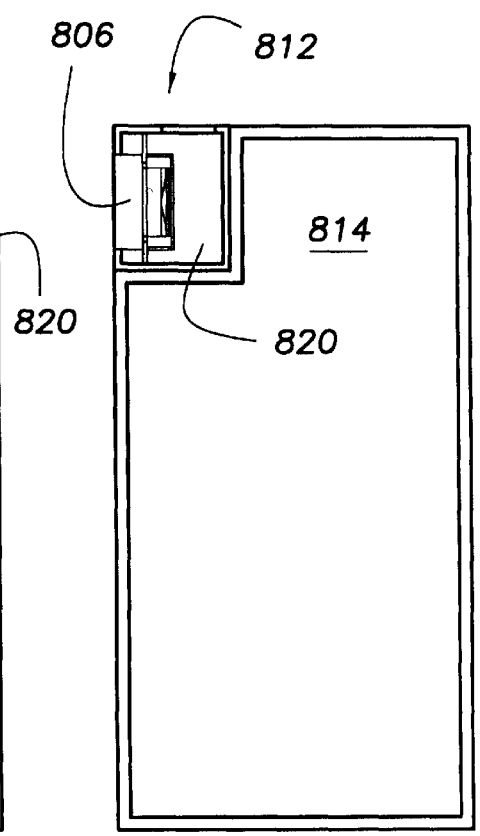
Figure 34F:
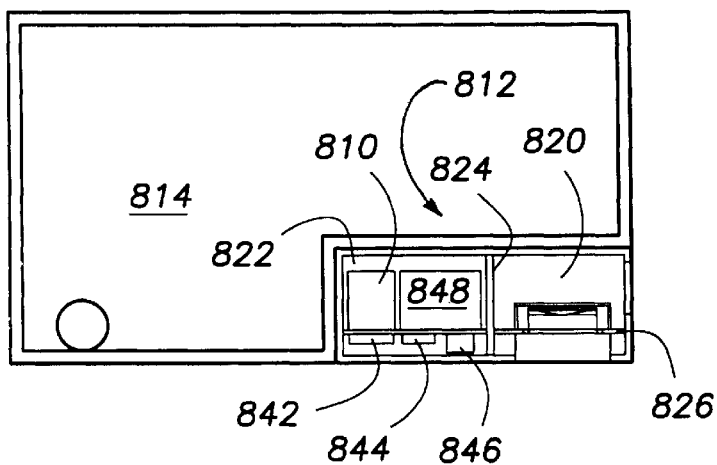

Turning also to FIGS. 34D–F, in which FIG. 34D is a cross section taken at D–D' in FIG. 34A, FIG. 34E is a cross section taken at E–E' in FIG. 34B, and FIG. 34F is a cross section taken at F–F' in FIG. 34C, there is shown that the package includes two principle sections, namely, a power module 812 that includes the microengine and the other auxiliary electrical components, and a fuel tank 814. The two sections are completely isolated from each other by an isolation wall 816. The only direct communication between the two sections is by a fuel line; indirect thermal communication by way of heat conduction from the power module also occurs. Each of the package sections and their components will be described separately in turn.

The fuel tank design is primarily dictated by volume considerations for an intended application. In addition, the tank material is generally required to be impermeable by and compatible with the intended microengine fuel, and should be sufficiently strong to withstand both internal fuel pressure and mechanical handling loads. This latter requirement is impacted by the overall microengine package configuration. For example, in the package configuration shown in the figures, the fuel tank walls act as the external shell of the package and also support the power module. Many conventional materials, including metals such as aluminum, steel, or other metal; many polymers; and other conventional materials can provide the required support. For example, the fuel tank can be injection molded, in a conventional injection molding process, of a suitable polymer. Such an injection molding process is particularly advantageous due to its low manufacturing cost.

A conventional, self-sealing fuel valve 818 is provided in alignment with the fuel port 808 for filling the tank. With the package dimensions given above, the fuel tank volume is about 800 cubic centimeters; this size can contain about 480 grams of butane. A microengine fueled by this volume of butane can supply about 2200 watt hours of electrical power, providing, for example, an average of about 25 watts of power for about 88 hours before the tank would need to be refueled. Use of fuels such as kerosene that can be consumed only in liquid form generally requires that fuel lines be extended throughout the fuel tank to ensure that the liquid is fed to the microengine when the package is oriented in any position. Fuels that can be consumed as either liquid or gas, such as butane, do not require such delivery lines; in the case of butane, only about 1–2 watts of thermal energy is required to vaporize butane, and this thermal energy is readily supplied by heat conduction to the fuel tank from the power module.

The power module 812 includes two compartments, namely, a microengine compartment 820 and an electronics compartment 822, these two compartments being separated by an isolation wall 824. A mounting board 826 extends across the wall between the two compartments for mounting both the microengine and the various components and for carrying fluid and electrical signals between the compartments.

Figure 35A:
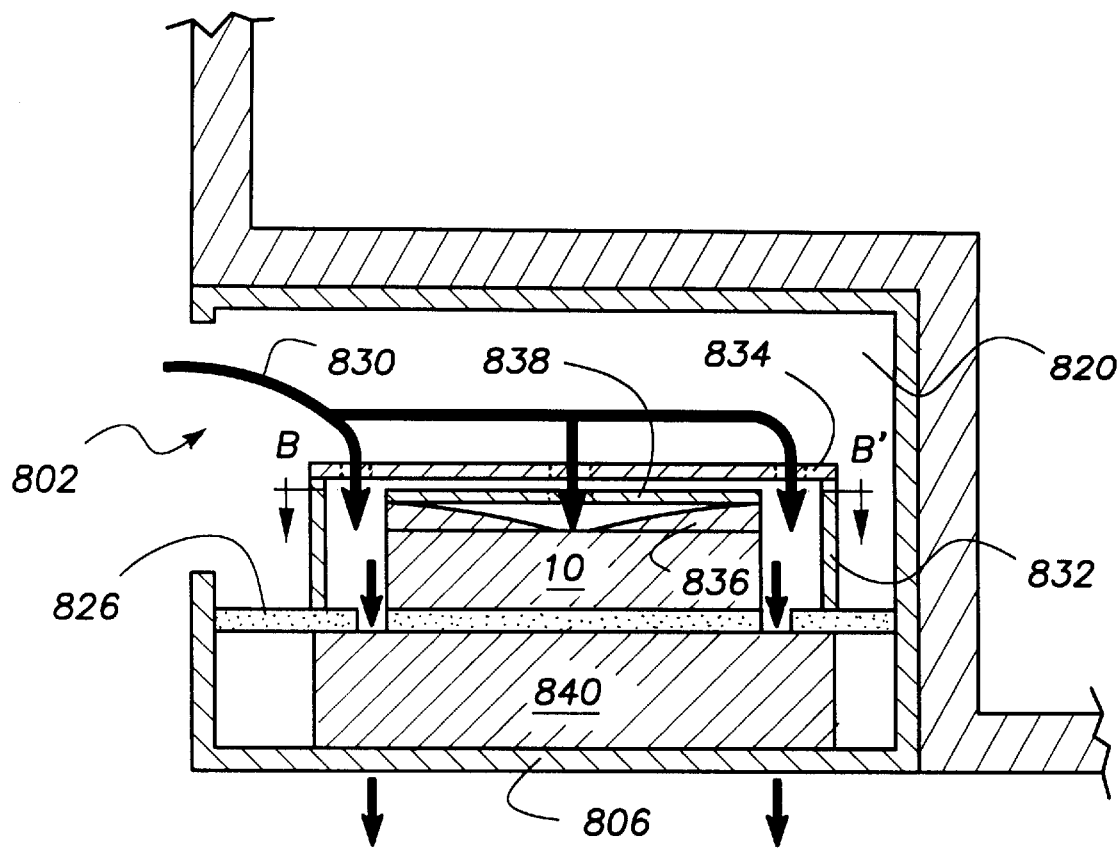
FIG. 35A is a cross-sectional view of a microengine package compartment in accordance with the invention.

Referring also to FIG. 35A, the microengine compartment 820 contains the microengine 10 and accompanying intake and exhaust subsystems. In brief, air taken in through the air inlet port 802 is fed 830 to the microengine 10 and the exhaust subsystem, and exits out the exhaust port 806. The mounting board 826 to which the microengine 10 is mounted isolates the air intake from the microengine exhaust. Preferably, the mounting board is a metallized ceramic substrate characterized by a thermal conductivity of less than about 10 W/mK. The substrate should have a thermal expansion coefficient that is within about $1 \times 10 K^{-1}$ of that of the material selected for the microengine core. Ceramics, such as silicon nitride, or glass ceramics, such as calcium aluminosilicate, as well as other suitable ceramics are adequate for the mounting board.

The mounting board is metallized and patterned to provide power and control signal distribution to and from the microengine. Such metallized connections can be formed by co-firing, post-firing, or other suitable metallization process, as is conventional. Metals such as copper, tungsten, or molybdenum, preferably having an over-plating of a solderable material such as nickel, are suitable for the metallization. Connections from these metallized conducting lines to the microengine can be made with conventional techniques such as wire bonding. Channels (not shown) are provided in the substrate to serve as fuel and air lines. Alternatively, tubing, such as stainless steel micro-tubing, can be used for the fluid connections. The microengine is attached to the mounting board by, e.g., glass bonding, brazing, or other suitable bonding technique at the aft surface of the microengine. Connections for fuel inlet and an air pressure tap for the pressure transducer can also be formed by this bond.

Figure 35B:
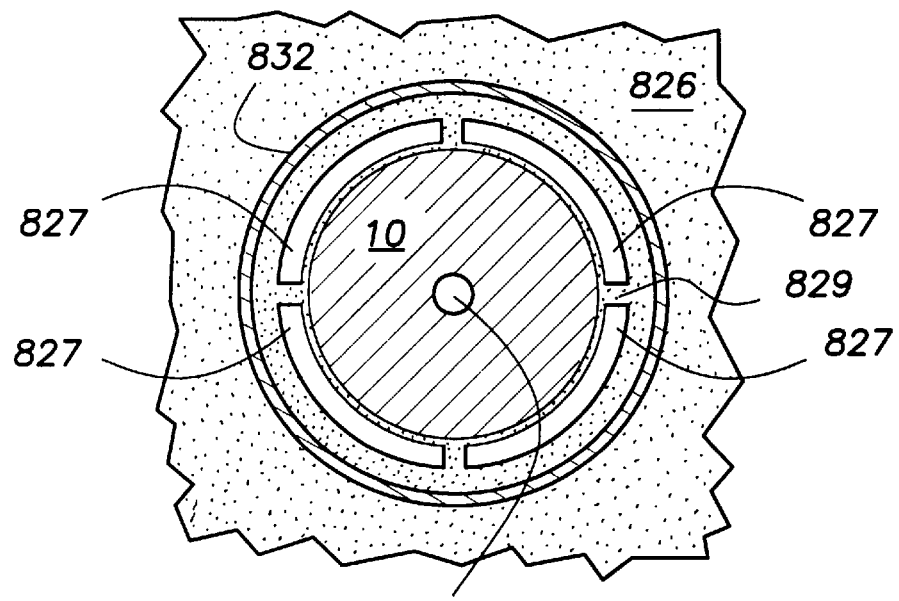
FIG. 35B is a top-down view of the microengine compartment of FIG. 35A.

Referring also to FIG. 35B, which is a cross section taken at B–B' in FIG. 35A, the mounting board 826 preferably is provided with one or more apertures 827 around the radial periphery of the microengine to thermally isolate the microengine from the other components of the power module. Mechanical supports 829 between the apertures are preferably as narrow as can be accommodated to limit heat conduction through the mounting board. Should it be desired, increased thermal isolation of the microengine from the electronics compartment of the power module can be provided by, e.g., an insulating layer coated on the microengine compartment walls.

The mounting board supports in the microengine compartment a filter holder 832 on which is mounted an optional coarse air filter 834. On the forward end of the microengine 10 is preferably mounted a bellmouth 836 to smooth air flow into the microengine inlet 16. A fine air filter 838 is in turn mounted to the bellmouth to keep out particles that could interfere with microengine operation; filtration of particles down to about 0.3 to 1.0 μm in size is generally sufficient. Depending on the intended environment for the microengine, the coarse air filter 834 can further be included to extend the life of the fine filter. In addition, the air inlet port 802 can be provided with an inlet screen for further particle filtration and general engine compartment protection.

An exhaust ejector-mixer 840 is mounted to the mounting board 826 on a side opposite that of the microengine. An aperture in the board (not shown) connects the microengine exhaust to the ejector-mixer 840. As is conventional, the ejector mixer entrains external ambient air by exchanging the momentum of the microengine exhaust, or "primary jet," with the ambient air. This ambient, or "secondary" fluid is then mixed with the primary jet to reduce the temperature of the primary jet. As shown in FIG. 35A, the filter holder 832, surrounding the radial periphery of the microengine as it does, channels secondary air around the microengine. The apertures 827 in the mounting board then direct this secondary air into the ejector-mixer 840, which is about 3–5 mm in length for the package and microengine dimensions given above. The microengine exhaust and secondary fluid are mixed in the ejector-mixer and then exhausted out of the package. By this arrangement, heat rejected from the microengine walls is convected out of the package along with the microengine exhaust flow. For the recuperated microengine configuration described earlier and an ejector-mixer designed for about a 3:1 secondary to primary air mass flow ratio, the exhaust temperature at the exit of the ejector-mixer would be about 100° C. The ejector-mixer, as well as the filter holder, can be molded from a material similar to that employed for the mounting board.

Referring back to FIGS. 34D and 34F, the electronics compartment 822 of the package power module 812 includes the electronics described in earlier discussions that are provided for controlling and sustaining microengine operation. Specifically, a motor/generator controller 842 and accompanying power electronics 844, output capacitor 846, and optional output power conditioner 848, as well as a starter battery 850, and the electronics output connector 810 are all mounted in a conventional manner to the mounting board. A pressure transducer 852 and fuel valve/pump 66 are mounted to the mounting board in the manner of the microengine, i.e., with both electrical and fluid connections to micro-tubing or channels internal to the board. Further, a fuel quantity sensor or fuel pressure sensor (not shown) can be configured in communication with the fuel tank to enable a user to assess the fuel quantity remaining in the tank.

Soldering, brazing, glass bonding, or other suitable bonding technique, as well as conventional epoxy bonding, can be employed for mounting components, given that the temperature of the electronics compartment is lower than that of the microengine compartment. During microengine operation, the electronic components generate heat only as high as about 5 watts or less, and this heat is readily dissipated by conduction through the compartment walls. Preferably, the electronics connector is provided with a number of terminals corresponding to the engine starter operation; that is, two or more terminals are provided, as is conventional.

As can be understood based on this discussion, the microengine packaging configuration described above can be adapted for providing a suitable package for a wide range of microengine embodiments and further for the various subsystems, such as the micromotor-microcompressor or microturbine-microgenerator.

From the foregoing, it is apparent that the microturbomachinery provided by the invention, e.g., the microengine adaptations, the microcompressor, microturbine, and other micro-assemble configurations, and the components of these configurations described above enable a wide range of thermodynamic and energy system applications and do so with designs that enable both superior performance and unitary structural manufacturing processes employing microfabrication techniques. It is recognized, of course, that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. A gas turbine engine comprising:

a compressor having an engine inlet port and a rotatable compressor disk for compressing inlet air;

a diffuser located to receive compressed air from the compressor and produce a corresponding rise in static air pressure;

a combustor comprising a combustion chamber located to receive the compressed air from the diffuser through a combustor inlet to combust the compressed air with a fuel;

a plurality of turbine nozzle guide vanes located to receive combusted air exhausted from the combustor;

a turbine having a rotatable turbine disk located to receive combusted air from the turbine nozzle guide vanes, and having an engine exhaust port; and bearing surfaces of the rotatable elements;

wherein the compressor, diffuser, combustion chamber, turbine nozzle guide vanes, and turbine elements and the bearing surfaces each substantially comprise a structural material common to all of the elements.

2. A gas turbine engine comprising:

a compressor having an engine inlet port and a rotatable compressor disk for compressing inlet air;

a diffuser located to receive compressed air from the compressor and produce a corresponding rise in static air pressure;

a combustor comprising a combustion chamber located to receive the compressed air from the diffuser through a combustor inlet to combust the compressed air with a fuel;

a plurality of turbine nozzle guide vanes located to receive combusted air exhausted from the combustor; and a turbine having a rotatable turbine disk located to receive combusted air from the turbine nozzle guide vanes, and having an engine exhaust port;

wherein the compressor diffuser, combustion chamber, turbine nozzle guide vanes, and turbine elements each substantially comprise silicon carbide.

3. The gas turbine engine of claim 2 wherein the silicon carbide comprises vapor deposited silicon carbide.

4. A gas turbine engine comprising:

a compressor having an engine inlet port and a rotatable compressor disk for compressing inlet air;

a diffuser located to receive compressed air from the compressor and produce a corresponding rise in static air pressure;

a combustor comprising a combustion chamber located to receive the compressed air from the diffuser through a combustor inlet to combust the compressed air with a fuel;

a plurality of turbine nozzle guide vanes located to receive combusted air exhausted from the combustor; and a turbine having a rotatable turbine disk located to receive combusted air from the turbine nozzle guide vanes, and having an engine exhaust port;

wherein the compressor, diffuser, combustion chamber, turbine nozzle guide vanes, and turbine elements each substantially comprise silicon.

5. A gas turbine engine comprising:

a compressor having an engine inlet port and a rotatable compressor disk for compressing inlet air;

a diffuser located to receive compressed air from the compressor and produce a corresponding rise in static air pressure;

a combustor comprising a combustion chamber located to receive the compressed air from the diffuser through a combustor inlet to combust the compressed air with a fuel;

a plurality of turbine nozzle guide vanes located to receive combusted air exhausted from the combustor; and a turbine having a rotatable turbine disk located to receive combusted air from the turbine nozzle guide vanes and having an engine exhaust port;

wherein the compressor, diffuser, combustion chamber, turbine nozzle guide vanes, and turbine elements each substantially comprise silicon nitride.

6. A gas turbine engine comprising:

a compressor having an engine inlet port and a rotatable compressor disk for compressing inlet air;

a diffuser located to receive compressed air from the compressor and produce a corresponding rise in static air pressure;

a combustor comprising a combustion chamber located to receive the compressed air from the diffuser through a combustor inlet to combust the compressed air with a fuel;

a plurality of turbine nozzle guide vanes located to receive combusted air exhausted from the combustor; and a turbine having a rotatable turbine disk located to receive combusted air from the turbine nozzle guide vanes, and having an engine exhaust port;

wherein the compressor, diffuser, combustion chamber, turbine nozzle guide vanes, and turbine elements each substantially comprise a semiconductor material.

7. A gas turbine engine comprising:

a compressor having an engine inlet port and a rotatable compressor disk for compressing inlet air;

a diffuser located to receive compressed air from the compressor and produce a corresponding static rise in air pressure;

a combustor comprising a combustion chamber located to receive the compressed air from the diffuser through a combustor inlet to combust the compressed air with a fuel;

a plurality of turbine nozzle guide vanes located to receive combusted air exhausted from the combustor; and a turbine having a rotatable disk located to receive combusted air from the turbine nozzle guide vanes, and having an engine exhaust port;

wherein the compressor, diffuser, combustion chamber, turbine nozzle guide vanes, and turbine elements each comprise a microfabricated element, and a ratio of engine radial height to engine axial length is at least about 1.

8. The gas turbine engine of claim 7 wherein the wherein the compressor, diffuser, combustion chamber, turbine nozzle guide vanes, and turbine elements each substantially comprise a structural material common to all of the elements.

9. The gas turbine engine of claim 7 wherein the compressor and turbine each comprise single crystal silicon disks.

10. The gas turbine engine of claim 9 wherein the compressor and turbine each comprise microfabricated bulk-etched silicon wafers.

11. The gas turbine engine of claim 7 wherein the combustion chamber comprises microfabricated vapor-deposited silicon carbide.

12. The gas turbine engine of claim 7 wherein compressor and turbine each comprise silicon carbide disks.

13. The gas turbine engine of claim 12 wherein the compressor and turbine each comprise microfabricated bulk-etched silicon carbide wafers.

14. A gas turbine engine comprising:

a rotor comprising a shaft having a substantially untapered compressor disk on a first end of the shaft with compressor blades defining a centrifugal compressor and a substantially untapered turbine disk on an opposite end of the shaft with turbine blades defining a radial inflow turbine, the rotor further comprising a material characterized by a strength-to-density ratio enabling a rotor speed of at least about 500,000 rotations per minute;

an annular, radial out-flow diffuser located radially outward of the compressor disk for receiving compressed air from the compressor;

an annular combustor located radially outward of the rotor shaft, having a combustor inlet radially outward of the diffuser, and having an exhaust outlet radially outward of the turbine disk; and a plurality of radial inflow turbine nozzle guide vanes located radially outward of the turbine disk and having an inlet for accepting combustion exhaust and directing the exhaust to the turbine.

15. The gas turbine engine of claim 14 wherein the compressor and turbine disks each comprise a disk diameter of between about 1 mm and 20 mm and wherein the combustor comprises a combustion chamber having an annular height of between about 2 mm–10 mm and an axial length of between about 0.5 mm–12 mm.

16. The gas turbine engine of claim 14 wherein the combustor comprises a combustion chamber having dimensions characterized by a ratio of chamber annular height to chamber axial length that is at least about 1.

17. The gas turbine engine of claim 14 wherein the rotor shaft is journalled for rotation by a radial gas journal bearing having a clearance of between about 2 $\mu$m–25 $\mu$m between the rotor shaft and an engine housing wall.

18. The gas turbine engine of claim 17 wherein the radial gas journal bearing has a tangential, circumferentially asymmetric pressurization seal.

19. The gas turbine engine of claim 14 wherein the compressor disk and the turbine disk are each journalled for rotation by a radial gas journal bearing having a clearance between a radially peripheral edge of the disk and a corresponding engine housing wall.

20. The gas turbine engine of claim 14 wherein the compressor disk and the turbine disk are located back-to-back on the rotor.

21. The gas turbine engine of claim 14 wherein the compressor blades comprise a plurality of radial-flow blades together of a common axial height and each of a constant axial height along blade radial extent, and wherein the turbine blades comprise a plurality of radial-flow blades together of a common axial height and each of a constant axial height along blade radial extent.

22. The gas turbine engine of claim 21 wherein the diffuser comprises a plurality of radial-flow diffuser vanes together of a common axial height with the plurality of compressor blades and each of a constant axial height along vane radial extent, and wherein the turbine guide vanes comprise a plurality of radial-flow vanes together of a common axial height with the plurality of turbine blades and each of a constant axial height along vane radial extent.

23. The gas turbine engine of claim 14 further comprising a motor having a motor rotor defined by the compressor and having stator electrodes defined by conducting regions located on an engine endwall opposite the compressor disk and interconnected to define a stator excitation configuration of at least two excitation phases.

24. The gas turbine engine of claim 23 wherein the motor rotor is defined by the compressor blades.

25. The gas turbine engine of claim 23 wherein the compressor blades comprise a plurality of radial-flow blades together of a common axial height and each of a constant axial height along blade radial extent, the compressor further comprising a blade shroud connected on the axial height of the blades and having an upper conducting layer defining an electric induction motor rotor.

26. The gas turbine engine of claim 14 further comprising a generator having a generator rotor defined by the compressor and having stator electrodes defined by conducting regions located on an engine endwall opposite the compressor disk and interconnected to define a stator excitation configuration of at least one excitation phase.

27. The gas turbine engine of claim 14 further comprising a generator having a generator rotor defined by the turbine and having stator electrodes defined by conducting regions located on an engine endwall opposite the turbine disk and interconnected to define a stator excitation configuration of at least one excitation phase.

28. The gas turbine engine of claim 14 further comprising a motor having a motor rotor defined by the turbine and having stator electrodes defined by conducting regions located on an engine endwall opposite the turbine disk and interconnected to define a stator excitation configuration of at least two excitation phases.

29. The gas turbine engine of claim 27 wherein the generator rotor is defined by the turbine blades.

30. The gas turbine engine of claim 27 wherein the turbine blades comprise a plurality of radial-flow blades together of a common axial height and each of a constant axial height along blade radial extent, the turbine further comprising a blade shroud connected on the axial height of the blades and having an upper conducting layer defining an electric induction generator rotor.

31. The gas turbine engine of claim 14 further comprising:
an annular fuel plenum located radially outward of the compressor disk; and
an array of fuel injectors connected between the fuel plenum and a location on an engine endwall along internal engine air flow upstream of the combustor inlet.

32. The gas turbine engine of claim 31 further comprising a fuel tank, a motor connected to the rotor, an auxiliary power source for starting the motor, and control electronics, and wherein the gas turbine engine is housed in an engine package having a air inlet port connected to the compressor, an air exhaust port connected to the turbine, a fuel port connected to the fuel tank, a fuel line connecting the fuel tank to the fuel plenum, an electrical port connected to the control electronics and auxiliary power source, and an isolation wall isolating the fuel tank from other engine components.

33. The gas turbine engine of claim 32 wherein the engine package comprises a volume less than about 1 liter.

34. The gas turbine engine of claim 32 wherein the fuel tank comprises a volume sufficient for storing between about 5 ml–5000 ml of liquid engine fuel.

35. The gas turbine engine of claim 32 wherein the engine package comprises a plastic package.

36. The gas turbine engine of claim 14 further comprising an annular recuperator connected to receive compressed air from the diffuser and to receive air exhausted from the turbine to heat the compressed air and discharge the heated compressed air to the combuster.

37. The gas turbine engine of claim 36 wherein the recuperator comprises planar hot air channels connected to receive air exhausted from the turbine and located in alternating fashion with cold air channels connected to receive compressed air from the diffuser.

38. The gas turbine engine of claim 14 further comprising:
a bypass fan located axially forward of the compressor disk and having bypass fan blades; and
an axial bypass channel located radially outward of the combustor and providing an exhaust port axially aft of the turbine.

39. The gas turbine engine of claim 38 wherein the compressor blades comprise a plurality of radial-flow blades together of a common axial height and each of a constant axial height along blade radial extent, the compressor further comprising a blade shroud connected on the axial height of the blades and supporting the bypass fan blades, together of a common axial height and each of a constant axial height along blade radial extent.

40. The gas turbine engine of claim 14 wherein the rotor, diffuser, combustor, and turbine nozzle guide vanes elements each substantially comprise a structural material common to all of the elements.

41. The gas turbine engine of claim 14 wherein the rotor, diffuser, combustor, and turbine nozzle guide vane elements each comprise a microfabricated element, and a ratio of engine radial height to engine axial length is at least about 1.

42. A gas turbine engine comprising:
   a rotor comprising a shaft having a compressor disk on a first end of the shaft with compressor blades defining a centrifugal compressor and a turbine disk on an opposite end of the shaft with turbine blades defining a radial inflow turbine;
   an annular, radial out-flow diffuser located radially outward of the compressor disk for receiving compressed air from the compressor;
   an annular, linerless combustor having a combustion chamber located radially outward of the rotor shaft, having a combustor inlet radially outward of the diffuser, and having an exhaust outlet radially outward of the turbine disk, the combustion chamber having dimensions characterized by a ratio of chamber annular height to chamber axial length that is at least about 1; and
   a plurality of radial in-flow turbine nozzle guide vanes located radially outward of the turbine disk and having an inlet for accepting combustion exhaust from the combustion chamber and directing the exhaust to the turbine.

43. The gas turbine engine of claim 42 wherein the compressor and turbine disks each comprise a disk diameter of between about 1 mm and 20 mm and wherein the combustor comprises a combustion chamber having an annular height of between about 2 mm–10 mm and an axial length of between about 0.5 mm–12 mm.

44. The gas turbine engine of claim 42 wherein the compressor disk and the turbine disk are located back-to-back on the rotor.

45. The gas turbine engine of claim 42 wherein the compressor blades comprise a plurality of radial-flow blades together of a common axial height and each of a constant axial height along blade radial extent, and wherein the turbine blades comprise a plurality of radial-flow blades together of a common axial height and each of a constant axial height along blade radial extent.

46. The gas turbine engine of claim 42 wherein the diffuser comprises a plurality of radial-flow diffuser vanes together of a common axial height with the plurality of compressor blades and each of a constant axial height along vane radial extent, and wherein the turbine nozzle guide vanes comprise a plurality of radial-flow vanes together of a common axial height with the plurality of turbine blades and each of a constant axial height along vane radial extent.

47. The gas turbine engine of claim 42 further comprising:
   an annular fuel plenum located radially outward of the compressor disk; and
   an array of fuel injectors connected between the fuel plenum and a location on an engine endwall along internal engine air flow upstream of the combustor inlet.

48. The gas turbine engine of claim 47 further comprising a fuel tank, a motor connected to the rotor, an auxiliary power source for starting the motor, and control electronics, and wherein the gas turbine engine is housed in an engine package having a air inlet port connected to the compressor, an air exhaust port connected to the turbine, a fuel port connected to the fuel tank, a fuel line connecting the fuel tank to the fuel plenum, an electrical port connected to the control electronics and auxiliary power source, and an isolation wall isolating the fuel tank from other engine components.

49. The gas turbine engine of claim 42 wherein the rotor, diffuser, combustion chamber, and turbine nozzle guide vane elements each substantially comprise a structural material common to all of the elements.

50. The gas turbine engine of claim 42 wherein the rotor, diffuser, combustion chamber, and turbine nozzle guide vane elements each comprise a microfabricated element, and a ratio of engine radial height to engine axial length is at least about 1.

51. A gas turbine engine comprising:
   a compressor disk having radial-flow compressor blades defining a centrifugal compressor;
   a turbine disk located in a plane coincident with the compressor disk and having radial-flow turbine blades defining a radial inflow turbine;
   an annular, radial out-flow diffuser located radially outward of the compressor disk for receiving compressed air from the compressor;
   a combustor having a combustion chamber with a combustor inlet in communication with the diffuser for receiving compressed air from the diffuser and an exhaust vent in the plane of the turbine disk; and
   a plurality of radial inflow turbine nozzle guide vanes located radially outward of the turbine disk and having an inlet for accepting combustion exhaust and directing the exhaust to the turbine disk.

52. The gas turbine engine of claim 51 wherein the gas turbine engine has a thickness of less than about 1 centimeter.

53. The gas turbine engine of claim 51 further comprising a fuel manifold located adjacent to the diffuser and connected to the diffuser by a row of spaced apart fuel injectors.

54. The gas turbine engine of claim 51 further comprising forward and aft cooling channels each located adjacent to a corresponding forward and aft combustion chamber wall and connected between the diffuser exhaust vent and the combustor inlet.

55. The gas turbine engine of claim 51 wherein the diffuser comprises a plurality of diffuser vanes, and wherein the compressor blades, the turbine blades, the diffuser vanes, and the turbine nozzle guide vanes comprise radial-flow blades and vanes together of a common axial height and each of a constant axial height along corresponding blade and vane radial extent.

56. The gas turbine engine of claim 51 further comprising a motor having a motor rotor defined by the compressor disk and stator electrodes defined by conducting regions located on an engine endwall opposite the compressor disk and interconnected to define a stator excitation configuration of at least two excitation phases.

57. The gas turbine engine of claim 51 further comprising a generator having a generator rotor defined by the turbine disk and having stator electrodes defined by conducting regions located on an engine endwall opposite the turbine disk and interconnected to define a stator excitation configuration of at least one excitation phase.

58. A combustion power generator comprising:
   a first pump disk having pump blades defining a rotary fuel pump;
   a second pump disk located in a plane coincident with the first pump disk and having pump blades defining a rotary oxidizer pump;
   a turbine disk located in a plane coincident with the first and second pump disks and having turbine blades defining a radial inflow turbine;
   a first annular, radial out-flow diffuser located radially outward of the first pump disk for receiving fuel from the fuel pump;

a second annular, radial out-flow diffuser located radially outward of the second pump disk for receiving oxidizer from the oxidizer pump;

a combustor comprising a combustion chamber with a combustor inlet in communication with the first and second diffusers for receiving fuel and oxidizer, and an exhaust vent in the plane of the turbine disk;

a plurality of radial inflow turbine nozzle guide vanes located radially outward of the turbine disk and having an inlet for accepting combustion exhaust and directing the exhaust to the turbine disk; and a generator having a generator rotor defined by the turbine and having stator electrodes defined by conducting regions located on a generator endwall opposite the turbine disk and interconnected to define a stator excitation configuration of at least one excitation phase.

59. A combustion power generator comprising:

a pump disk having pump blades defining a rotary fuel pump;

a turbine disk located in a plane coincident with the pump disk and having turbine blades defining a radial inflow turbine;

an annular, radial out-flow diffuser located radially outward of the pump disk for receiving fuel from the fuel pump;

a combustor comprising a combustion chamber with a combustor inlet in communication with the diffuser for receiving fuel, and an exhaust vent in the plane of the turbine disk;

a plurality of radial inflow turbine nozzle guide vanes located radially outward of the turbine disk and having an inlet for accepting combustion exhaust and directing the exhaust to the turbine disk; and a generator having a generator rotor defined by the turbine and having stator electrodes defined by conducting regions located on a generator endwall opposite the turbine disk and interconnected to define a stator excitation configuration of at least one excitation phase.

60. The combustion power generator of claim 59 wherein the power generator has a thickness of less than about 1 centimeter.

61. The combustion power generator of claim 59 wherein the diffuser comprises a plurality of diffuser vanes, and wherein the fuel pump blades, the turbine blades, the diffuser vanes, and the turbine nozzle guide vanes comprise radial-flow blades and vanes together of a common axial height and each of a constant axial height along corresponding blade and vane radial extent.

62. The combustion power generator of claim 59 further comprising:

a fuel pump motor having a motor rotor defined by the fuel pump and stator electrodes defined by conducting regions located on an endwall opposite the fuel pump disk.

63. The combustion power generator of claim 59 wherein the fuel pump, diffuser, combustion chamber, turbine nozzle guide vanes, and turbine elements each substantially comprise a structural material common to all of the elements.

64. The gas turbine engine of claim 59 wherein the fuel pump, diffuser, combustion chamber, turbine guide vanes, and turbine elements each comprise a microfabricated element, and a ratio of engine radial height to engine axial length is at least about 1.

65. The gas turbine engine of claim 21 wherein the diffuser comprises a plurality of radial-flow diffuser vanes together of a common axial height that is distinct from axial height of the compressor blades, and wherein the turbine nozzle guide vanes comprise a plurality of radial-flow vanes together of a common axial height that is distinct from axial height of the turbine blades.

66. The gas turbine engine of claim 42 wherein the diffuser comprises a plurality of radial-flow diffuser vanes together of a common axial height that is distinct from axial height of the compressor blades, and wherein the turbine nozzle guide vanes comprise a plurality of radial-flow vanes together of a common axial height that is distinct from axial height of the turbine blades.

67. A gas turbine engine comprising:

a silicon compressor having an engine inlet port and a rotatable compressor disk for compressing inlet air;

a silicon diffuser located to receive compressed air from the compressor and produce a corresponding rise in static air pressure;

a silicon carbide combustor comprising a combustion chamber located to receive the compressed air from the diffuser through a combustor inlet to combust the compressed air with a fuel;

a plurality of silicon carbide turbine nozzle guide vanes located to receive combusted air exhausted from the combustor; and a silicon carbide turbine having a rotatable turbine disk located to receive combusted air from the turbine nozzle guide vanes, and having an engine exhaust port.

68. A gas turbine engine comprising:

a rotor comprising a shaft having a compressor disk, of between about 1 mm and about 10 mm in diameter, on a first end of the shaft with compressor blades defining a centrifugal compressor, and a turbine disk, of between about 1 mm and about 10 mm in diameter, on an opposite end of the shaft with turbine blades defining a radial inflow turbine;

an annular, radial out-flow diffuser located radially outward of the compressor disk for receiving compressed air from the compressor;

an annular combustor located radially outward of the rotor shaft, having a combustor inlet radially outward of the diffuser, having an exhaust outlet radially outward of the turbine disk and having a combustion chamber with an annular height of between about 2 mm and about 20 mm and an axial length of between about 0.5 mm and about 12 mm; and a plurality of radial inflow turbine nozzle guide vanes located radially outward of the turbine disk and having an inlet for accepting combustion exhaust and directing the exhaust to the turbine.

69. The gas turbine engine of claim 4 wherein the silicon elements are coated with silicon carbide.

70. The gas turbine engine of claim 4 wherein the silicon elements are coated with silicon nitride.

* * * * *